United States Patent
Ichikawa et al.

(10) Patent No.: US 8,915,822 B2
(45) Date of Patent: Dec. 23, 2014

(54) VEHICLE DRIVING SYSTEM AND CONTROL METHOD THEREOF

(75) Inventors: Kazuki Ichikawa, Saitama (JP);
Fumiyasu Suga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 13/809,085

(22) PCT Filed: Jun. 15, 2011

(86) PCT No.: PCT/JP2011/063714
§ 371 (c)(1),
(2), (4) Date: Jan. 8, 2013

(87) PCT Pub. No.: WO2012/005094
PCT Pub. Date: Jan. 12, 2012

(65) Prior Publication Data
US 2013/0116087 A1 May 9, 2013

(30) Foreign Application Priority Data
Jul. 9, 2010 (JP) .................................. 2010-156803

(51) Int. Cl.
*B60W 10/101* (2012.01)
*B60W 10/11* (2012.01)
(Continued)

(52) U.S. Cl.
CPC .................. *B60W 10/11* (2013.01); *B60K 5/08* (2013.01); *B60K 6/383* (2013.01);
(Continued)

(58) Field of Classification Search
USPC .............. 477/3, 5, 6, 8, 15, 79; 475/5, 8, 169, 475/170, 174; 74/65, 661
See application file for complete search history.

(56) References Cited

U.S. PATENT DOCUMENTS

| 7,108,626 | B2 * | 9/2006 | Friedmann ........................ 475/8 |
| 8,210,290 | B2 * | 7/2012 | Simon et al. ............. 180/65.225 |

(Continued)

FOREIGN PATENT DOCUMENTS

| CN | 101239593 A | 8/2008 |
| JP | 09-202159 A | 8/1997 |

(Continued)

OTHER PUBLICATIONS

International Search Report, dated Sep. 13, 2011.

(Continued)

*Primary Examiner* — Jacob S Scott
(74) *Attorney, Agent, or Firm* — Squire Patton Boggs (US) LLP

(57) ABSTRACT

One-way clutches OWC1 and OWC2 are provided on output sides of transmissions TM1 and TM2, and the transmissions TM1 and TM2 mechanically lock when the output member 121 of the one-way clutches OWC1 and OWC2 is reversely rotated to the backward side. Clutch mechanisms CL1 and CL2 are interposed between the output member 121 and a driving target member 11 connected to a driving wheel 2. According to uphill start conditions, a controller 5 makes any one of the clutch mechanisms CL1 and CL2 enter ON state when a vehicle-backward-movement prevention control is determined to be required and the controller 5 makes the clutch mechanisms CL1 and CL2 enter OFF state when the vehicle-backward-movement prevention control is determined to be not required. Thus, it is possible to provide a vehicle driving system capable of performing a hill hold assist function with a simple control.

6 Claims, 41 Drawing Sheets

(51) Int. Cl.
| | |
|---|---|
| *B60K 5/08* | (2006.01) |
| *B60K 6/383* | (2007.10) |
| *B60K 6/387* | (2007.10) |
| *B60K 6/448* | (2007.10) |
| *B60K 17/04* | (2006.01) |
| *B60K 17/08* | (2006.01) |
| *B60W 10/02* | (2006.01) |
| *B60W 10/06* | (2006.01) |
| *B60W 10/08* | (2006.01) |
| *B60W 20/00* | (2006.01) |
| *B60W 30/18* | (2012.01) |
| *F16D 41/08* | (2006.01) |
| *F16H 61/00* | (2006.01) |
| *B60K 1/00* | (2006.01) |
| *F16H 29/04* | (2006.01) |
| *F16H 29/22* | (2006.01) |

(52) U.S. Cl.
CPC ........... *B60K 6/387* (2013.01); *B60K 6/448* (2013.01); *B60K 17/04* (2013.01); *B60K 17/08* (2013.01); *B60W 10/02* (2013.01); *B60W 10/06* (2013.01); *B60W 10/08* (2013.01); *B60W 10/101* (2013.01); *B60W 20/00* (2013.01); *B60W 30/18027* (2013.01); *B60W 30/18118* (2013.01); *F16D 41/088* (2013.01); *F16H 61/0059* (2013.01); *B60K 2001/001* (2013.01); *B60W 2550/142* (2013.01); *B60W 2710/021* (2013.01); *B60W 2710/1005* (2013.01); *F16H 29/04* (2013.01); *Y02T 10/6243* (2013.01); *Y02T 10/6286* (2013.01); *F16H 29/22* (2013.01)
USPC ............. 477/6; 477/4; 477/79; 475/5; 475/8; 475/170; 475/174

(56) References Cited

U.S. PATENT DOCUMENTS

| | | | |
|---|---|---|---|
| 8,449,426 B2* | 5/2013 | Nishimura | 475/170 |
| 8,602,936 B2* | 12/2013 | Ichikawa et al. | 475/170 |
| 8,641,571 B2* | 2/2014 | Ichikawa et al. | 475/170 |
| 8,684,885 B2* | 4/2014 | Ichikawa et al. | 477/6 |
| 8,757,306 B2* | 6/2014 | Kobayashi et al. | 180/65.265 |
| 8,758,193 B2* | 6/2014 | Ichikawa et al. | 477/5 |
| 2005/0039572 A1 | 2/2005 | Friedmann | |

FOREIGN PATENT DOCUMENTS

| | | |
|---|---|---|
| JP | 11-336882 A | 12/1999 |
| JP | 2005-502543 A | 1/2005 |
| JP | 2006-183780 A | 7/2006 |
| JP | 2006-298080 A | 11/2006 |
| JP | 2009-197981 A | 9/2009 |
| JP | 2010-25310 A | 2/2010 |

OTHER PUBLICATIONS

Office Action dated Aug. 5, 2014 corresponding to Chinese Patent Application No. 201180031086.9.

* cited by examiner

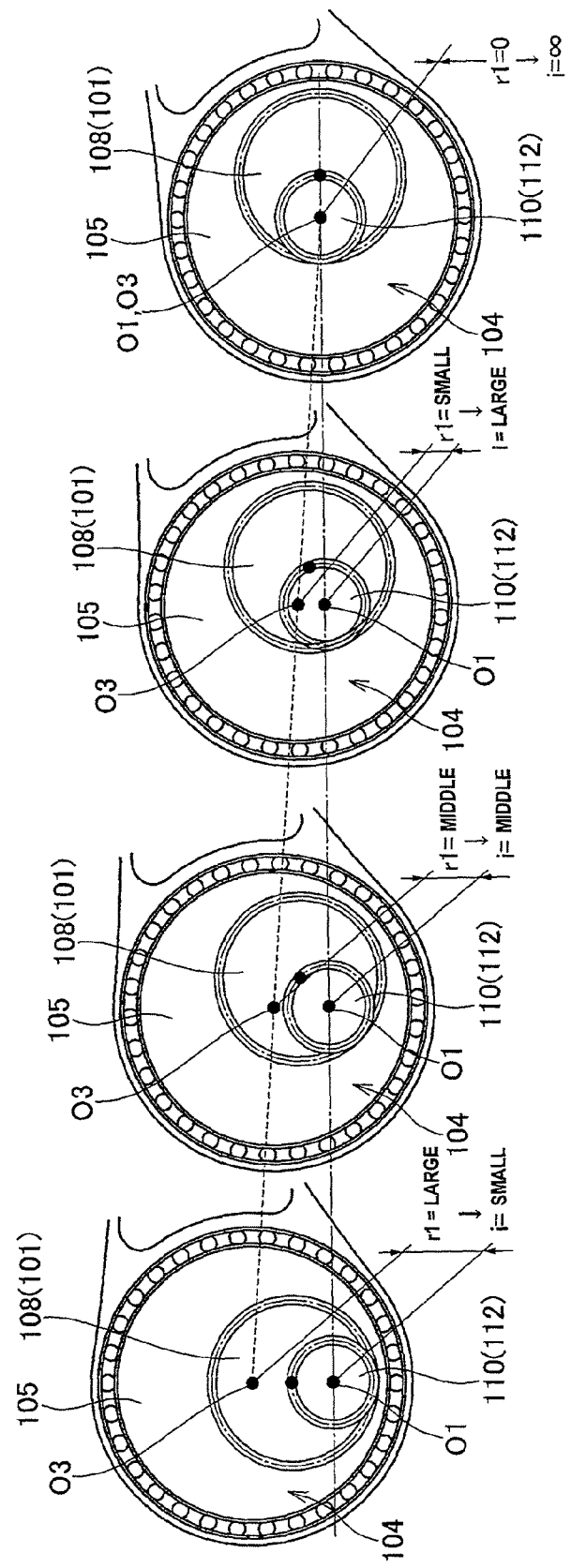

VEHICLE DRIVING SYSTEM AND CONTROL METHOD THEREOF

CROSS-REFERENCE TO RELATED APPLICATION

This application is a National Stage entry of International Application No. PCT/JP2011/063714 filed Jun. 15, 2011, which claims priority to Japanese Patent Application No. 2010-156803 filed Jul. 9, 2010, the disclosure of the prior applications are hereby incorporated in their entirety by reference.

TECHNICAL FIELD

The present invention relates to a vehicle driving system which includes a hill hold assist function which prevents a vehicle from moving backward during a start on a hill (a start on an uphill) and a control method thereof.

BACKGROUND ART

When a vehicle starts on an uphill road, it is necessary to prevent the vehicle from moving backward at the time of release of a brake pedal. In the related art, when the brake pedal is released from a state where the brake pedal is stepped upon by a driver, a control is performed so that a braking force is held regardless of the operation of the brake pedal of the driver while a driving force changes from being small to large (e.g., refer to PTL 1). The function which prevents the vehicle from moving backward during the start on a hill (start on an uphill) is referred to as a "hill hold assist function".

PATENT LITERATURE

[PTL 1] JP-H09-202159-A

SUMMARY OF INVENTION

Problem to be Solved by Invention

However, in the vehicle driving system which includes the hill hold assist function of the related art, when the hill hold is carried out, an inconvenient brake oil pressure control for controlling the braking force is required, and inconvenient controls of release timing or the like of the brake after the starting begins are required.

The present invention is made in consideration of the above-described circumstances, and one object thereof is to provide a vehicle driving system capable of performing the hill hold assist function by carrying out only a simple control and a control method thereof.

Means for solving Problem

To achieve the object, Claim 1 defines a vehicle driving system (e.g., a driving system 1 in embodiment), including:
an internal combustion engine portion (e.g., a first engine ENG1 and a second engine ENG2 in embodiment) which generates a rotational power;
a transmission mechanism (e.g., a first transmission TM1 and a second transmission TM2 in embodiment) which shifts the rotational power generated in the internal combustion engine portion and outputs the shifted rotational power;
a one-way clutch (e.g., a first one-way clutch OWC1 and a second one-way clutch OWC2 in embodiment) which is provided in an output portion of the transmission mechanism, the one-way clutch including:
an input member (e.g., an input member 122 in embodiment) which receives the rotational power from the transmission mechanism;
an output member (e.g., an output member 121 in embodiment); and
an engagement member (e.g., a roller 123 in embodiment) which makes the input member and the output member enter a locked state or a non-locked state, in which the input member and the output member enter the locked state when positive rotational speed of the input member exceeds the positive rotational speed of the output member to thereby transmit the rotational power of the input member to the output member;
a driving target member (e.g., a driving target member 11 in embodiment) which is connected to the output member of the one-way clutch, and is rotatable integrally with a driving wheel (e.g., a driving wheel 2 in embodiment) to transmit the rotational power of the output member to the driving wheel;
a clutch mechanism (e.g., a first clutch mechanism CL1 and a second clutch mechanism CL2 in embodiment) which is interposed between the output member of the one-way clutch and the driving target member, and can transmit/disconnect power therebetween by being ON/OFF-controlled;
a clutch mechanism controller (e.g., a controller 5 in embodiment) which controls ON/OFF of the clutch mechanism;
an uphill state detection unit (e.g., an uphill state detection unit 7 in embodiment) which detects an uphill state of a vehicle; and
a determination unit (e.g., the controller 5 in embodiment) which detects whether or not a vehicle-backward-movement prevention control is required according to the uphill state detected by the uphill state detection unit,
wherein the transmission mechanism includes:
an input shaft (e.g., an input shaft 101 in embodiment) which receives the rotational power to rotate around an input center axis (e.g., an input center axis O1 in embodiment);
plural first fulcrums (e.g., a first fulcrum O3 in embodiment) which are provided in a circumferential direction around the input shaft at equal intervals, each first fulcrum being rotatable around the input center axis along with the input shaft while maintaining a variable eccentricity (e.g., an eccentricity r1 in embodiment) with respect to the input center axis;
plural eccentric disks (e.g., an eccentric disk 104 in embodiment) which rotate around the input center axis to have the first fulcrums as the respective centers;
a one-way clutch (e.g., a one-way clutch 120 in embodiment) which includes the output member (e.g., the output member 121 in embodiment) which rotates around an output center axis (e.g., an output center axis O2 in embodiment) separated from the input center axis, the input member (e.g., the input member 122 in embodiment) which oscillates around the output center axis by receiving the rotational power from the outside, and the engagement member (e.g., a roller 123 in embodiment) which makes the input member and the output member enter a locked state or a non-locked state with each other, transmits the rotational power of the input member to the output member when the positive rotational speed of the input member exceeds the positive rotational speed of the output member, and thereby converts the oscillating movement of the input member to the rotational movement of the output member;

a second fulcrum (e.g., a second fulcrum O4 in embodiment) which is provided on the input member separately from the output center axis;

plural connection members (e.g., a connection member 130 in embodiment) which each has one end (e.g., a ring portion 131 in embodiment) rotatably connected to the outer circumference of each eccentric disk about the first fulcrum and the other end (e.g., a tip portion 132 in embodiment) rotatably connected to the second fulcrum provided on the input member of the one-way clutch to thereby transmit the rotational movement given to the eccentric disk from the input shaft to the input member of the one-way clutch as the oscillating movement thereof; and a gear-ratio variable mechanism (e.g., a gear-ratio variable mechanism 112 in embodiment) which changes an oscillation angle of the oscillating movement transmitted to the input member of the one-way clutch from the eccentric disk by adjusting the eccentricity of the first fulcrum with respect to the input center axis to thereby change a gear ratio of transmitting the rotational power of the input shaft to the output member of the one-way clutch via the eccentric disk and the connection member, wherein the transmission mechanism is configured by a four bar linkage continuously variable transmission mechanism in which the eccentricity can be set to zero and the gear ratio can be set to infinity, wherein an output shaft (e.g., an output shaft S1 in embodiment) of the internal combustion engine portion is connected to an input shaft of the continuously variable transmission mechanism, wherein a one-way clutch which is a component of the continuously variable transmission mechanism also serves as the one-way clutch which is provided between the transmission mechanism and the driving target member, and wherein the clutch mechanism controller makes the clutch mechanism enter ON state when the determination unit determines that the vehicle-backward-movement prevention control is required, and makes the clutch mechanism enter OFF state when the determination unit determines that the vehicle-backward-movement prevention control is not required.

Claim 2 defines, based on Claim 1, the system, wherein, after the clutch mechanism enters ON state and the vehicle starts on an uphill, the clutch mechanism controller maintains a state where the clutch mechanism enters ON state in a case of making a driving force of the internal combustion engine portion be transmitted to the driving target member via the transmission mechanism for running of the vehicle, and the clutch mechanism controller switches the clutch mechanism from ON state to OFF state in a case of making the driving force of the internal combustion engine portion not be transmitted to the driving target member via the transmission mechanism.

Claim 3 defines, based on Claim 1, the system, wherein a first internal combustion engine portion and a second internal combustion engine portion which independently generate the rotational power respectively are provided as the internal combustion engine portion, wherein a first transmission mechanism and a second transmission mechanism which shift and output the rotational power generated in the first internal combustion engine portion and the second internal combustion engine portion respectively are provided as the transmission mechanism, wherein a first one-way clutch and a second one-way clutch are provided on each output portion of the first transmission mechanism and the second transmission mechanism, respectively, as the one-way clutch, wherein the driving target member is connected to both output members of the first one-way clutch and the second one-way clutch in common, wherein a first clutch mechanism and a second clutch mechanism are provided between each output member of the first one-way clutch and the second one-way clutch and the driving target member respectively, as the clutch mechanism, wherein the first transmission mechanism and the second transmission mechanism are configured by the four bar linkage continuously variable transmission mechanism respectively, the output shafts of the first internal combustion engine portion and the second internal combustion engine portion are connected to the input shaft of each continuously variable transmission mechanism, and a one-way clutch which is a component of each continuously variable transmission mechanism also serves as the first one-way clutch and the second one-way clutch which are provided between each transmission mechanism and the driving target member, and wherein the clutch mechanism controller makes only one clutch mechanism of the first clutch mechanism and the second clutch mechanism enter ON state and makes the other clutch mechanism enter OFF state when the determination unit determines that the vehicle-backward-movement prevention control is required.

Claim 4 defines, based on Claim 3, the system, wherein a motor/generator (e.g., a sub motor/generator MG2 in embodiment) is connected to an output shaft of the first internal combustion engine portion, and wherein the clutch mechanism controller makes the second clutch mechanism enter ON state and the first clutch mechanism enter OFF state when electricity is generated by the motor/generator using the driving force of the first internal combustion engine portion while the vehicle stops or immediately after the vehicle starts.

Claim 5 defines, based on Claim 3, the system, wherein a motor/generator is connected to an output shaft of the first internal combustion engine portion, and wherein the clutch mechanism controller sets the gear ratio of the first transmission mechanism to infinity, makes the first clutch mechanism enter ON state, and makes the second clutch mechanism enter OFF state when electricity is generated by the motor/generator using the driving force of the first internal combustion engine portion while the vehicle stops or immediately after the vehicle starts.

Claim 6 defines a control method for a vehicle driving system, the system including:

an internal combustion engine portion which generates a rotational power;

a transmission mechanism which shifts the rotational power generated in the internal combustion engine portion and outputs the shifted rotational power;

a one-way clutch which is provided in an output portion of the transmission mechanism, the one-way clutch including:
- an input member which receives the rotational power from the transmission mechanism;
- an output member; and
- an engagement member which makes the input member and the output member enter a locked state or a non-locked state, in which the input member and the output member enter the locked state when positive rotational speed of the input member exceeds the positive rotational speed of the output member to thereby transmit the rotational power of the input member to the output member;

a driving target member which is connected to the output member of the one-way clutch, and is rotatable integrally with a driving wheel to transmit the rotational power of the output member to the driving wheel; and a clutch mechanism which is interposed between the output member of the one-way clutch and the driving target member, and can transmit/disconnect power therebetween by being ON/OFF-controlled, wherein the transmission mechanism includes:

an input shaft which receives the rotational power to rotate around an input center axis;

plural first fulcrums which are provided in a circumferential direction around the input shaft at equal intervals, each first fulcrum being rotatable around the input center axis along with the input shaft while maintaining a variable eccentricity with respect to the input center axis;

plural eccentric disks which rotate around the input center axis to have the first fulcrums as the respective centers;

a one-way clutch which includes the output member which rotates around an output center axis separated from the input center axis, the input member which oscillates around the output center axis by receiving the rotational power from the outside, and the engagement member which makes the input member and the output member enter a locked state or a non-locked state with each other, transmits the rotational power of the input member to the output member when the positive rotational speed of the input member exceeds the positive rotational speed of the output member, and thereby converts the oscillating movement of the input member to the rotational movement of the output member;

a second fulcrum which is provided on the input member separately from the output center axis;

plural connection members which each has one end rotatably connected to the outer circumference of each eccentric disk about the first fulcrum and the other end rotatably connected to the second fulcrum provided on the input member of the one-way clutch to thereby transmit the rotational movement given to the eccentric disk from the input shaft to the input member of the one-way clutch as the oscillating movement thereof; and a gear-ratio variable mechanism which changes an oscillation angle of the oscillating movement transmitted to the input member of the one-way clutch from the eccentric disk by adjusting the eccentricity of the first fulcrum with respect to the input center axis to thereby change a gear ratio of transmitting the rotational power of the input shaft to the output member of the one-way clutch via the eccentric disk and the connection member, wherein the transmission mechanism is configured by a four bar linkage continuously variable transmission mechanism in which the eccentricity can be set to zero and the gear ratio can be set to infinity, wherein an output shaft of the internal combustion engine portion is connected to an input shaft of the continuously variable transmission mechanism, and wherein a one-way clutch which is a component of the continuously variable transmission mechanism also serves as the one-way clutch which is provided between the transmission mechanism and the driving target member, the control method including:

setting the clutch mechanism to ON state when a vehicle-backward-movement prevention control is required for a start on an uphill, and setting the clutch mechanism to OFF state when the vehicle-backward-movement prevention control is not required.

Advantages of Invention

According to Claims 1 and 6, since the four bar linkage continuously variable transmission mechanism, in which the rotation of the internal combustion engine portion is converted to the oscillating movement and the oscillating movement is extracted to the rotational movement again by the one-way clutch, is used as the transmission mechanism of the upstream side of the driving target member, due to the function of the structure of the transmission mechanism, the transmission of the movement in the reverse direction can be locked. Accordingly, if the clutch mechanism which is provided between the driving target member and the output member of the one-way clutch enters ON state and the driving target member and the output member of the one-way clutch are connected to each other so as to transmit the power, the function which locks the transmission of the movement in the reverse direction can be operated, and the rotation regulation (lock) of the driving target member can be performed. If the clutch mechanism enters OFF state and the driving target member and the output member of the one-way clutch are separated from each other, the rotation regulation of the driving target member due to the transmission mechanism can be released.

Thereby, when the vehicle-backward-movement prevention control (hill hold assist) is required for the start on an uphill (e.g., when the vehicle starts on an uphill road of a high gradient), the clutch mechanism enters ON state, and thereby, the rotation regulation of the driving target member is operated, and the backward movement at the time of the starting is prevented. When the vehicle-backward-movement prevention control (hill hold assist) is not required (e.g., when the vehicle starts on an uphill road of a low gradient), the clutch mechanism enters OFF state, and thereby, the upstream side of the clutch mechanism is separated from the downstream side, and friction loss of the upstream side of the clutch mechanism at the time of the starting is decreased.

In this way, since a backward movement of the vehicle can be mechanically limited due to the characteristics of the structure of the transmission mechanism, a complicated control for performing the hill hold assist using the brake and the like is not required, and easiness of the control can be improved.

According to Claim 2, when the vehicle is run by the power of the internal combustion engine portion after the clutch mechanism enters ON state and the vehicle starts on an uphill, since the state where the clutch mechanism is ON state is maintained, the time for switching to ON state of the clutch mechanism again after the clutch mechanism enters OFF state can be reduced. That is, in general, when the power of the internal combustion engine portion is directly used for the running, it is necessary to make the clutch mechanism enter ON state. However, when the clutch mechanism enters ON state for operating a hill hold assist function, the operation in which the clutch mechanism is switched from OFF state to ON state is not needed due to the fact that the ON state of the clutch mechanism is continued. Thereby, the time for making the clutch mechanism enter ON state again can be reduced, and a smooth driving is possible. When the power of the internal combustion engine portion is not used for running power, the clutch mechanism which has entered ON state at the time of the starting enters OFF state. Thereby, the friction of the upstream side of the clutch mechanism can be immediately decreased, and energy loss can be decreased.

According to Claim 3, when a power system which has the internal combustion engine portion as the main component is two systems, it is possible to prevent the friction loss from being equal to or more than necessary by making the clutch mechanism of the other power system enter OFF state while exerting the hill hold assist function by making the clutch system of only one power system enter ON state.

According to Claim 4, by making the first clutch mechanism which is positioned on the downstream side of the first internal combustion engine portion enter OFF state, the driving force of the first internal combustion engine portion cannot be transmitted to the driving target member (axle shaft side). Moreover, the hill hold assist function can be operated by making the second clutch mechanism enter ON state. Accordingly, the hill hold assist function can be used while electricity is generated by the first internal combustion engine portion.

According to Claim 5, the hill hold assist function can be operated by making the first clutch mechanism which is positioned on the downstream side of the first internal combustion engine portion enter ON state. At this time, the power of the first internal combustion engine portion cannot be transmitted to the driving target member by setting the gear ratio of the first transmission mechanism which is connected to the first internal combustion engine portion to infinity. Accordingly, the rotational power of the first internal combustion engine portion can be immediately transmitted to the driving target member by increasing the rotational speed of the first internal combustion engine portion while changing the gear ratio from this step. That is, when switching is carried out from a series driving to an engine running which uses the driving force of the first internal combustion engine portion, a smooth switching is possible.

BRIEF DESCRIPTION OF DRAWINGS

FIGS. 4A to 4D show a first half of a gear-ratio-change principle of a gear-ratio variable mechanism in the transmission mechanism, FIG. 4A shows a state where an eccentricity r1 of a first fulcrum O3 which is a center point of an eccentric disk 104 is set to be "large" and a gear ratio i is set to be "small" with respect to an input center axis O1 which is a rotation center, FIG. 4B shows a state where the eccentricity r1 is set to be "middle" and the gear ratio i is set to be "middle", FIG. 4C shows a state where the eccentricity r1 is set to be "small" and the gear ratio i is set to be "large", and FIG. 4D shows a state where the eccentricity r1 is set to be "zero" and the gear ratio is set to be "infinity (∞)".

FIG. 5A shows a state where the oscillation angle θ2 of the input member 122 is "large" by setting the eccentricity r1 to be "large" and the gear ratio i to be "small", FIG. 5B shows a state where the oscillation angle θ2 of the input member 122 is "middle" by setting the eccentricity r1 to be "middle" and the gear ratio to be "middle", and FIG. 5C shows a state where the oscillation angle θ2 of the input member 122 is "small" by setting the eccentricity r1 to be "small" and the gear ratio i to be "large".

DESCRIPTION OF EMBODIMENTS

Hereinafter, an embodiment of the present invention will be described with reference to the drawings.

Figure 1:
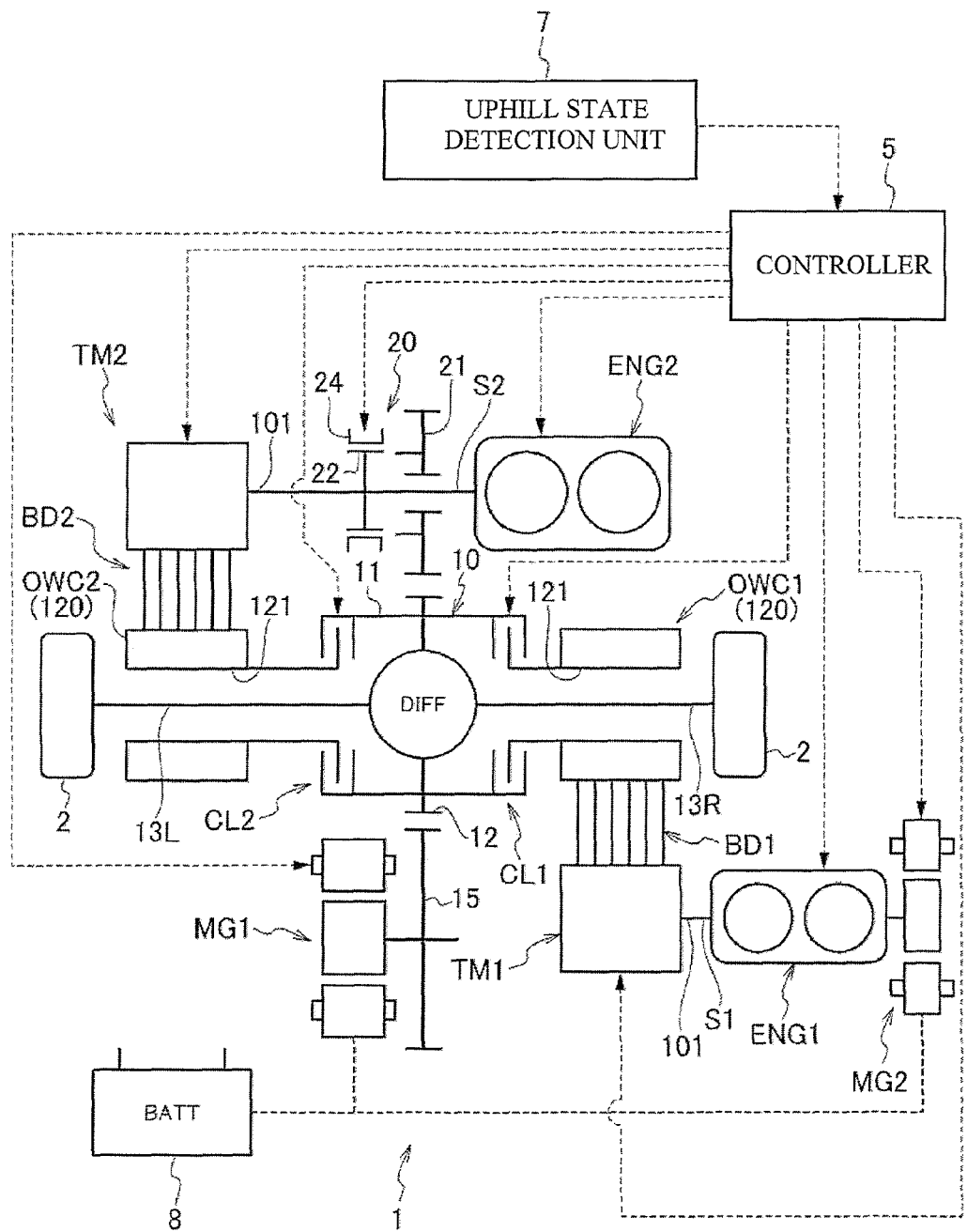
FIG. 1 shows a vehicle driving system of an embodiment of the present invention in a skeleton manner.
Figure 2:
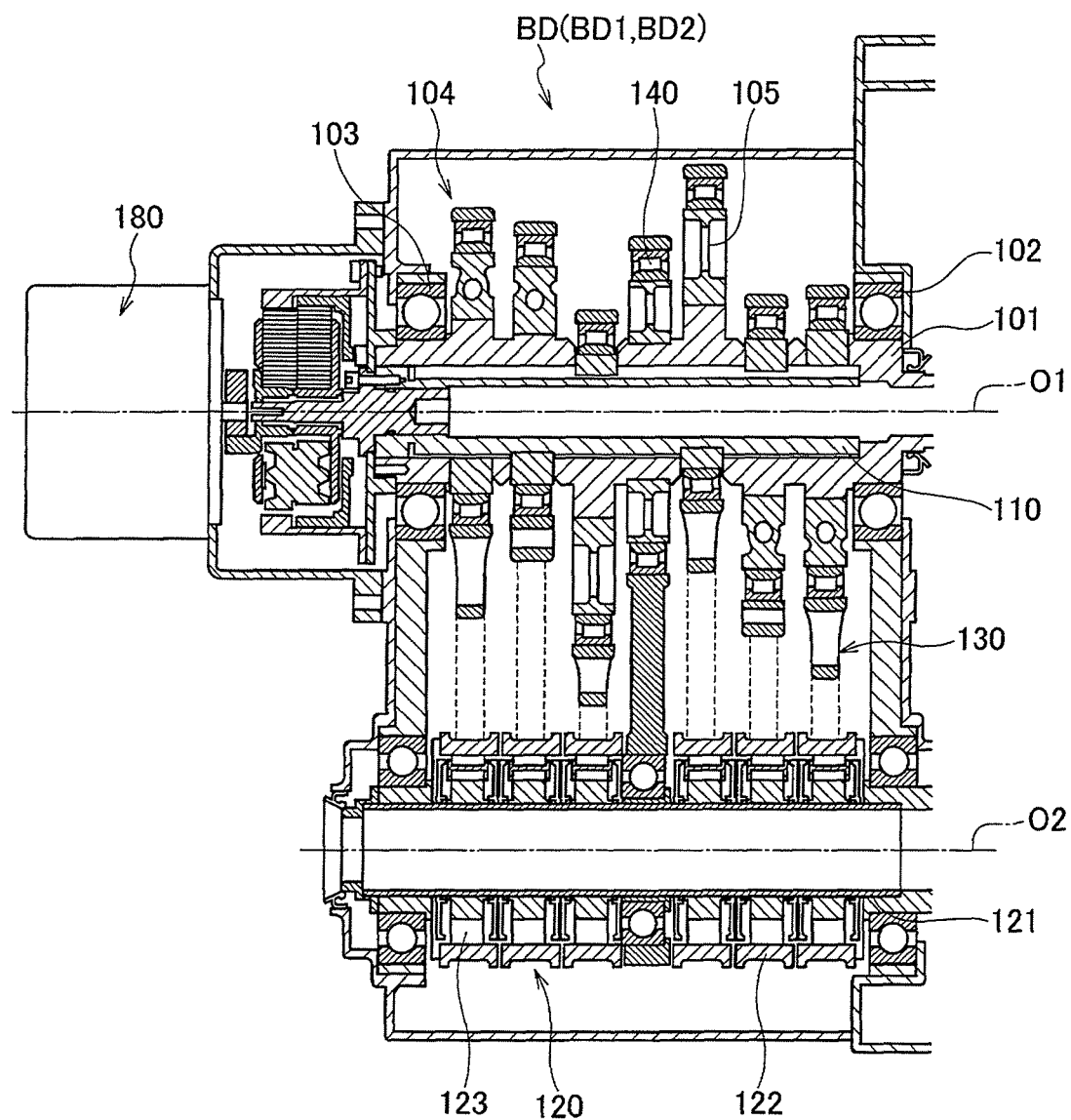
FIG. 2 cross-sectionally shows an infinite continuously variable transmission mechanism which is a major portion of the system.
Figure 3:
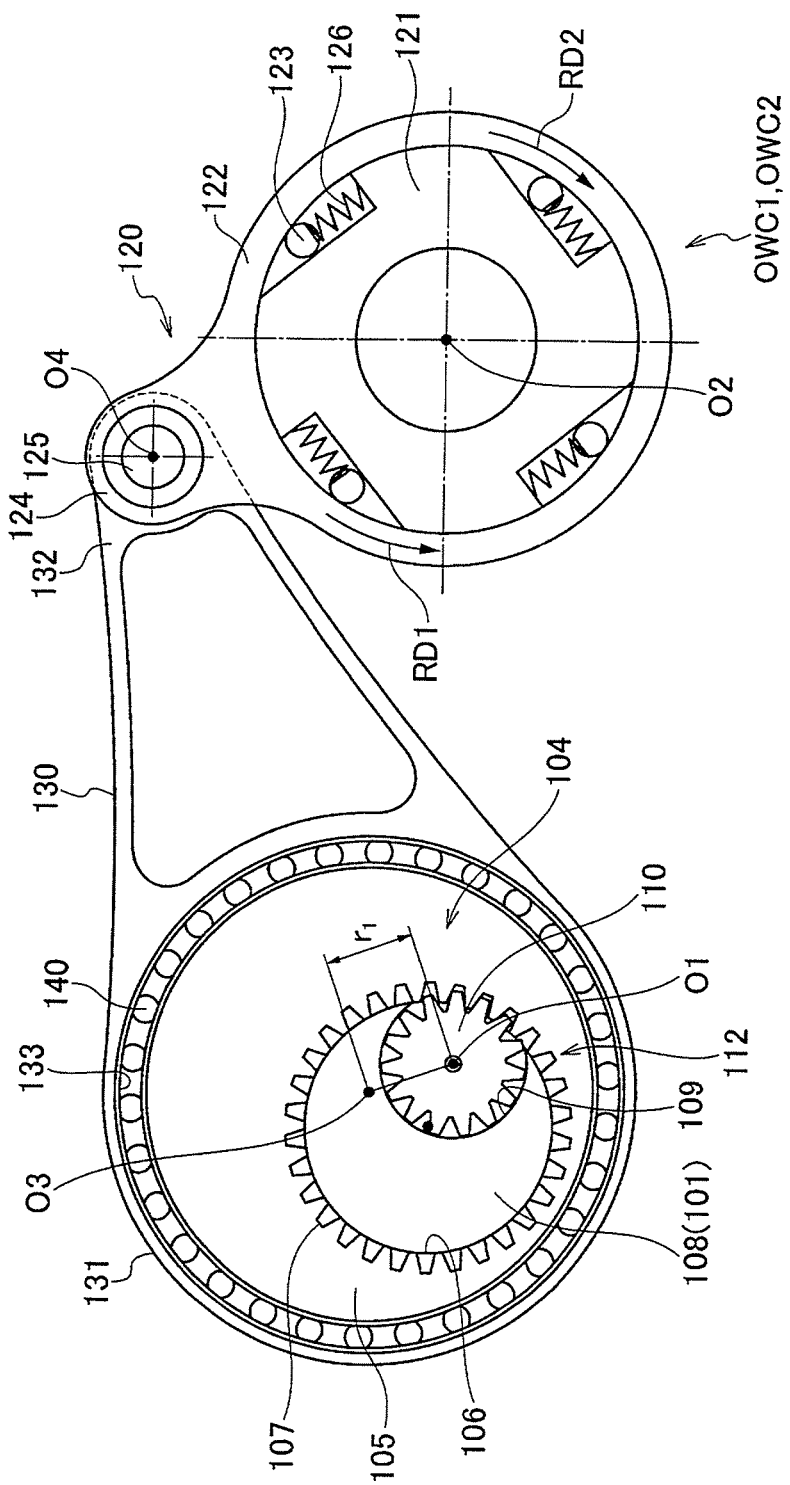
FIG. 3 cross-sectionally shows a part of the transmission mechanism from an axial direction.

FIG. 1 shows a vehicle driving system of an embodiment of the present invention in a skeleton manner, FIG. 2 cross-sectionally shows an infinite continuously variable transmission mechanism which is a major portion of the driving system, and FIG. 3 cross-sectionally shows a part of the infinite continuously variable transmission mechanism from an axial direction.

<<Overall Configuration>>

The vehicle driving system 1 includes first and second engines ENG1 and ENG2 as first and second internal combustion engine portions which respectively generate the rotational power, two first and second transmissions (transmission mechanism) TM1 and TM2 which are provided on each downstream side of the first and second engines ENG1 and ENG2, first and second one-way clutches OWC1 and OWC2 which are provided in an output portion of each of the transmissions TM1 and TM2, a driving target member 11 which receives the output rotation transmitted via the one-way clutches OWC1 and OWC2, a main motor/generator MG1 which is connected to the driving target member 11, a sub motor/generator MG2 which is connected to an output shaft S1 of the first engine ENG1, a battery 8 which can supply and receive electric power between the main and sub motor/generators MG1 and MG2 and a controller 5 for performing controls such as a starting pattern or a running pattern of a vehicle by controlling various elements.

Each of the one-way clutches OWC1 and OWC2 includes an input member (clutch outer) 122, an output member (clutch inner) 121, plural rollers (engagement member) 123 which are disposed between the input member 122 and the output member 121 and make both members 121 and 122 enter a locked state or an unlocked state with each other, and a biasing member 126 which biases the roller 123 in a direction which enters the locked state. The input member 122 and the output member 121 enter the locked state with each other when positive (a direction in an arrow RD1) rotational speed of the input member 122 which receives each rotational power from the first transmission TM1 and the second transmission TM2 exceeds the positive rotational speed of the output member 121, and thereby, the rotational power which is input to the input member 122 is transmitted to the output member 121.

The first and second one-way clutches OWC1 and OWC2 are disposed in the left and right while interposing a differential device 10, and each output member 121 of the first and second one-way clutches OWC1 and OWC2 are connected to the driving target member 11 in common via first and second clutch mechanism CL1 and CL2 which are different from each other. The first and second clutch mechanisms CL1 and CL2 are provided for controlling transmission/disconnection of the power between each output member 121 of the first and second one-way clutches OWC1 and OWC2 and the driving target member 11, a state where the power can be transmitted is reached at the time of ON, and a state where the power is disconnected is reached at the time of OFF. Other kinds of clutch (friction clutch or the like) may be used as the clutch mechanisms CL1 and CL2. However, due to the lower transmission loss, a dog clutch is used.

The driving target member 11 is configured by a differential case of the differential device 10, and the rotational power which is transmitted to the output member 121 of each of the one-way clutches OWC1 and OWC2 is transmitted to left and right driving wheels 2 via the differential device 10 and left and right axle shafts 13L and 13R. A differential pinion or a side gear (all not shown) is mounted on the differential case (driving target member 11) of the differential device 10, the left and right axle shafts 13L and 13R are connected to left and right side gears, and the left and right axle shafts 13L and 13R are differentially rotated.

Engines in which operation points of high efficiency are different from each other are used for two first and second engines ENG1 and ENG2, the first engine ENG1 is configured by an engine having a small displacement, and the second engine ENG2 is configured by an engine having a larger displacement than that of the first engine ENG1. For example, the displacement of the first engine ENG1 is 500 cc, the displacement of the second engine ENG2 is 1000 cc, and the total displacement is 1500 cc. Of course, the combination of the displacements may be carried out arbitrarily.

A drive gear 15 which is mounted on the output shaft of the main motor/generator MG1 and a driven gear 12 which is provided in the driving target member 11 are engaged with each other, and thereby, the main motor/generator MG1 and the driving target member 11 are connected to each other so as to transmit the power. For example, when the main motor/generator MG1 functions as a motor, a driving force is transmitted from the main motor/generator MG1 to the driving target member 11. When the main motor/generator MG1 functions as a generator, power is input from the driving target member 11 to the main motor/generator MG1, and mechanical energy is converted to electric energy. At the same time, a regenerative braking force from the main motor/generator MG1 acts on the driving target member 11.

The sub motor/generator MG2 is directly connected to the output shaft S1 of the first engine ENG1, and performs mutual transmission of power between the sub motor/generator MG2 and the output shaft S1. Also in this case, when the sub motor/generator MG2 functions as a motor, a driving force is transmitted from the sub motor/generator MG1 to the output shaft S1 of the first engine ENG1. When the sub motor/generator MG2 functions as a generator, power is transmitted from the output shaft S1 of the first engine ENG1 to the sub motor/generator MG2.

In the driving system 1 which includes the above-described components, the rotational power which is generated in the first engine ENG1 and the second engine ENG2 is input to the first one-way clutch OWC1 and the second one-way clutch OWC2 via the first transmission TM1 and the second transmission TM2, and the rotational power is input to the driving target member 11 via the first one-way clutch OWC1 and the second one-way clutch OWC2.

In the driving system 1, a synchronization mechanism (starter clutch) 20 which can connect and disconnect power transmission which is different from the power transmission via the second transmission TM2 between the output shaft S2 and the driving target member 11 is provided between the output shaft S2 of the second engine ENG2 and the driving target member 11. The synchronization mechanism 20 includes a first gear 21 which always engages with the driven gear 12 provided in the driving target member 11 and is provided so as to rotate around the output shaft S2 of the second engine ENG2, a second gear 22 which is provided so as to rotate integrally with the output shaft S2 around the output shaft S2 of the second engine ENG2, and a sleeve 24 which is slidably operated in the axial direction and thus, connects or releases the first gear 21 and the second gear 22. That is, the synchronization mechanism 20 configures a power transmission path which is different from the power transmission path via the second transmission TM2 and the clutch mechanism CL2, and connects and disconnects the power transmission in the power transmission path.

<<Configuration of Transmission>>

Next, two first and second transmissions TM1 and TM2 which are used in the driving system 1 will be described.

The first and second transmissions TM1 and TM2 are configured by continuously variable transmission mechanisms which have substantially the same configuration. The continuously variable transmission mechanism of this case is a kind of a transmission mechanism referred to as an IVT (Infinitely Variable Transmission=a transmission mechanism of a type in which a gear ratio is set to infinity without using a clutch and the output rotation can be zero) and is configured by an infinite continuously variable transmission mechanism BD (BD1 and BD2) in which the gear ratio (ratio=1) can be changed to be stepless and the maximum value of the gear ratio can be set to infinity ($\infty$).

As shown in FIGS. 2 and 3, the infinite continuously variable transmission mechanism BD includes an input shaft 101 which receives the rotational power of the engines ENG1 and ENG2 and thus, is rotated around the input center axis O1, plural eccentric disks 104 which rotate integrally with the input shaft 101, connection members 130 which are for connecting the input side and the output side and have the same number as the number of the eccentric disks 104, and the one-way clutch 120 which is provided in the output side.

The plural eccentric disks 104 are formed in a circular shape which has a first fulcrum O3 as the center respectively. The first fulcrums O3 are provided around the circumferential direction of the input shaft 101 at equal intervals, and each of the first fulcrums can change an eccentricity r1 with respect to the input center axis O1 and is set so as to rotate along with the input shaft 101 around the input center axis O1 while holding the eccentricity r1. Accordingly, the plural eccentric disks 104 are provided so as to eccentrically rotate according to the rotation of the input shaft 101 around the input center axis O1 in the state of holding each eccentricity r1.

As shown in FIG. 3, the eccentric disk 104 is configured by an outer circumferential side disk 105 and an inner circumferential side disk 108 which is integrally formed with the input shaft 101. The inner circumferential side disk 108 is formed of a thick disk in which the center is deviated by a constant eccentric distance with respect to the input center axis O1 which is a center axis of the input shaft 101. The outer circumferential side disk 105 is formed of a thick disk which has the first fulcrum O3 as the center and includes a first circular hole 106 which has the center at a position which deviates from the center (first fulcrum O3) of the outer circumferential side disk. The outer circumference of the inner circumferential side disk 108 is rotatably fitted to the inner circumference of the first circular hole 106.

A second circular hole 109 which has the input center axis O1 as the center and in which a portion in the circumferential direction is opened to the outer circumference of the inner circumferential side disk 108 is provided in the inner circumferential side disk 108, and a pinion 110 is rotatably accommodated in the inner portion of the second circular hole 109. The teeth of the pinion 110 engage with an internal gear 107, which is formed on the inner circumference of the first circular hole 106 of the outer circumferential side disk 105, through the opening of the outer circumference of the second circular hole 109.

The pinion 110 is provided so as to rotate coaxially with the input center axis O1 which is a center axis of the input shaft 101. That is, the rotation center of the pinion 110 coincides with the input center axis O1 which is the center axis of the input shaft 101. As shown FIG. 2, the pinion 110 is rotated in the inner portion of the second circular hole 109 by actuator 180 which is configured by a DC motor and a speed reduction mechanism. At a normal time, the pinion 110 is rotated synchronized with the rotation of the input shaft 101, rotational speed which exceeds or is less than the rotational speed of the input shaft 101 based on the synchronized rotational speed is applied to the pinion 110, and thereby, the pinion 110 is relatively rotated with respect to the input shaft 101. For example, when the pinion 110 and the output shaft of the actuator 180 are disposed so as to be connected to each other and the rotation of the actuator 180 has rotational differences with respect to the rotation of the input shaft 101, the relative rotation can be realized using a speed reduction mechanism (e.g., planetary gear) in which the relative angle of the input shaft 101 and the pinion 110 is changed by an extent in which a reduction ratio is multiplied by the rotational difference. At this time, the eccentricity r1 is not changed when the actuator 180 and the input shaft 101 exhibit no rotational difference and are synchronized with each other.

Accordingly, due to the rotation of the pinion 110, the internal gear 107 with which the teeth of the pinion 110 engage, that is, the outer circumferential side disk 105 is relatively rotated with respect to the inner circumferential side disk 108, and thereby, the distance (that is, the eccentricity r1 of the eccentric disk 104) between the center (input center axis O1) of the pinion 110 and the center (first fulcrum O3) of the outer circumferential side disk 105 is changed.

In this case, according to the rotation of the pinion 110, the center (first fulcrum O3) of the outer circumferential side disk 105 is set so as to coincide with the center (input center axis O1) of the pinion 110, and the eccentricity r1 of the eccentric disk 104 can be set to "zero" by the coincidence of both centers.

The one-way clutch 120 includes an output member (clutch inner) 121 which rotates around the output center axis O2 separated from the input center axis O1, a ring shaped input member (clutch outer) 122 which receives the rotational power from the outside and thus, oscillates around the output center axis O2, the plural rollers (engagement member) 123 which are inserted between the input member 122 and the output member 121 to make the input member 122 and the output member 121 enter the locked state or unlocked state with each other, and the biasing member 126 which biases the rollers 123 in a direction which provides the locked state, when positive (e.g., a direction shown by an arrow RD1 in FIG. 3) rotational speed of the input member 122 exceeds the positive rotational speed of the output member 121, the rotational power input to the input member 122 is transmitted to the output member 121, and thereby, the oscillating movement of the input member 122 can be converted to the rotational movement of the output member 121.

As shown in FIG. 2, the output member 121 of the one-way clutch 120 is configured by a member which is integrally continued in the axial direction. However, the input member 122 is divided into plural numbers, and there is a number of independent input members provided in the axial direction corresponding to the number of the eccentric disks 104 and the connection members 130 and arranged so as to be oscillated. The roller 123 is inserted between the input member 122 and the output member 121 for each input member 122.

A protrusion 124 is provided in one location in the circumferential direction on each of the ring-shaped input members 122, and a second fulcrum O4 which is separated from the output center axis O2 is provided in the protrusion 124. A pin 125 is disposed on the second fulcrum O4 of each input member 122, and the tip portion (other end) 132 of the connection member 130 is rotatably connected to the input member 122 by the pin 125.

One end side of the connection member 130 includes a ring portion 131, the inner circumference of a circular opening 133 of the ring portion 131 being rotatably fitted to the outer circumference of the eccentric disk 104 via a bearing 140. Accordingly, one end of the connection member 130 is rotatably connected to the outer circumference of the eccentric disk 104 and the other end of the connection member 130 is rotatably connected to the second fulcrum O4 which is provided on the input member 122 of the one-way clutch 120, and thereby, a four bar linkage mechanism which has four bars of the input center axis O1, the first fulcrum O3, the output center axis O2, and the second fulcrum O4 as the rotation point is configured. The rotational movement applied to the eccentric disk 104 from the input shaft 101 is transmitted as the oscillating movement of the input member 122 with respect to the input member 122 of the one-way clutch 120, and the oscillating movement of the input member 122 is converted to the rotational movement of the output member 121.

At this time, the actuator 180 moves the pinion 110 of a gear-ratio variable mechanism 112 which is configured by the pinion 110, the inner circumferential side disk 108 which includes the second circular hole 109 which accommodates the pinion 110, the outer circumferential side disk 105 which includes the first circular hole 106 which rotatably accommodates the inner circumferential side disk 108, the actuator 180, or the like, and thereby, the eccentricity r1 of the eccentric disk 104 can be changed. An oscillation angle θ2 of the input member 122 of the one-way clutch 120 can be changed by changing the eccentricity r1, and thereby, the ratio (gear ratio:ratio i) of the rotational speed of the output member 121 with respect to the rotational speed of the input shaft 101 can be changed. That is, the oscillation angle θ2 of the oscillating movement which is transmitted to the input member 122 of the one-way clutch 120 from the eccentric disk 104 is changed by adjusting the eccentricity r1 of the first fulcrum O3 with respect to the input center axis O1, and thereby, the gear ratio can be changed when the rotational power which is input to the input shaft 101 is transmitted to the output member 121 of the one-way clutch 120 as the rotational power via the eccentric disk 104 and the connection member 130.

In this case, the output shafts S1 and S2 of the first and second engines ENG1 and ENG2 are integrally connected to the input shaft 101 of the infinite continuously variable transmission mechanism BD (BD1 and BD2). The one-way clutch 120 which is a component of the infinite continuously variable transmission mechanism BD (BD1 and BD2) also serves as the first one-way clutch OWC1 and the second one-way clutch OWC2 which are provided between the first transmission TM1 and the second transmission TM2 and the driving target member 11 respectively.

FIGS. 4A to 4D and 5A to 5C show a gear-ratio-change principle of the gear-ratio variable mechanism 112 in the infinite continuously variable transmission mechanism BD (BD1 and BD2). As shown in FIGS. 4A to 4D and 5A to 5C, the pinion 110 of the gear-ratio variable mechanism 112 is rotated and the outer circumferential side disk 105 is rotated with respect to the inner circumferential side disk 108, and thereby, the eccentricity r1 with respect to the input center axis O1 of the eccentric disk 104 (rotation center of the pinion 110) can be adjusted.

Figure 5A:
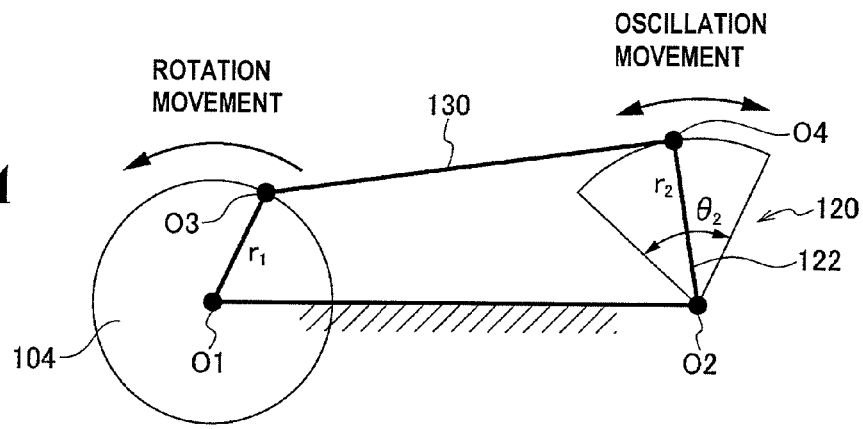
FIGS. 5A to 5C show a change of an oscillation angle θ2 of an input member 122 of a one-way clutch 120 when altering the eccentricity r1 of the eccentric disk and changing the gear ratio I, as a second half of the gear-ratio-change principle.
Figure 5B:
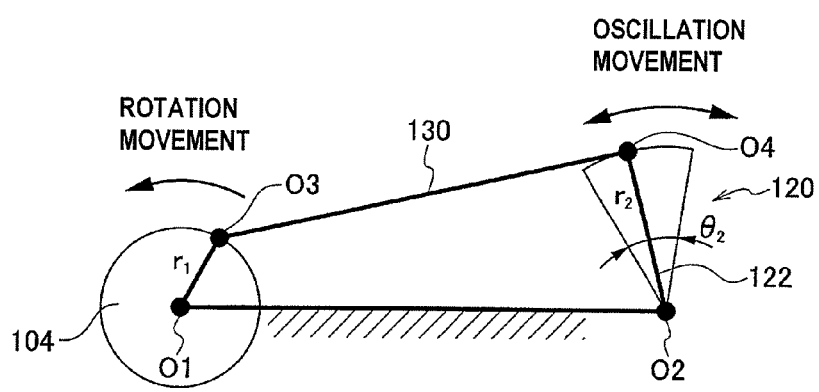
Figure 5C:
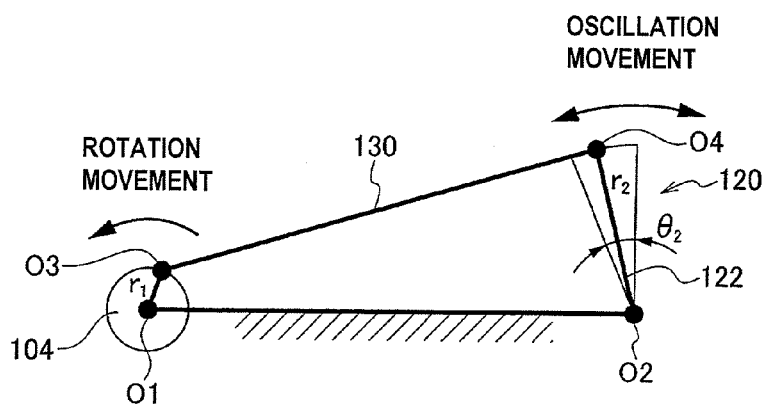

For example, as shown in FIGS. 4A and 5A, when the eccentricity r1 of the eccentric disk 104 is set to be "large", since the oscillation angle θ2 of the input member 122 of the one-way clutch 120 can be large, a small gear ratio i can be realized. As shown in FIGS. 4B and 5B, when the eccentricity r1 of the eccentric disk 104 is set to be "middle", since the oscillation angle θ2 of the input member 122 of the one-way clutch 120 can be "middle", a medium gear ratio i can be realized. As shown in FIGS. 4C and 5C, when the eccentricity r1 of the eccentric disk 104 is set to "small", since the oscillation angle θ2 of the input member 122 of the one-way clutch 120 can be small, a large gear ratio i can be realized. As shown FIG. 4D, when the eccentricity r1 of the eccentric disk 104 is set to "zero", since the oscillation angle θ2 of the input member 122 of the one-way clutch 120 can be "zero", the gear ratio i can be "infinity (∞)".

Figure 6:
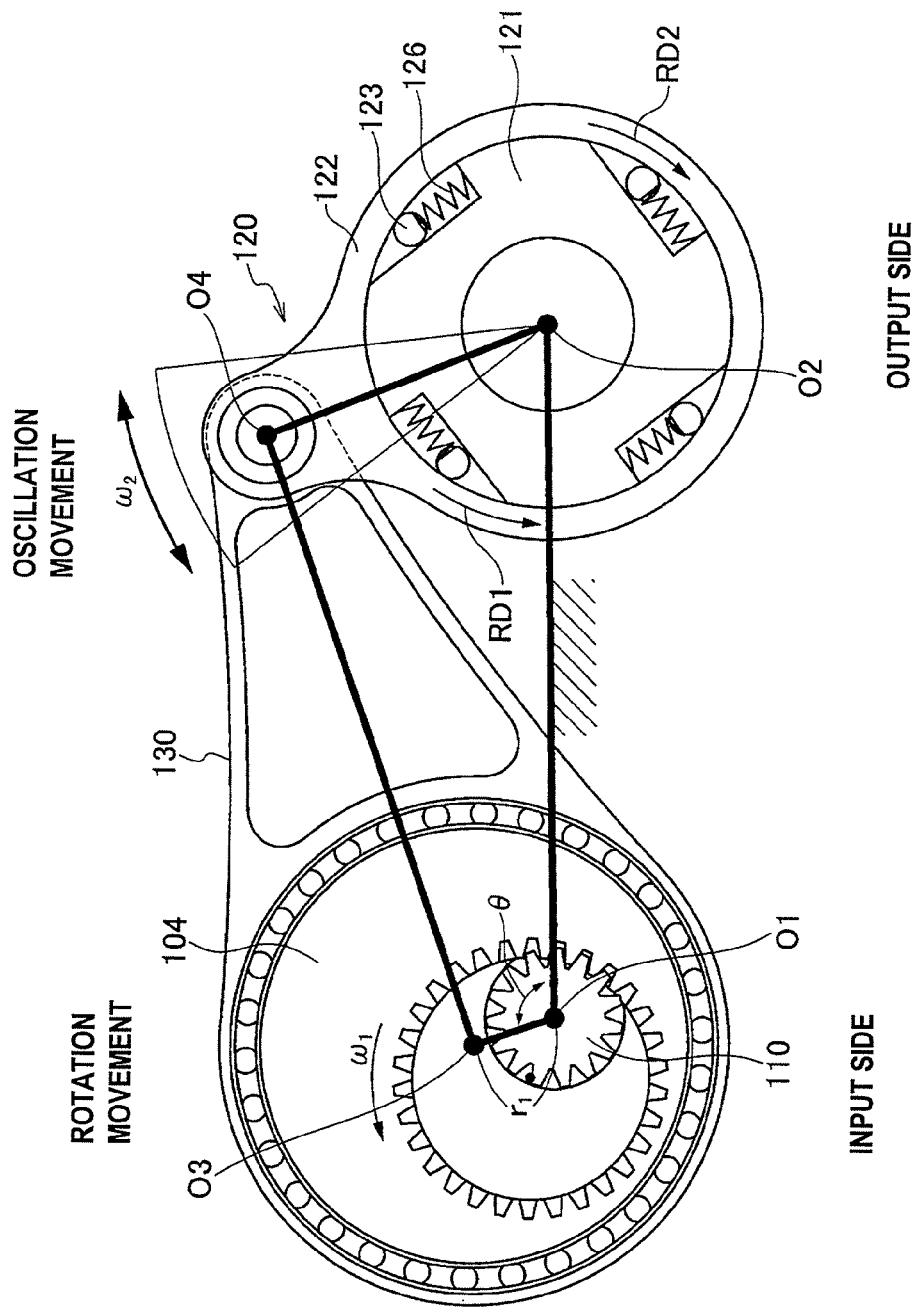
FIG. 6 shows a driving force transmission principle of the four bar linkage infinite continuously variable transmission mechanism.
Figure 7:
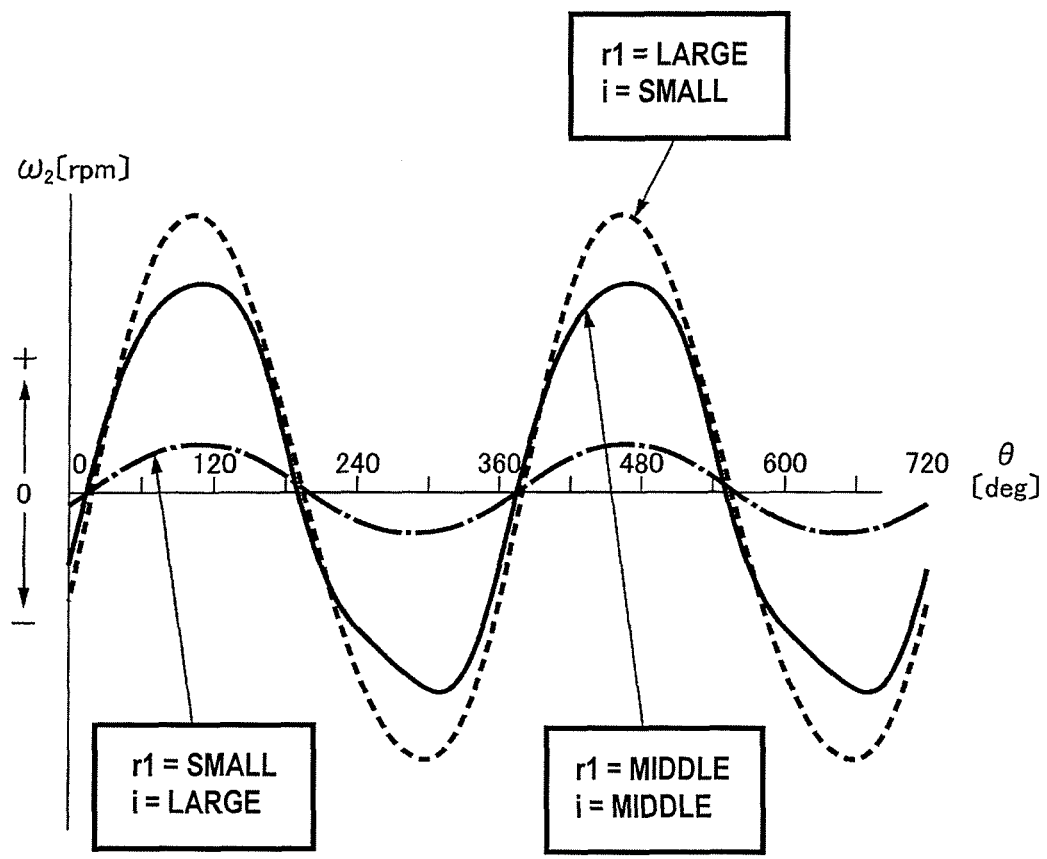
FIG. 7 shows a relationship between a rotation angle θ of the input shaft and angular velocity ω2 of the input member of the one-way clutch when the eccentricity r1 (gear ratio i) of the eccentric disk which rotates at the same rotational speed along with the input shaft is changed to be "large", "middle", and "small" in the transmission mechanism.
Figure 8:
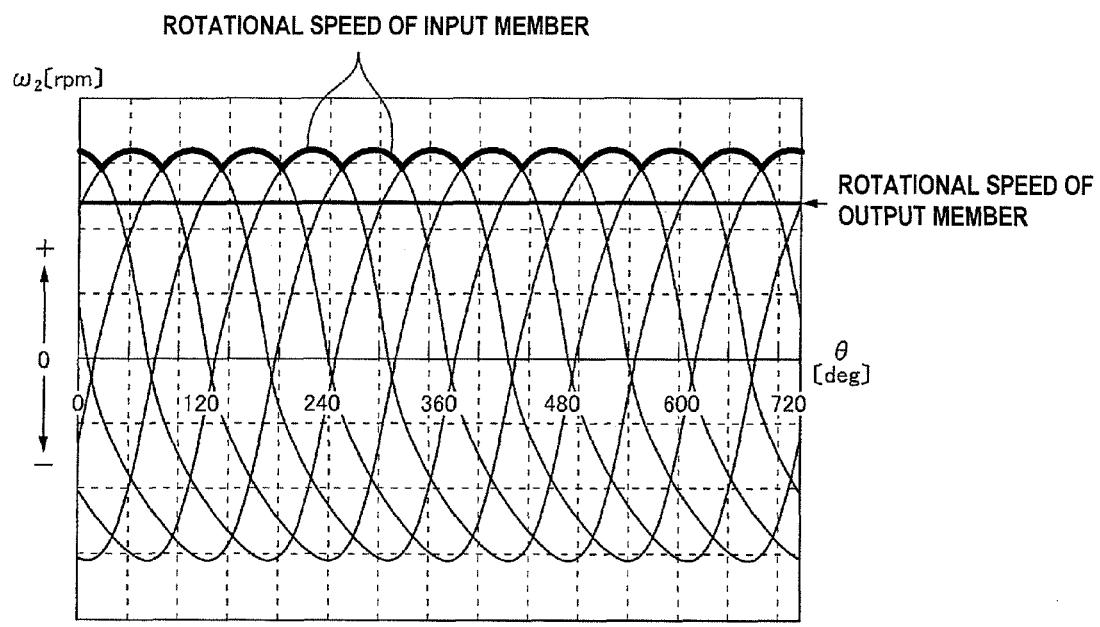
FIG. 8 shows an extraction principle of output when power is transmitted from an input side (input shaft or eccentric disk) to an output side (output member of one-way clutch) by plural connection members in the transmission mechanism.

FIG. 6 shows a driving force transmission principle of the four bar linkage infinite continuously variable transmission mechanism BD (BD1 and BD2), and FIG. 7 shows a relationship between a rotation angle (θ) of the input shaft 101 and angular velocity ω2 of the input member 122 of the one-way clutch 120 when the eccentricity r1 (gear ratio i) of the eccentric disk 104 which rotates at the same rotational speed along with the input shaft 101 is changed to be "large", "middle", and "small" in the transmission mechanism BD (BD1 and BD2), and FIG. 8 shows an extraction principle of output when power is transmitted from an input side (input shaft 101 or eccentric disk 104) to an output side (output member 121 of one-way clutch 120) by the plural connection members 130 in the transmission mechanism BD (BD1 and BD2).

As shown in FIG. 6, the input member 122 of the one-way clutch 120 receives power which is provided from the eccentric disk 104 via the connection member 130 and performs the oscillating movement. If the input shaft 101 which rotates the eccentric disk 104 is rotated once, the input member 122 of the one-way clutch 120 reciprocates and oscillates once. As shown in FIG. 7, an oscillation cycle of the input member 122 of the one-way clutch 120 always becomes constant regardless of the value of the eccentricity r1 of the eccentric disk 104. The oscillation angular velocity ω2 of the input member 122 is determined by the rotational angular velocity ω1 and the eccentricity r1 of the eccentric disk 104 (input shaft 101).

Since one end (ring portion 131) of the plural connection members 130 which connect the input shaft 101 and the one-way clutch 120 is rotatably connected to the eccentric disk 104 which is provided at equal intervals in the circumferential direction around the input center axis O1, as shown in FIG. 8, the oscillating movement which is generated in the input member 122 of the one-way clutch 120 by the rotational movement of each eccentric disk 104 is sequentially generated with constant phase.

At this time, the transmission of power (torque) from the input member 122 to the output member 121 of the one-way clutch 120 is performed only at a condition in which the positive (the direction of the arrow RD1 in FIG. 3) rotational speed of the input member 122 exceeds the positive rotational speed of the output member 121. That is, in the one-way clutch 120, engagement (lock) via the roller 123 is initially generated when the rotational speed of the input member 122 is higher than the rotational speed of the output member 121, the power of the input member 122 is transmitted to the output member 121 through the connection member 130, and a driving force is generated.

After the driving due to one connection member 130 ends, the rotational speed of the input member 122 is lower than the rotational speed of the output member 121, the lock due to the roller 123 is released by the driving force of other connection members 130, a free state (idling state) is reached again. Since this is sequentially performed by the number of the connection members 130, the oscillating movement is converted to the rotational movement in one direction. Thereby, only the power of the input member 122 having the timing which exceeds the rotational speed of the output member 121 is sequentially transmitted to the output member 121, and an approximately smoothly averaged rotational power can be provided to the output member 121.

In the four bar linkage infinite continuously variable transmission mechanism BD (BD1 and BD2), the gear ratio (ratio=the rotation extent of the driving target member according to one revolution of a crank shaft of an engine) can be determined by changing the eccentricity r1 of the eccentric disk 104. The gear ratio i can be infinity (∞) by setting the eccentricity r1 to zero, and the oscillation angle θ2 which is transmitted to the input member 122 can be zero even during the rotation of the engine. That is, even though the engine is rotated, the rotational speed of the output member 121 of the one-way clutch 120 can be zero.

In the four bar linkage infinite continuously variable transmission mechanism BD (BD1 and BD2), due to the structure, the following backward movement disabled state can be provided. For example, when the vehicle is moved backward, that is, when the driving target member 11 is to be rotated in the direction reverse to the forward movement, in the first and second one-way clutches OWC1 and OWC2, since the output member 121 which is connected to the driving target member 11 is rotated in a reverse direction (direction in an arrow RD2 in FIG. 3) with respect to a normal direction, the input member 122 and the output member 121 are engaged with each other via the roller 123.

Figure 9A:
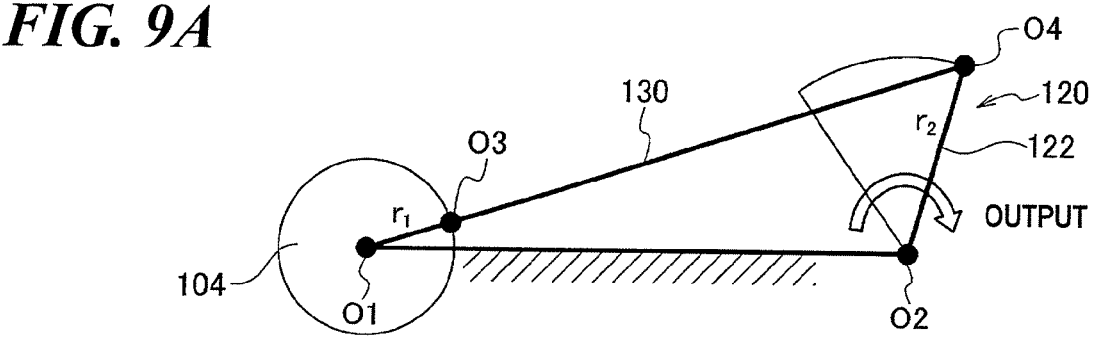
FIGS. 9A and 9B show a backward movement disabled state due to lock of the transmission.
Figure 9B:
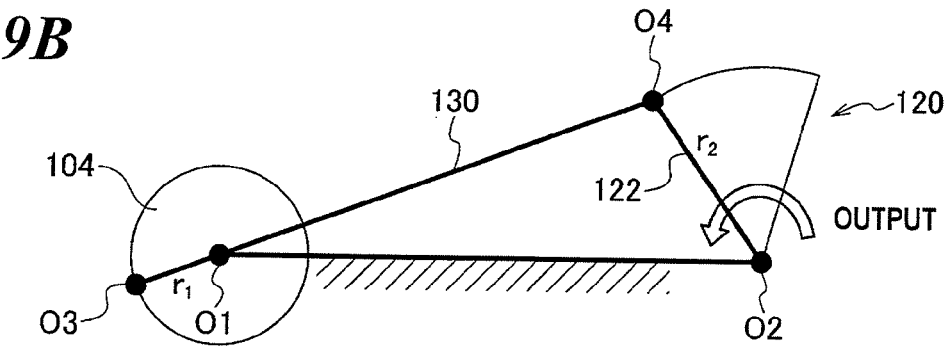

If the input member 122 and the output member 121 are engaged with each other, the rotational force in the reverse direction of the output member 121 acts on the input member 122. However, the input center axis O1 is positioned on the extended line of the connection member 130 shown in FIG. 9A, and if the connection member reaches the position in which the input center axis O1 and the second fulcrum O4 are the most apart from each other (alternatively, if the rotation direction reverse to the normal direction is the direction of the arrow RD1 in FIG. 3, the connection member 130 shown in FIG. 9B reaches the position in which the input center axis O1 and the second fulcrum O4 are the most close to each other through the input center axis O1), since the oscillating movement of the input member 122 is regulated due to the fact that the input member 122 is connected to the connection member 130, the transmission of the reverse direction movement equal to or more than the above is locked.

Accordingly, even when the output member 121 is reversely rotated, since the first and second transmissions TM1 and TM2 configured by the infinite continuously variable transmission mechanisms BD1 and BD2 are mechanically locked, the state where the backward movement cannot be carried out (backward movement disabled state) is produced. Since the function which does not allow the backward movement is effective when the clutch mechanisms CL1 and CL2 which are interposed between the one-way clutches OWC1 and OWC2 and the driving target member 11 enter ON state, when the vehicle is moved backward, it is necessary to make the clutch mechanisms CL1 and CL2 enter OFF state. In order to operate a hill hold assist function (function which prevents a backward movement) at the time of starting on an uphill, the backward movement disabled state is generated by making at least one of the clutch mechanisms CL1 and CL2 enter ON state. The control at the time of the starting on an uphill will be described below.

In the driving system 1, as shown in FIG. 1, an uphill state detection unit 7 which detects an uphill state of the vehicle is provided, and signals of the uphill state detection unit 7 are input to the controller 5. For example, as the uphill state detection unit 7, an inclination sensor which detects the inclination of the longitudinal direction of the vehicle is used, and the gradient of the uphill road is detected by signals of the inclination sensor. The gradient of the uphill road can be detected using position data of a GPS (Global Positioning System).

The controller 5 includes a clutch mechanism controller for control ON/OFF of two first and second clutch mechanisms CL1 and CL2 and a determination unit which detects whether or not the vehicle-backward-movement prevention control is needed according to the uphill state detected by the uphill state detection unit 7.

<<Main Operation of Controller>>

Next, control contents which are carried out in the driving system 1 will be described.

As shown in FIG. 1, the controller 5 sends control signals to the first and second engines ENG1 and ENG2, the main motor/generator MG1, the sub motor/generator MG2, the actuator 180 of the infinite continuously variable transmission mechanisms BD1 and BD2 which configure the first and second transmissions TM1 and TM2, the clutch mechanisms CL1 and CL2, the synchronization mechanism 20, or the like, controls the components, and thereby, performs various running pattern (also referred to as an operation pattern) controls.

For example, the controller 5 includes a function which selects and performs an EV running control mode which controls an EV running using only the driving force of the main motor/generator MG1, an engine running control mode which controls an engine running using only the driving force of the first engine ENG1 and/or the second engine ENG2, and a series running control mode which controls a series running (also referred to as a series driving) carrying out a motor running using the driving force of the main motor/generator MG1 while driving the sub motor/generator MG2 as a generator using the first engine ENG1 and supplying the generated electric power to the main motor/generator MG1 and/or the battery 8. A function which performs a parallel running mode which runs using both driving force of the main motor/generator MG1 and the driving force of the first engine ENG1 is also included. A function which selects and performs the EV running, the series running, the engine running, and the parallel running according to the required driving force and the remaining capacity (SOC) of the battery 8 is also included.

Here, the content of the clutch control which is carried out at the time of starting of the vehicle will be described.

Figure 10:
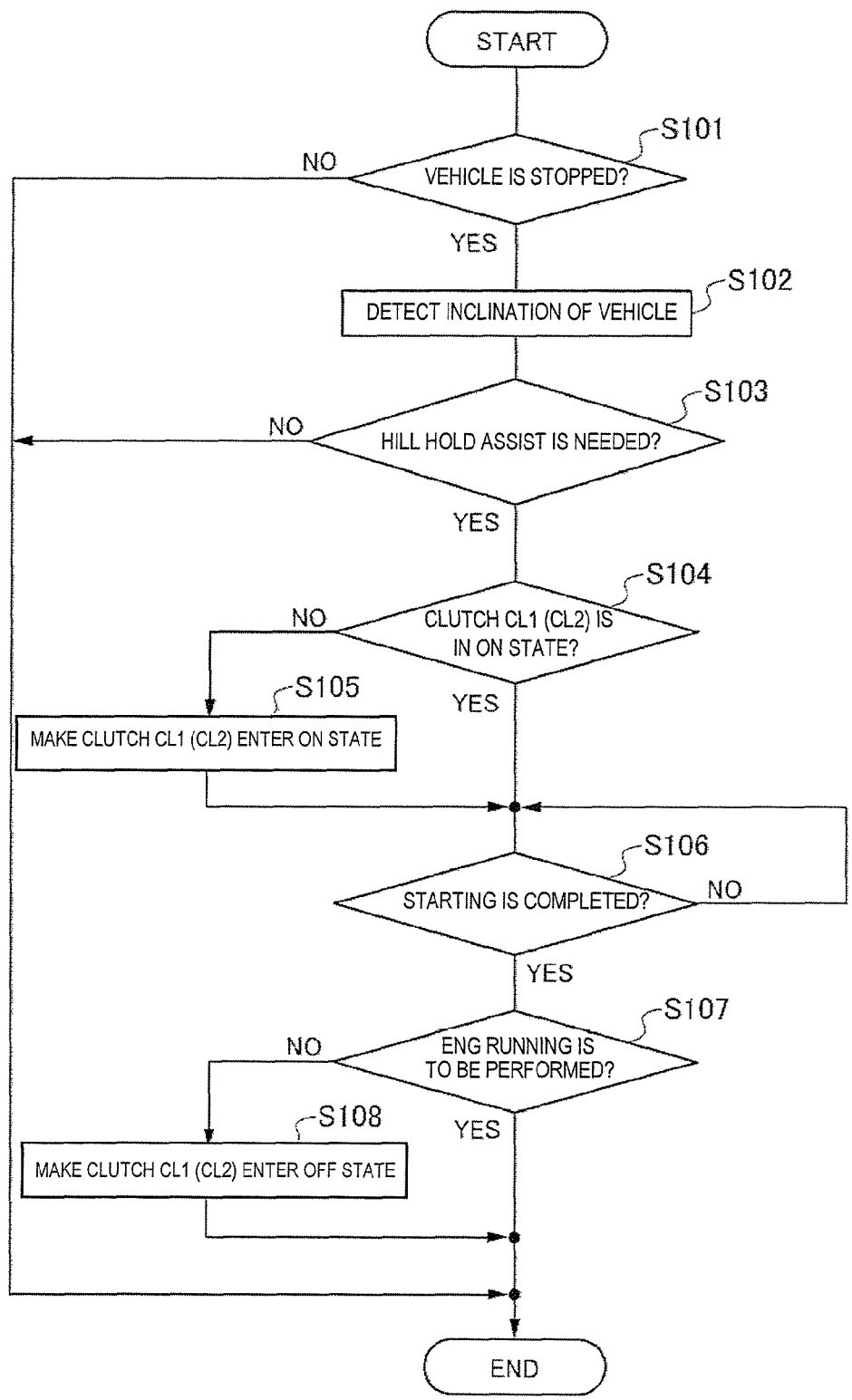
FIG. 10 shows a clutch control at the time of starting of a vehicle which is performed in the driving system.

The clutch control at the time of starting is carried out as shown in FIG. 10. If the control starts, it is determined whether or not the vehicle stops at an initial step S101. Whether or not the vehicle stops is determined by signals of a speed sensor, an acceleration sensor, brake, or the like. When the vehicle does not stop, it passes through the following process and the process ends.

When the vehicle stops, the process proceeds to a step S102, and an inclination detection of the vehicle is carried out. In a step S103, it is determined whether or not a hill hold assist is required according to the inclination condition of the vehicle. Specifically, when it is determined that the gradient of the uphill road is small or the road is a flat road, it is determined that the hill hold assist is not needed, and the process ends without the hill hold assist. On the other hand, when it is determined that the gradient of the uphill road is large, it is determined the hill hold assist is required, the process proceeds to next step S104, and whether or not the first clutch mechanism CL1 or the second clutch mechanism CL2 is in ON state is determined. When both clutch mechanisms are not in ON state, the first clutch mechanism CL1 or the second clutch mechanism CL2 enters ON state in a step S105. If the clutch mechanism CL1 or the clutch mechanism CL2 enters ON state, the process proceeds to a step S106. When the clutch mechanism CL1 or CL2 is in ON state at the time of the step S104, the process directly proceeds from the step S104 to the step S106.

In the step S106, whether or not the starting of the vehicle is completed is determined. The starting of the vehicle is carried out by a separate running control, and the process waits the completion of the starting and proceeds to a step S107. The completion of the starting is determined based on the speed or the acceleration of the vehicle. In the step S107, whether or not the engine running is to be performed is determined. In the case where the engine running is to be performed, when the clutch mechanisms CL1 and CL2 which are positioned on the downstream side of the engines ENG1 and ENG2 used in the running enter ON state for the starting of the hill hold, the ON state is maintained as it is and the process ends. When the engine running is to be performed, in a step S108, the clutch mechanisms CL1 and CL2 which have entered ON state at the time of starting are switched from ON state to OFF state, and the process ends.

The ON/OFF control of the first clutch mechanism CL1 and the second clutch mechanism CL2 due to difference of the running patterns at the time of the starting will be described below.

In the running after the starting, the clutch mechanisms CL1 and CL2 are held to a disconnected state (OFF) during the EV running. Thereby, there can be no dragging torque loss of the one-way clutches OWC1 and OWC2, and energy efficiency is improved.

In the driving system, the series running is carried out while the running mode is switched from the EV running to the engine running. Thereby, effective use of the engine energy can be improved while the running mode is shifted from the starting of the first engine ENG1 to the engine running. That is, the engine energy until the driving force is transmitted to the driving target member 11 after the engine starts performs the series running, and thus, the engine energy is supplied to the main motor/generator MG1 or the battery 8 as electric power and is effectively used. Therefore, the generated energy can be used up without waste, which can contribute to improvement of fuel consumption.

After the running mode is switched from the series running to the engine running, generation of electricity using the sub motor/generator MG2 is stopped. However, when the remaining capacity (SOC) of the battery 8 is less than or equal to a first predetermined value (reference value: for example, reference SOCt=35%) after the running mode is switched from the series running to the engine running, charging using the sub motor/generator MG2 (charging operation of the battery 8 due to the generation of electricity) is continued.

Next, when the starting of the second engine ENG2 is performed, for example, as one method, the gear ratio of the second transmission TM2 is controlled to a finite value (a value is close to a target value as possible) at which the power from the second engine ENG2 can be transmitted to second one-way clutch OWC2 (i≠∞) and in which the rotational speed of the input member 122 of the second one-way clutch OWC2 is less than the rotational speed of the output member 121. Alternatively, as other methods, when the starting of the second engine ENG2 is performed, the gear ratio of the second transmission TM2 is set to infinity (∞), and the rotational speed of the input member 122 of the second one-way clutch OWC2 is controlled so as to be less than the rotational speed of the output member 121. After the second engine ENG2 starts, the gear ratio of the second transmission TM2 is changed to the finite value (target value), and thereby, the rotational speed input to the second one-way clutch OWC2 is controlled.

Here, when the second engine ENG2 is started using the power of the driving target member 11 in the state where the vehicle runs using the first engine ENG1 or the driving force of the main motor/generator MG1, the synchronization mechanism 20 which is provided between the output shaft S2 of the second engine ENG2 and the driving target member 11 enters a connection state where the power can be transmitted, and thereby, cranking (start rotation) of the second engine ENG2 is performed using the power of the driving target member 11, and the second engine ENG2 is started.

When the second engine ENG2 is started and a drive source is switched from the first engine ENG1 to the second engine ENG2, the rotational speed of the second engine ENG2 and/or the gear ratio of the second transmission TM2 is changed so that the rotational speed input to the input member 122 of the second one-way clutch OWC2 exceeds the rotational speed of the output member 121 in a state where the power generated in the first engine ENG1 via the first one-way clutch OWC1 is input to the driving target member 11. Thereby, the engine which is used as the drive source can be smoothly switched from the first engine ENG1 to the second engine ENG2.

When the driving forces of both the first engine ENG1 and the second engine ENG2 are combined and the combined force is transmitted to the driving target member 11, a synchronous control which controls the rotational speed of the first and second engines ENG1 and ENG2 and/or the gear ratios of the first and second transmissions TM1 and TM2 are/is performed so that the rotational speed which is input to both input members 122 of the first one-way clutch OWC1 and the second one-way clutch OWC2 is synchronized together and exceeds the rotational speed of the output member 121.

In this case, at the time of acceleration, both engines ENG1 and ENG2 are not operated unconditionally, the output of the other engine (second engine ENG2) is increased in a state where one engine (first engine ENG1) is fixed to an operation point of high efficiency, and the output requirement is satisfied.

Specifically, when the rotational speed of the first and second engines ENG1 and ENG2 and/or the gear ratios of the first and second transmissions TM1 and TM2 are/is controlled so that the rotational speed input to the input members 122 of the first one-way clutch OWC1 and the second one-way clutch OWC2 exceeds the rotational speed of the output member 121, in a state where the operation condition is fixed to a constant range so that the rotational speed and/or the torque of the first engine ENG1 enter a high efficiency operation region, the first engine ENG1 and/or the first transmission TM1 are/is controlled, and with respect to the output demand exceeding the output obtained from the fixed operation condition, the second engine ENG2 and the second transmission TM2 are controlled and correspond to the output demand.

Alternatively, as a method different from the above-described method, the second engine ENG2 having a large displacement may be set to the fixed side of the operation condition according to the required output, for example, the first engine ENG1 may be set to the fixed side of the operation condition when the required output is equal to or more than a predetermined value, and the second engine ENG2 may be set to the fixed side of the operation condition when the required output is less than or equal to a predetermined value.

When the vehicle moves backward, the clutch mechanisms CL1 and CL2 enter the disconnected state and the backward movement disabled state is released due to the lock of the first and second transmissions TM1 and TM2.

<<Operation Pattern>>

Next, operation patterns which are performed in the driving system of the present embodiment will be described.

FIGS. 11 to 25 show operation patterns A to O are taken out and shown, and FIGS. 26 to 35 show control operations carried out according to each operating state or the control operation at the time of switching the running mode. Reference numerals A to O of the upper right in the frames showing each operation pattern of FIGS. 26 to 35 correspond to the reference numerals of the operation patterns A to O taken out and shown in FIGS. 11 to 25. In the drawings showing the operation patterns, the drive source during operation is shown and distinguished by hatching, and the transmission path of the power and the flow of the electric power are shown by an arrow such as a solid line or a dotted line.

Figure 11:
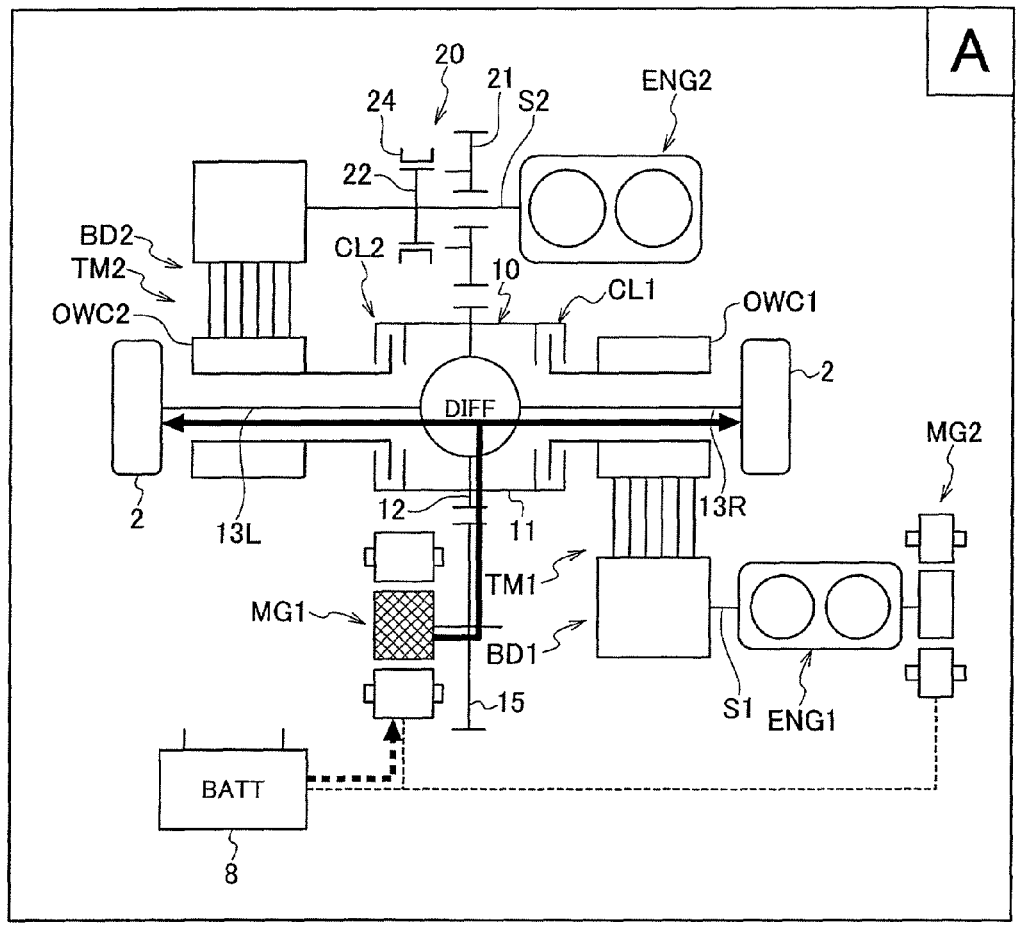
FIG. 11 shows an operation pattern A in the driving system.

In the operation pattern A shown in FIG. 11, the EV running is performed by the driving force of the main motor/generator MG1. That is, current flows from the battery 8 to the main motor/generator MG1, and thereby, the main motor/generator MG1 is driven, the driving force of the main motor/generator MG1 is transmitted to the driving target member 11 via the drive gear 15 and the driven gear 12 and is transmitted to the driving wheel 2 via the differential device 10 and the left and right axle shafts 13L and 13R, and the vehicle runs. At this time, the clutch mechanisms CL1 and CL2 are maintained in the disconnected state (OFF state).

Figure 12:
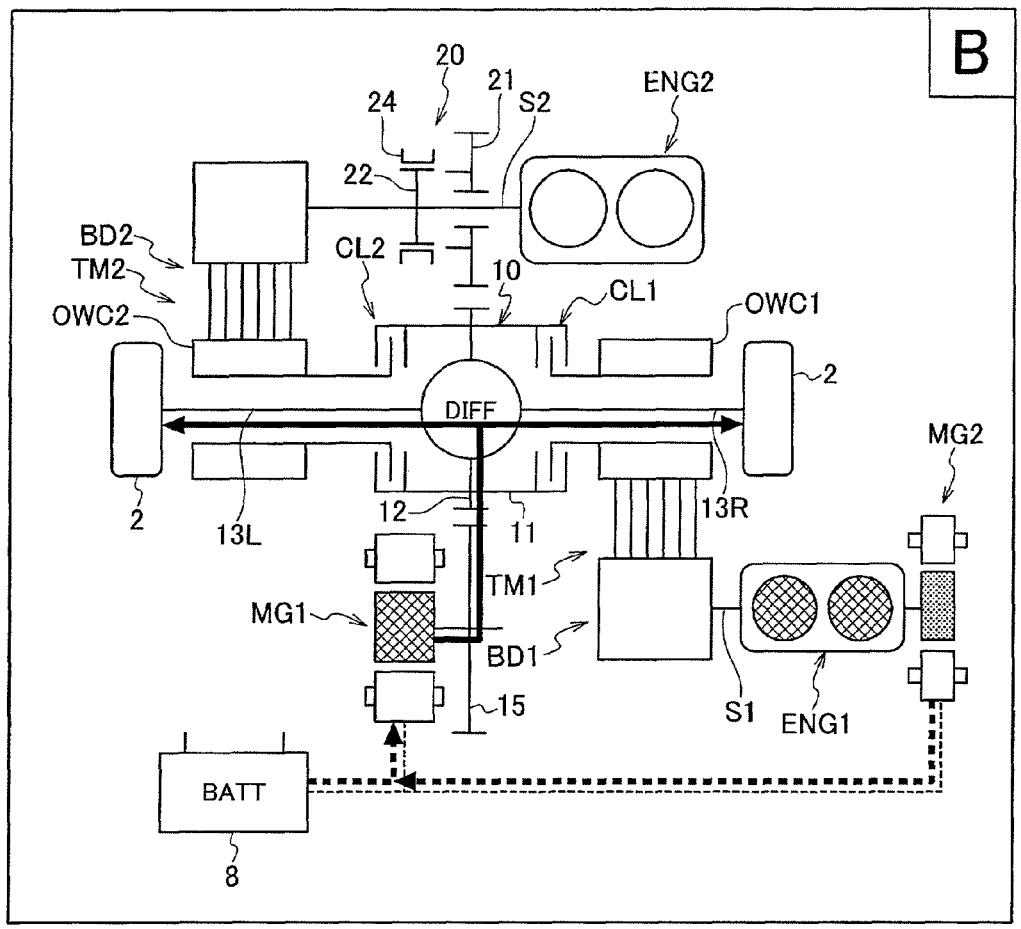
FIG. 12 shows an operation pattern B in the driving system.

In the operation pattern B shown in FIG. 12, electricity is generated by the sub motor/generator MG2 using the driving force of the first engine ENG1, the generated electric power is supplied to the main motor/generator MG1 and the battery 8, and the series running is carried out. The starting of the first engine ENG1 is carried out by the sub motor/generator MG2. At this time, the gear ratio of the first transmission TM1 is set to infinity.

Figure 13:
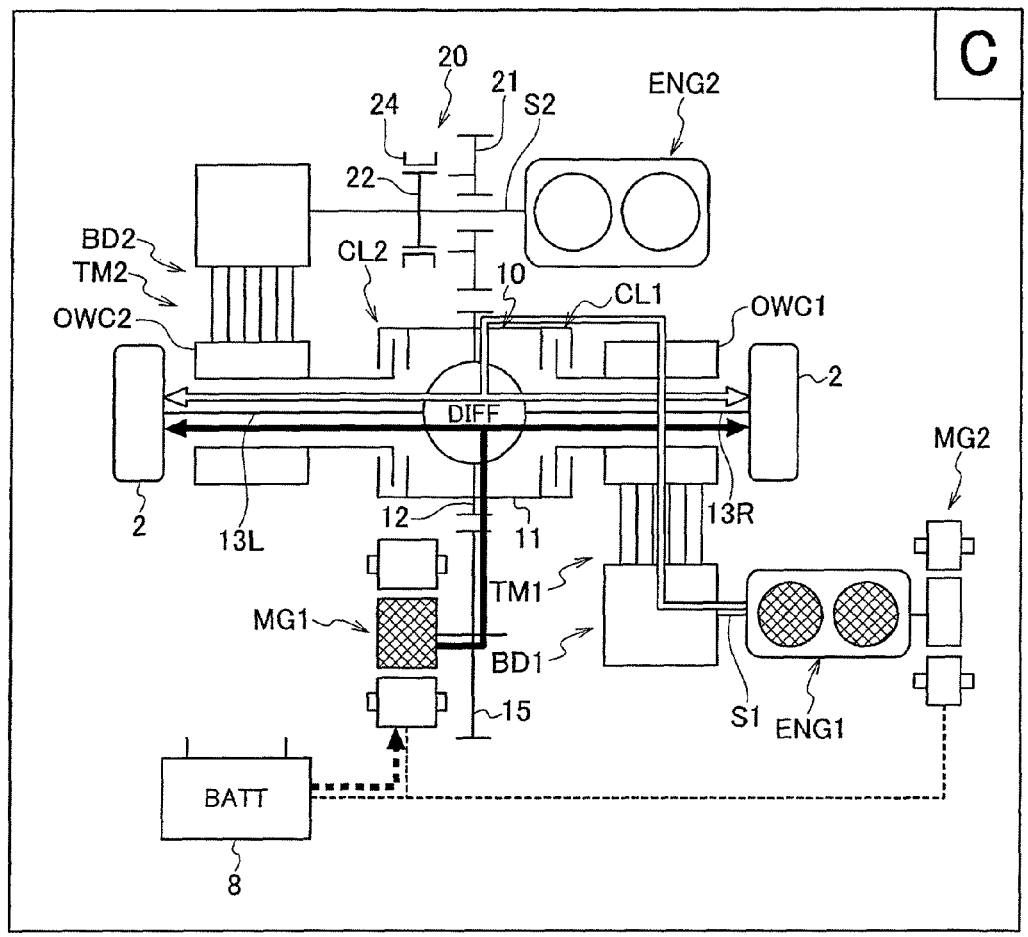
FIG. 13 shows an operation pattern C in the driving system.

In the operation pattern C shown in FIG. 13, the parallel running is carried out using the driving forces of both the main motor/generator MG1 and the first engine ENG1. In order to transmit the driving force of the first engine ENG1 to the driving target member 11, the rotational speed of the first engine ENG1 and/or the gear ratio of the first transmission TM1 are/is controlled so that the input rotational speed of the first one-way clutch OWC1 exceeds the output rotational speed. Thereby, the combined force of the driving force of the main motor/generator MG1 and the driving force of the first engine ENG1 can be transmitted to the driving target member 11. The operation pattern C is carried out in a case where the required driving force is large such as the time of acceleration or the like in a low-speed running or a middle speed running. At this time, the clutch mechanism CL1 is maintained in the connection state, and the clutch mechanism CL2 is maintained in the disconnected state. Thereby, the driving force of the first engine ENG1 is transmitted to the driving target member 11, and dragging of the second one-way clutch OWC2 is prevented.

Figure 14:
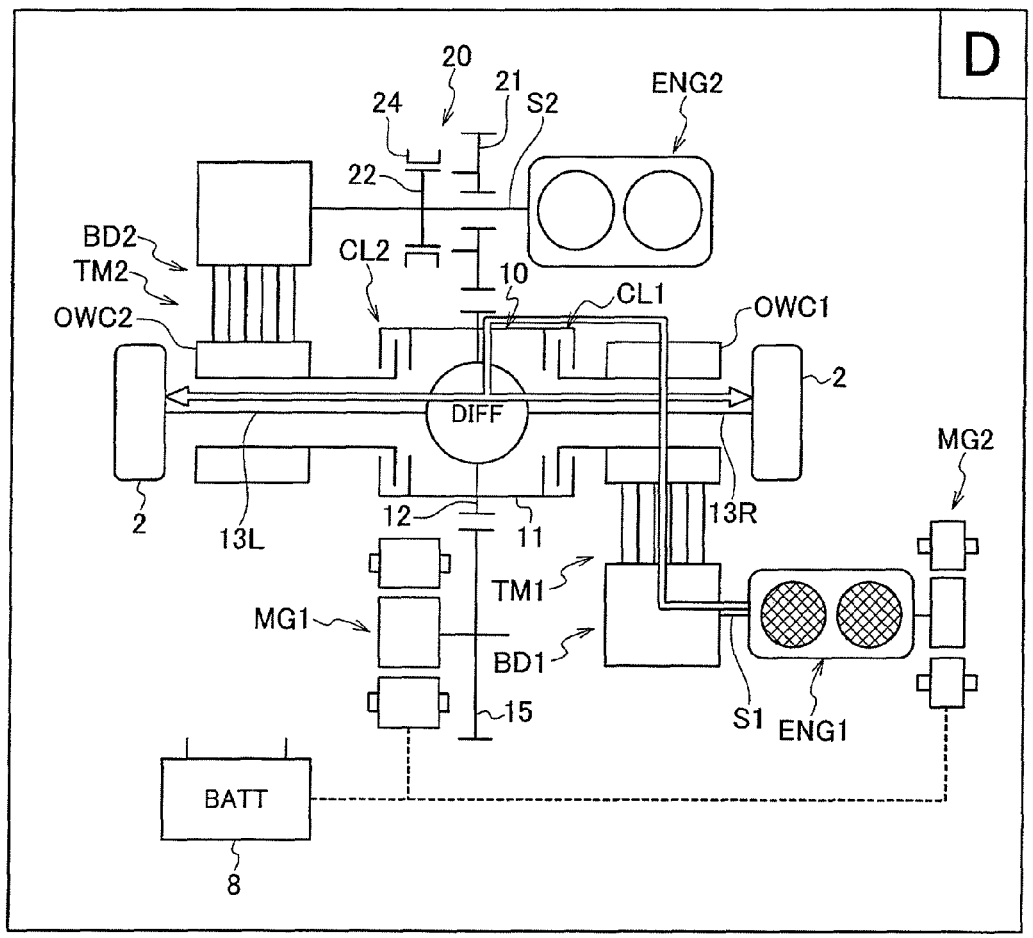
FIG. 14 shows an operation pattern D in the driving system.

In the operation pattern D shown in FIG. 14, the engine running is carried out using the driving force of the first engine ENG1. For example, the operation pattern D is used so as to decrease consumption of the electric power of the battery 8 in a case where SOC is low at the time of the starting.

Figure 15:
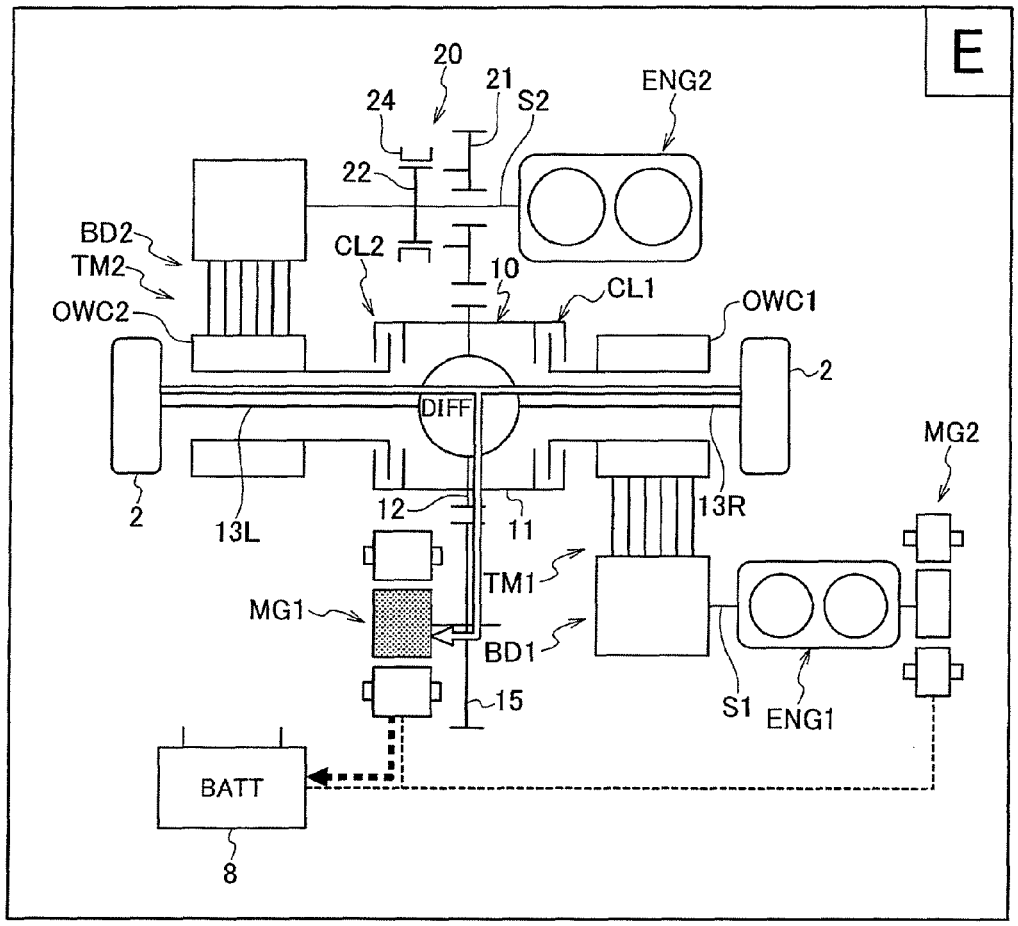
FIG. 15 shows an operation pattern E in the driving system.

In the operation pattern E shown in FIG. 15, the main motor/generator MG1 operates as a generator due to a regenerative operation of the main motor/generator MG1 which uses the power transmitted via the driving target member 11 from the driving wheel 2 at the time of deceleration, and the mechanical energy which is input via the driving target member 11 from the driving wheel 2 is changed to electric energy. A regenerative braking force is transmitted to the driving wheel 2 and regenerative electric power is charged in the battery 8. At this time, the clutch mechanism CL1 and CL2 are disconnected.

Figure 16:
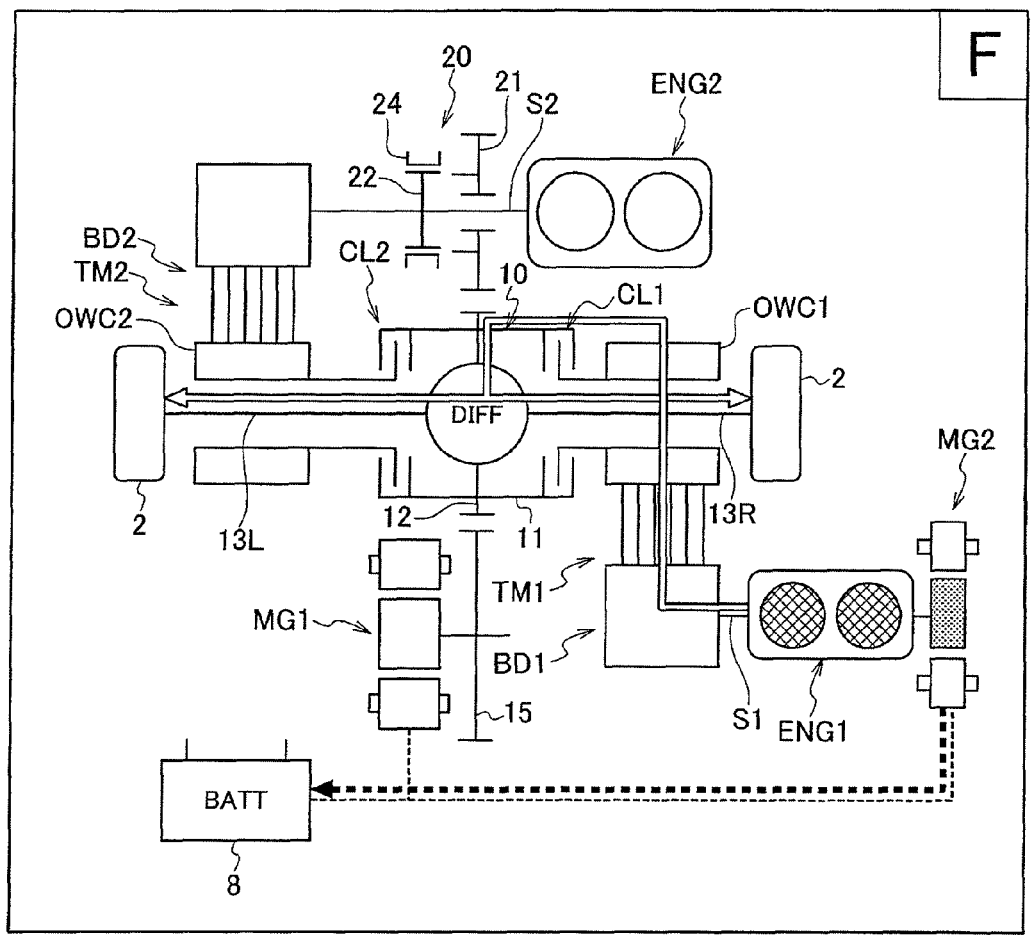
FIG. 16 shows an operation pattern F in the driving system.

In the operation pattern F shown in FIG. 16, the engine running is carried out using only the driving force of the first engine ENG1, and simultaneously, electricity is generated by the sub motor/generator MG2 using the driving force of the first engine ENG1, and the generated electric power is charged in the battery 8. Generation of electricity of the sub motor/generator MG2 may stop according to the SOC.

Figure 17:
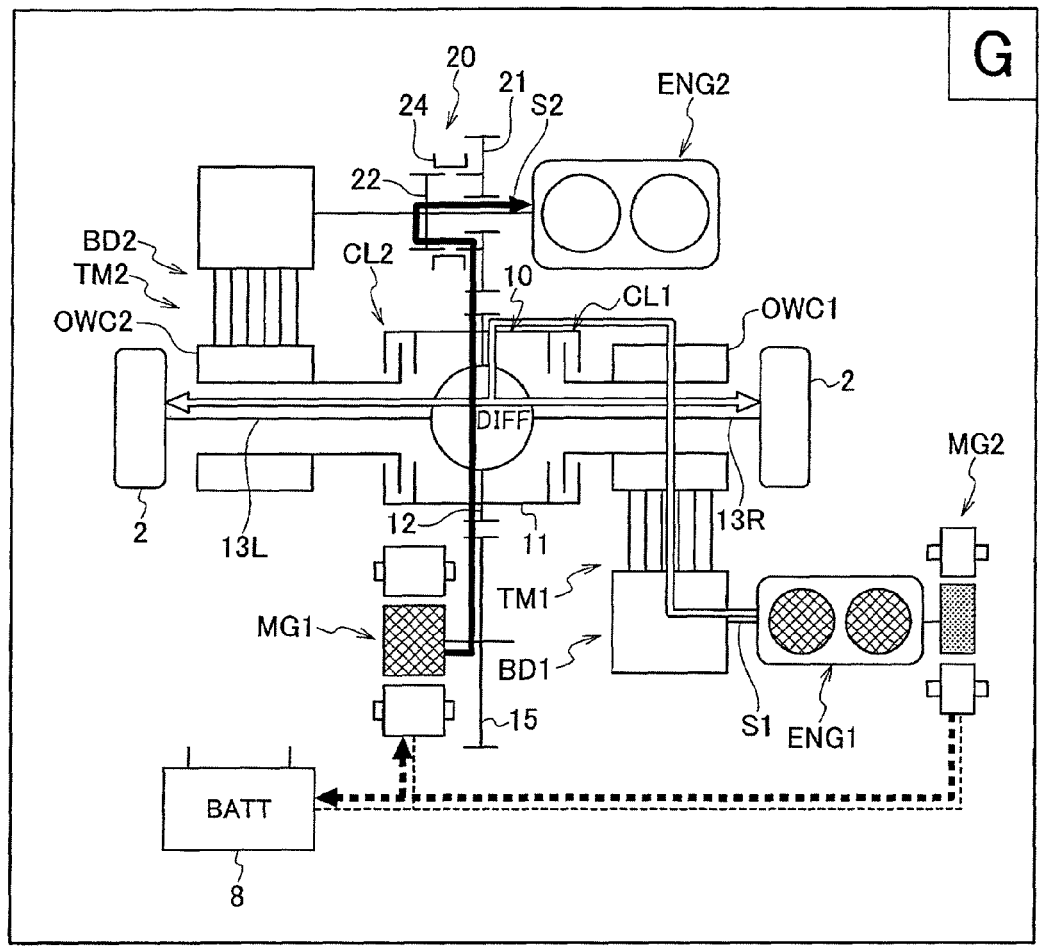
FIG. 17 shows an operation pattern G in the driving system.

In the operation pattern G shown in FIG. 17, the starting of the second engine ENG2 is carried out by the power introduced to the driving target member 11 (differential case) via the synchronization mechanism (starter clutch) 20 while the vehicle is run by the driving force of the first engine ENG1, the shortage of the output to the driving wheel 2 due to the increase of the load at the time of the starting is supplemented by the driving force of the first motor/generator MG1. The sub motor/generator MG2 generates electricity using the driving force of the first engine ENG1, and the generated electric power is supplied to the first motor/generator MG1 or is charged in the battery 8.

Figure 18:
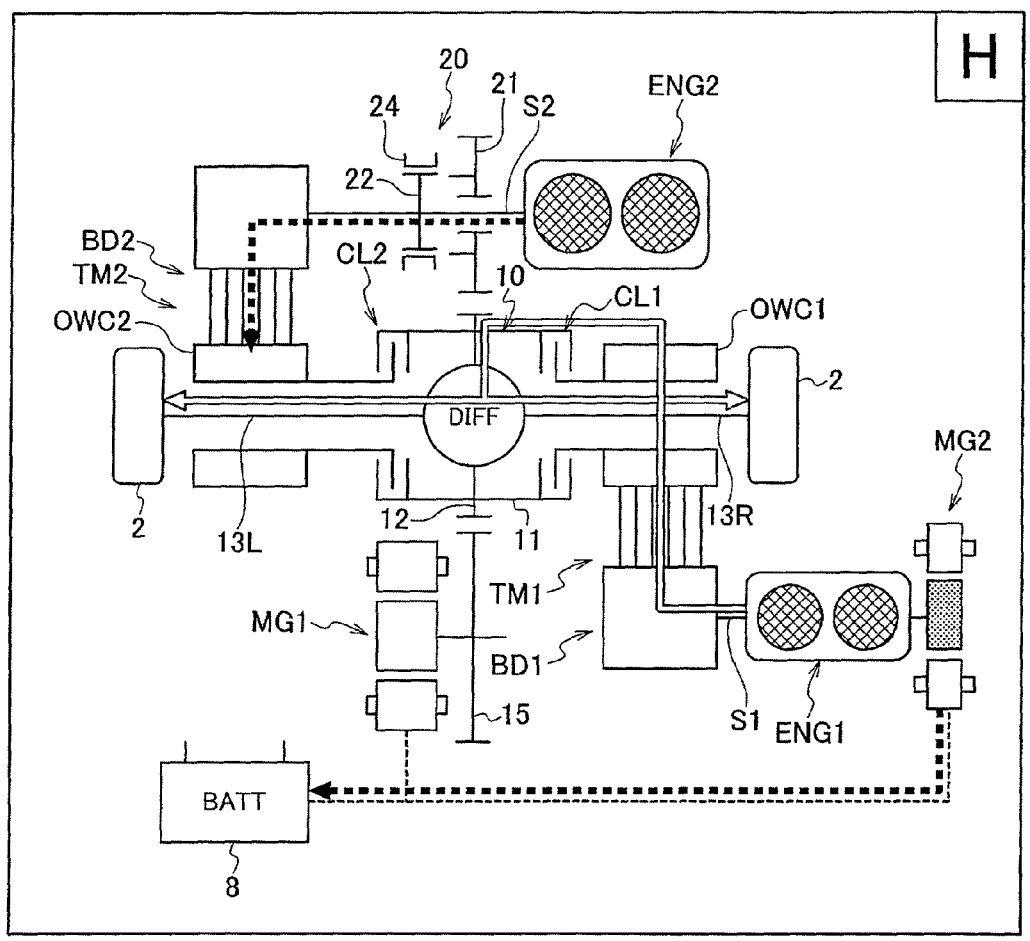
FIG. 18 shows an operation pattern H in the driving system.

In the operation pattern H shown in FIG. 18, the engine running is performed using the driving force of the first engine ENG1, the synchronization mechanism 20 connected in the operation pattern G is disconnected (engaged state is released), and thereby, the driving target member 11 (differential case) and the output shaft S2 of the second engine ENG2 are separated from each other, and in the separate state, the power of the second engine ENG2 after the starting is input to the second transmission TM2. However, in this step, since the input rotational speed of the second one-way clutch OWC2 has not yet exceeded the output rotational speed, the output of the second transmission TM2 is not input to the driving target member 11. The sub motor/generator MG2 generates electricity using the driving force of the first engine ENG1, and the generated electric power is charged in the battery 8.

Figure 19:
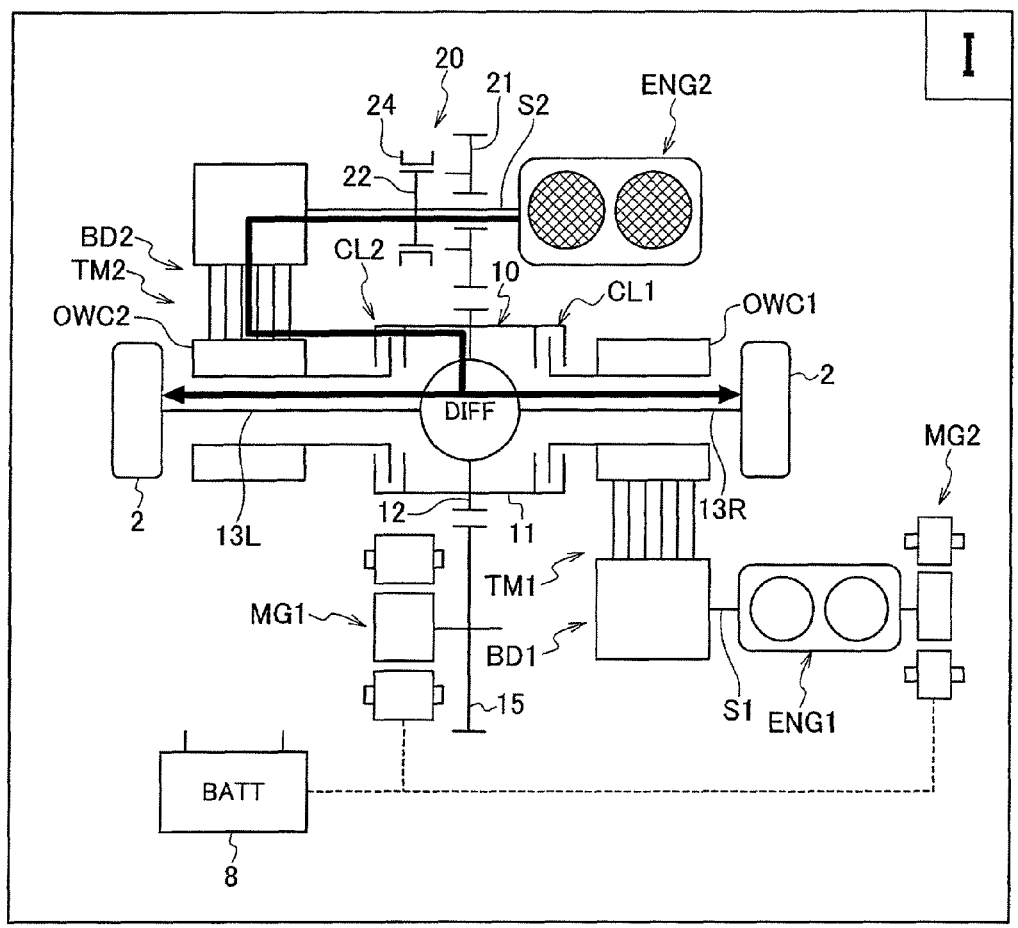
FIG. 19 shows an operation pattern I in the driving system.

In the operation pattern I shown in FIG. 19, the engine running is performed by the driving force of the second engine ENG2. In the operation pattern I, the gear ratio of the second transmission TM2 is changed from the state of the operation pattern H to an OD (over drive) side, the rotational speed of the input member 122 of the second one-way clutch OWC2 is controlled so as to exceed the rotational speed of the output member 121, and thereby, the power of the second engine ENG2 is transmitted to the driving target member 11 (differential case) via the second transmission TM2, and the engine running is realized by the driving force of the second engine ENG2. In the operation pattern I, in a step where engagement due to the second engine ENG2 is established (the power transmission to the driving target member 11 is established), the first engine ENG1 is stopped. At this time, the clutch mechanism CL2 is maintained in a connection state, and the clutch mechanism CL1 is maintained in the disconnected state. Thereby, the driving force of the second engine ENG2 is transmitted to the driving target member 11, and dragging of the one-way clutch OWC1 is prevented.

Figure 20:
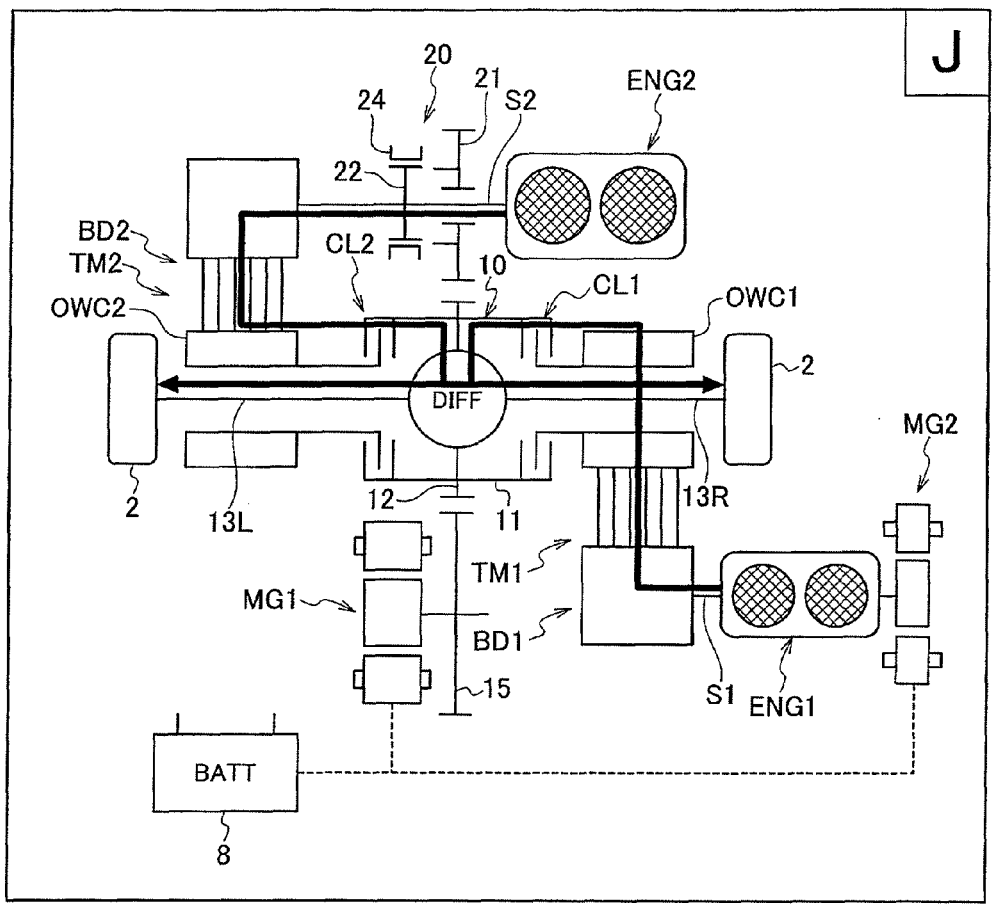
FIG. 20 shows an operation pattern J in the driving system.

The operation pattern J shown in FIG. 20 is an operation pattern of a case where the required output is further increased in a state where the engine running is performed using the driving force of the second engine ENG2. In the operation pattern J, in the running state using the second engine ENG2, the first engine ENG1 is started, the driving forces of both the second engine ENG2 and the first engine ENG1 are combined, and the combined force is transmitted to the driving target member 11 (differential case). That is, the rotational speeds of the first and second engines ENG1 and ENG2 and/or the gear ratios of the first and second transmissions TM1 and TM2 are controlled so that the rotational speeds of the input members 122 of the first and second one-way clutches OWC1 and OWC2 are synchronized with each other and exceed the rotational speed of the output member 121 (the rotational speed of the driving target member 11).

Figure 21:
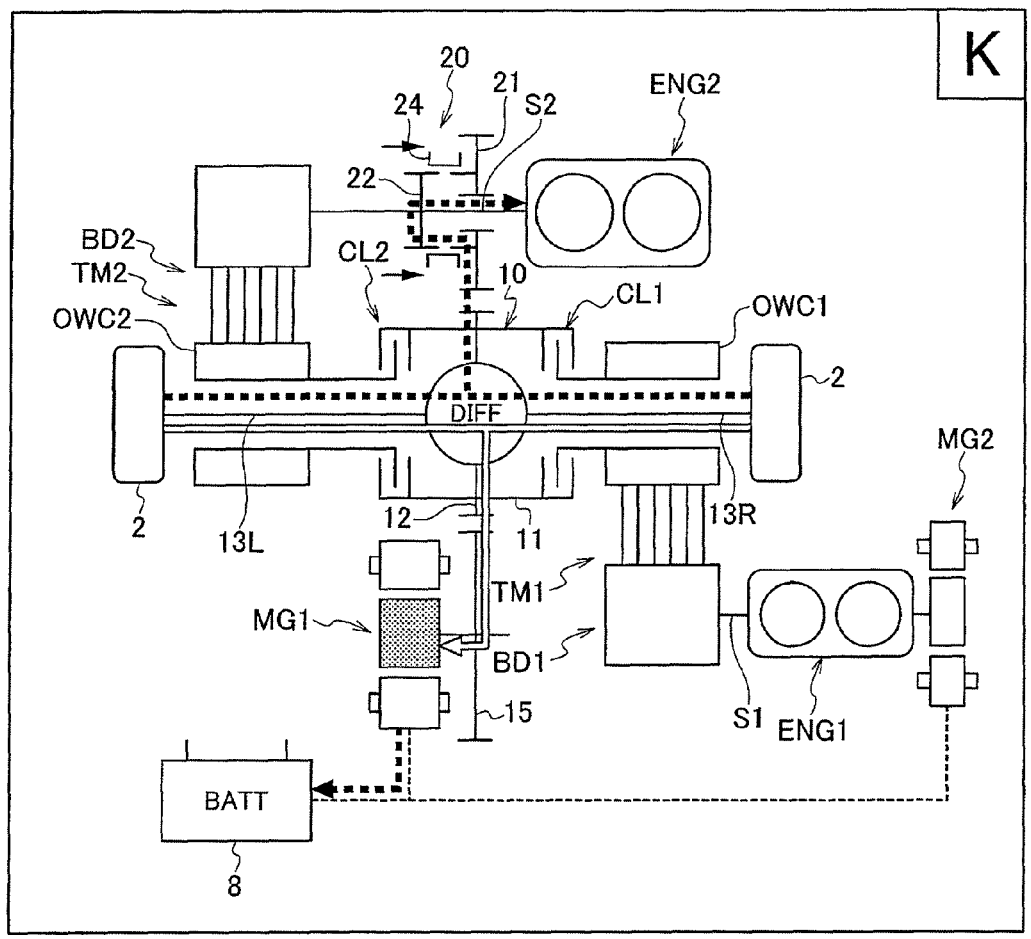
FIG. 21 shows an operation pattern K in the driving system.

For example, the operation pattern K shown in FIG. 21 is an operation pattern in a case where a deceleration demand at the time of middle and high speed running is generated. In the operation pattern K, the first engine ENG1 and the second engine ENG2 are stopped, electricity is generated by the main motor/generator MG1 due to the power transmitted via the driving target member 11 from the driving wheel 2 according to deceleration, and thereby, the generated regenerative electric power is charged in the battery 8, and the regenerative braking force is operated on the driving wheel 2. Simultaneously, the synchronization mechanism 20 enters the connected state, and engine brake of the second engine ENG2 is operated on the driving wheel 2 as a braking force.

Figure 22:
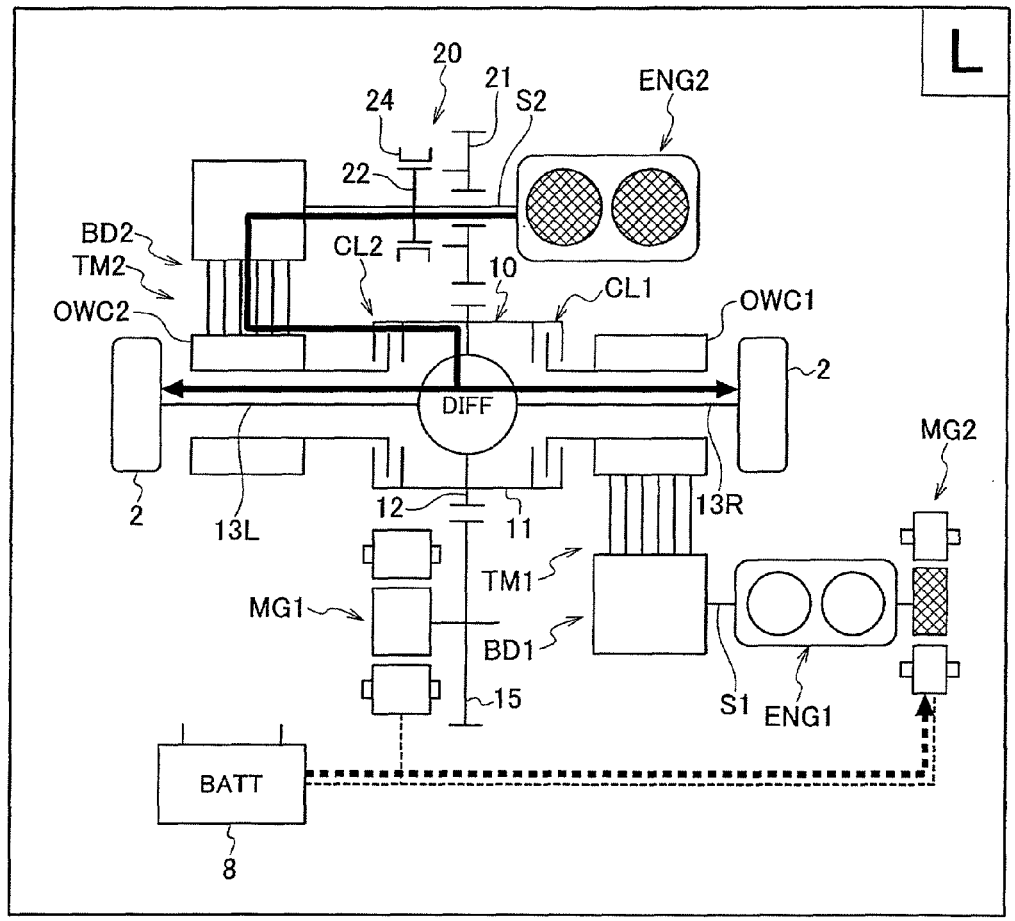
FIG. 22 shows an operation pattern L in the driving system.

The operation pattern L shown in FIG. 22 is an operation pattern at the time of switching in a case where the further increase of the required output is generated in a state of being run by the driving force of the second engine ENG2. In the operation pattern L, in order to start the first engine ENG1, the sub motor/generator MG2 is driven. At this time, the gear ratio of the first transmission TM1 is set to infinity. According to this operation pattern, the operation pattern after the first engine ENG1 starts becomes the operation pattern J in which both driving forces of both the first and second engines ENG1 and ENG2 are transmitted to the driving target member 11.

Figure 23:
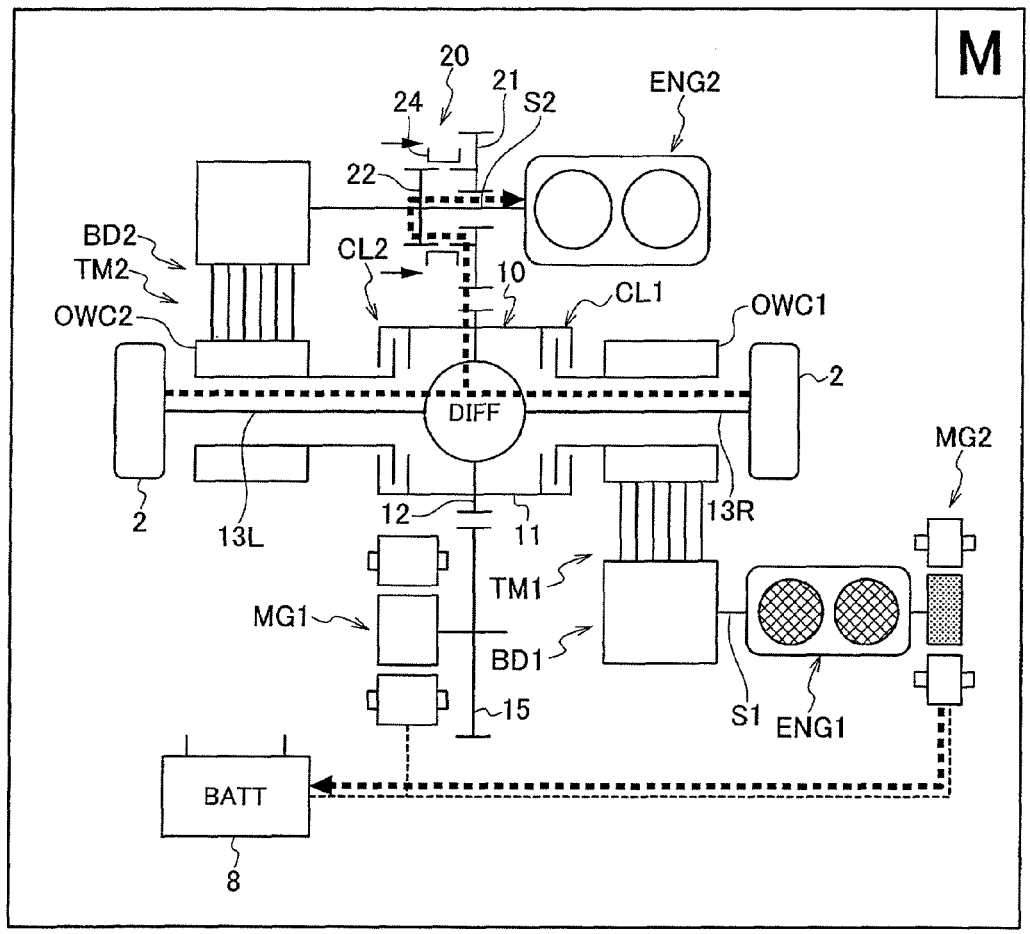
FIG. 23 shows an operation pattern M in the driving system.

In the operation pattern M shown in FIG. 23, the synchronization mechanism 20 enters the connection state and the engine brake can be used by the second engine ENG2, electricity is generated by the sub motor/generator MG2 using the driving force of the first engine ENG1 and the generated electric power is charged in the battery 8.

Figure 24:
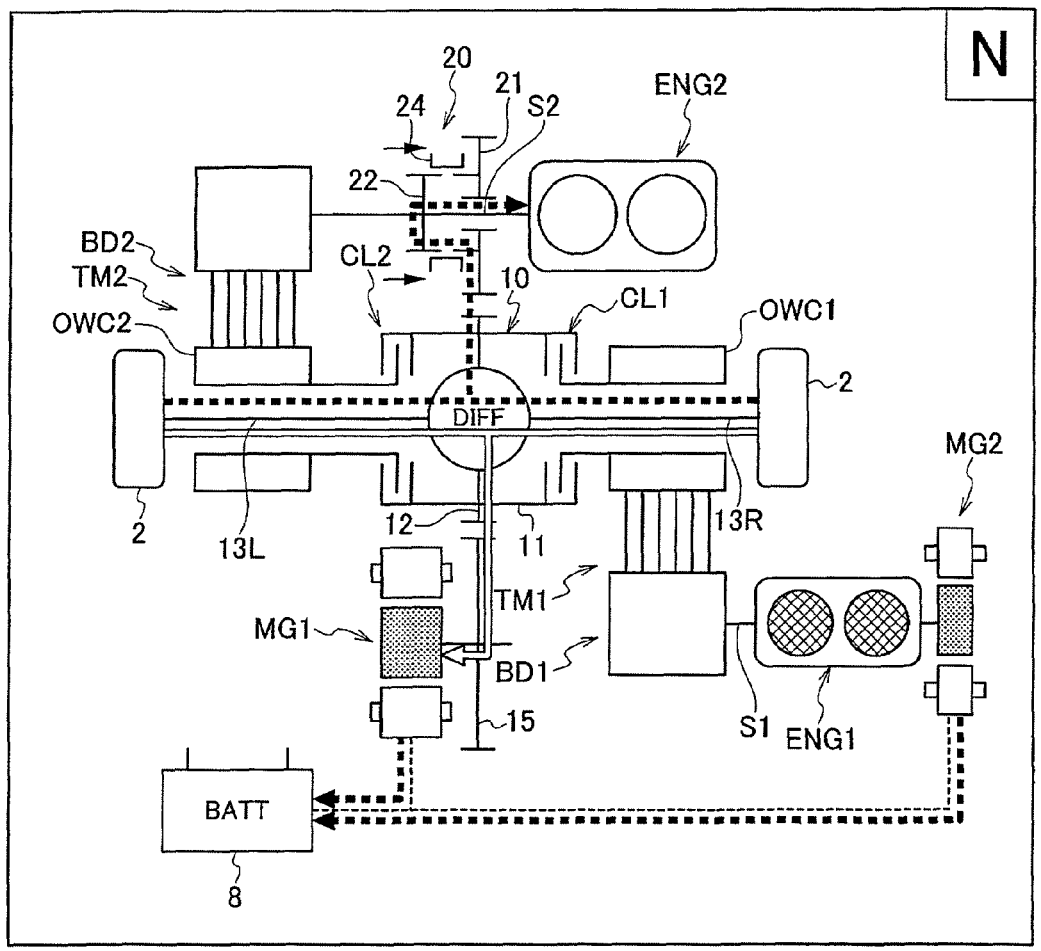
FIG. 24 shows an operation pattern N in the driving system.

In the operation pattern N shown in FIG. 24, the synchronization mechanism 20 enters the connection state and the engine brake can be used by the second engine ENG2, regenerative electric power is generated by the main motor/generator MG1 and charged in the battery 8, and simultaneously, electricity is generated by the sub motor/generator MG2 using the driving force of the first engine ENG1, and the generated electric power is charged in the battery 8. The synchronization mechanism 20 is held to the connection state, and thereby, the second engine ENG2 enters a cranking standby state.

Figure 25:
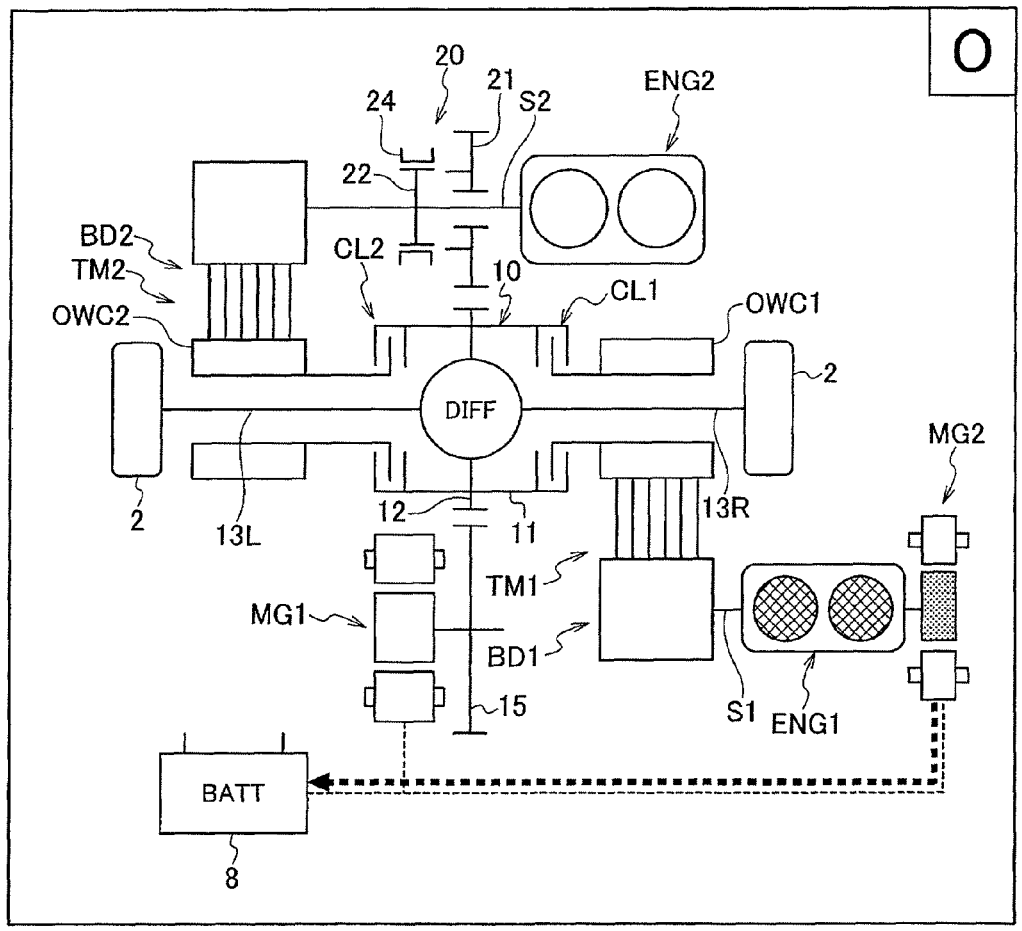
FIG. 25 shows an operation pattern O in the driving system.

The operation pattern O shown in FIG. 25 is an operation pattern during the stopping of the vehicle, and in the operation pattern O, electricity is generated by the sub motor/generator MG2 using the driving force of the first engine ENG1, and the generated electric power is charged in the battery 8. At this time, dragging torque loss is suppressed by setting the gear ratios of the first and second transmissions TM1 and TM2 to infinity (∞) or by disconnecting the clutches CL1 and CL2.

<<Control Operation According to Operation Condition>>

Next, the control operations in various operation conditions will be described with reference to FIGS. 26 to 39.

Each operation condition is shown by a tabular format, and for convenience of the explanation, serial numbers corresponding to the numbers in the following brackets are attached in the lower left of each frame in the table. The reference numerals A to O of the upper right of each frame correspond to the enlarged views of FIGS. 11 to 25 and are referred as necessary.

<<At the Time of Starting>>

Figure 26:
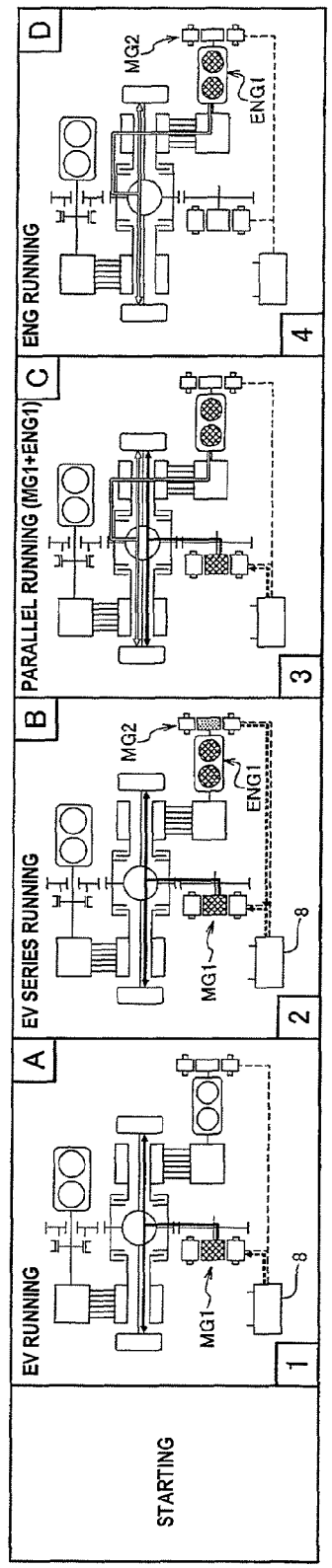
FIG. 26 shows a control operation according to a running state to be performed in the driving system at the time of starting.

First, the control operation at the time of the starting will be described with reference to FIG. 26.

The running pattern at the time of the starting includes four ways (1) to (4) as follows.

(1) At the time of the starting by gradual acceleration, substantially, the EV running according to the operation pattern A is performed. In the EV running, the main motor/generator MG1 is driven by the electric power supplied from the battery 8, and the running is carried out by only the driving force.

At the time of the starting by the acceleration equal to or more than the gradual acceleration, any one of (2) the series running, (3) the parallel running, and (4) the engine running is performed.

(2) In the series running according to the operation pattern B, first, the first engine ENG1 is started by the sub motor/generator MG2. If the second engine ENG2 starts, the sub motor/generator MG2 functions as a generator and electricity is generated, the generated electric power is supplied to the battery 8 and the main motor/generator MG1, and the electric power generated by the sub motor/generator MG2 using the power of the first engine ENG1 is effectively used while the EV running is continuous. At this time, the rotational speed of the first engine ENG1 and/or the gear ratio of the first transmission TM1 are/is controlled so that the input rotational speed of the first one-way clutch OWC1 is less than the output rotational speed.

(3) In the parallel running according to the operation pattern C, the driving force of the first engine ENG1 is transmitted to the driving target member 11. In this case, first, the first engine ENG1 is started by the sub motor/generator MG2, and the rotational speed of the first engine ENG1 is increased by the control according to the acceleration demand. If the rotational speed of the first engine ENG1 is increased, the gear ratio of the first transmission TM1 is changed so that the input rotational speed of the first one-way clutch OWC1 exceeds the output rotational speed, and the parallel running in which the driving forces of both the main motor/generator MG1 and the first engine ENG1 are combined is performed. When the SOC is low, the charging of the battery 8 may be carried out using the sub motor/generator MG2 as a generator.

(4) When the SOC is low, the starting is carried out by the engine running using the first engine ENG1 shown in the operation pattern D. Also in this case, the charging of the battery 8 may be carried out using the sub motor/generator MG2 as a generator.

In this way, at the time of the starting of the vehicle, the EV running mode which uses the driving force of the main motor/generator MG1, the series running mode which uses the first engine ENG1, the sub motor/generator MG2, and the main motor/generator MG1, the parallel running mode which uses the driving forces of both the main motor/generator MG1 and the first engine ENG1, and the engine running mode by the first engine ENG1 are selected and performed according to the operation conditions.

Incidentally, in the case of starting of an uphill road, the control of the clutch mechanisms CL1 and CL2 is carried out as shown in FIG. 10. Since the running patterns at the time of the starting are different from each other, the clutch mechanisms CL1 and CL2 enter ON state/OFF state according to timing shown in FIGS. 36 to 39. Here, (1) the case of the EV running start, (2) the case of the series running start, and (3) the case of the parallel running start will be described.

Figure 36:
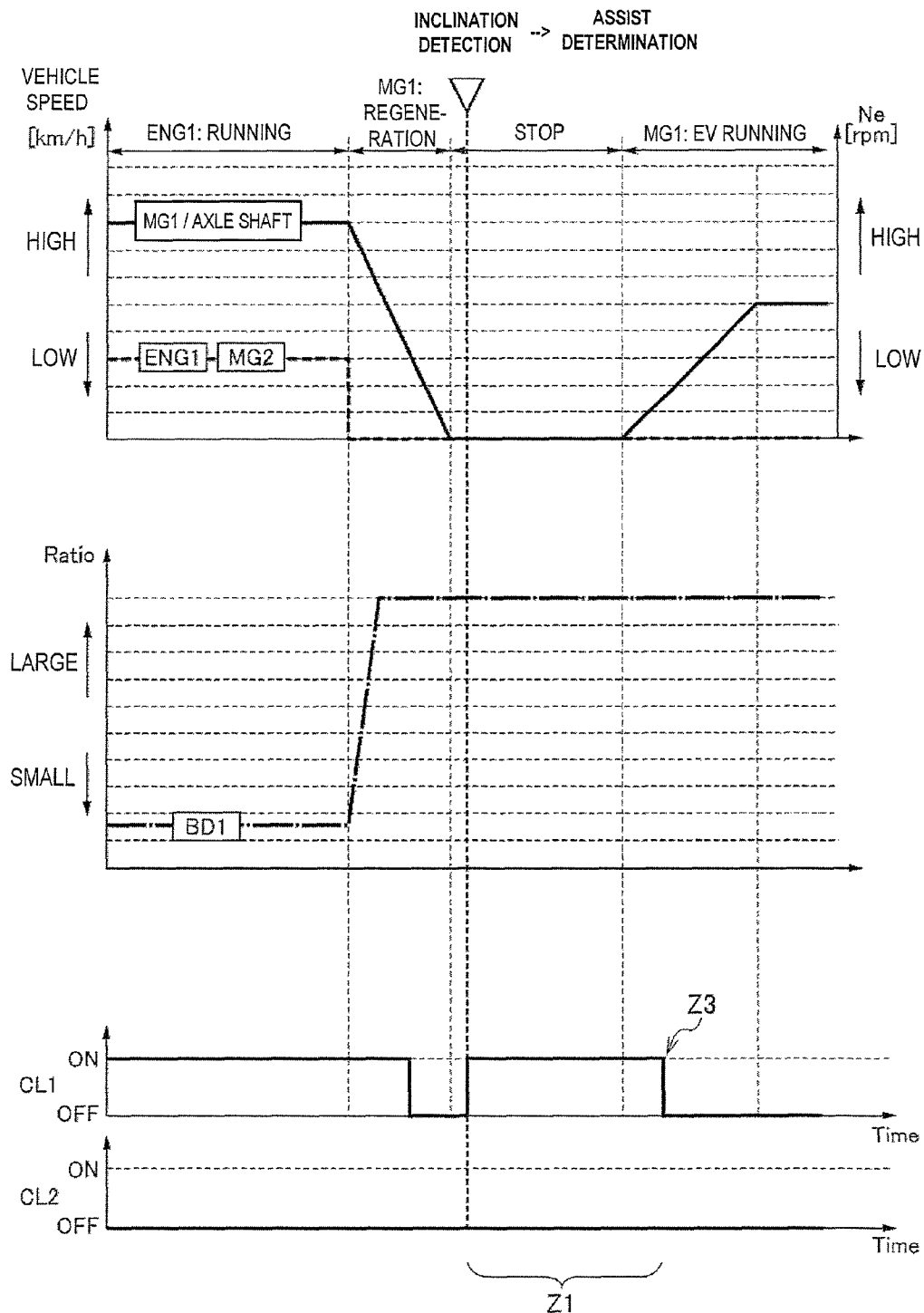
FIG. 36 shows an operation situation at the time of an EV running start.
Figure 37:
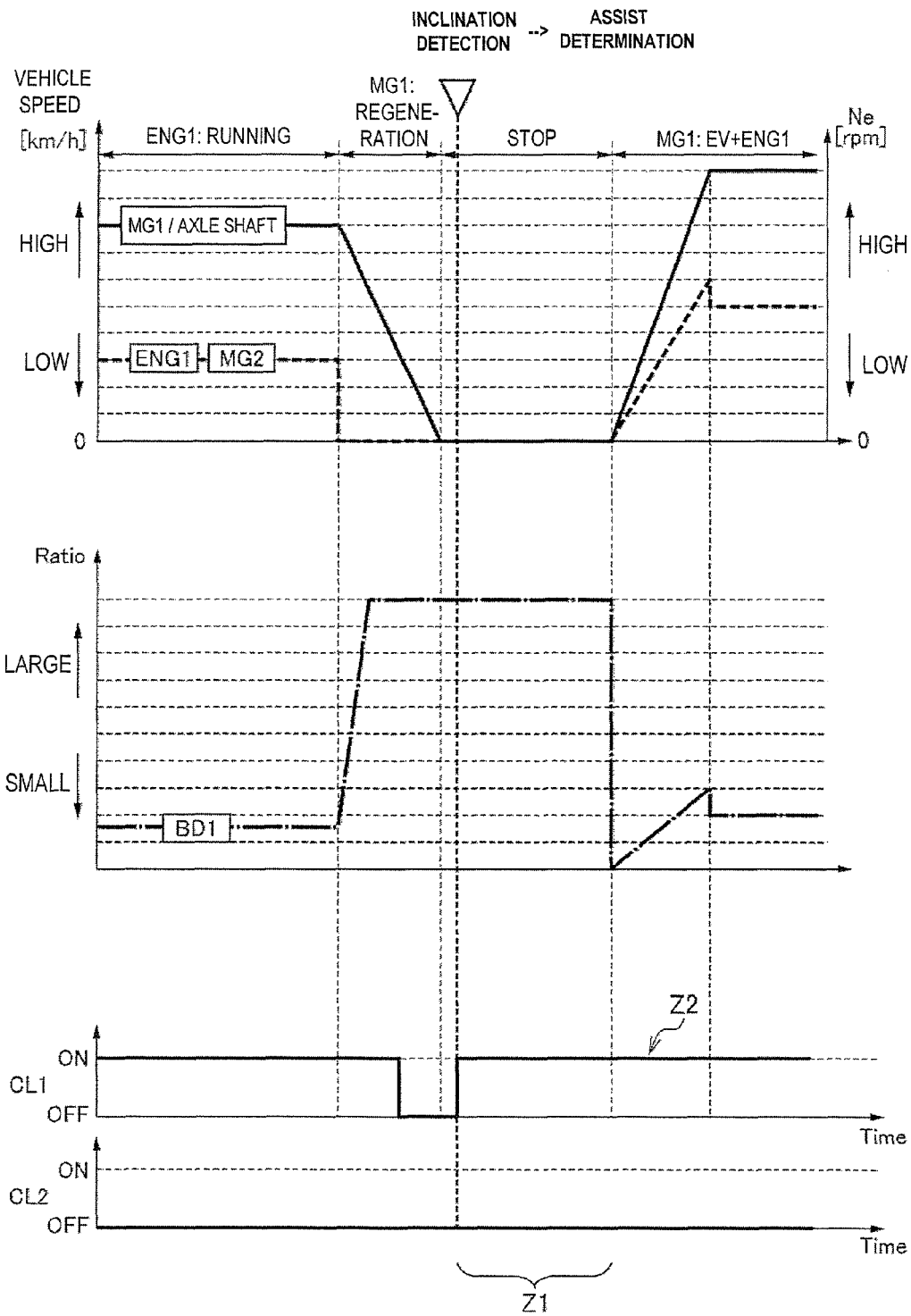
FIG. 37 shows an operation situation at the time of an EV+engine running start.
Figure 38:
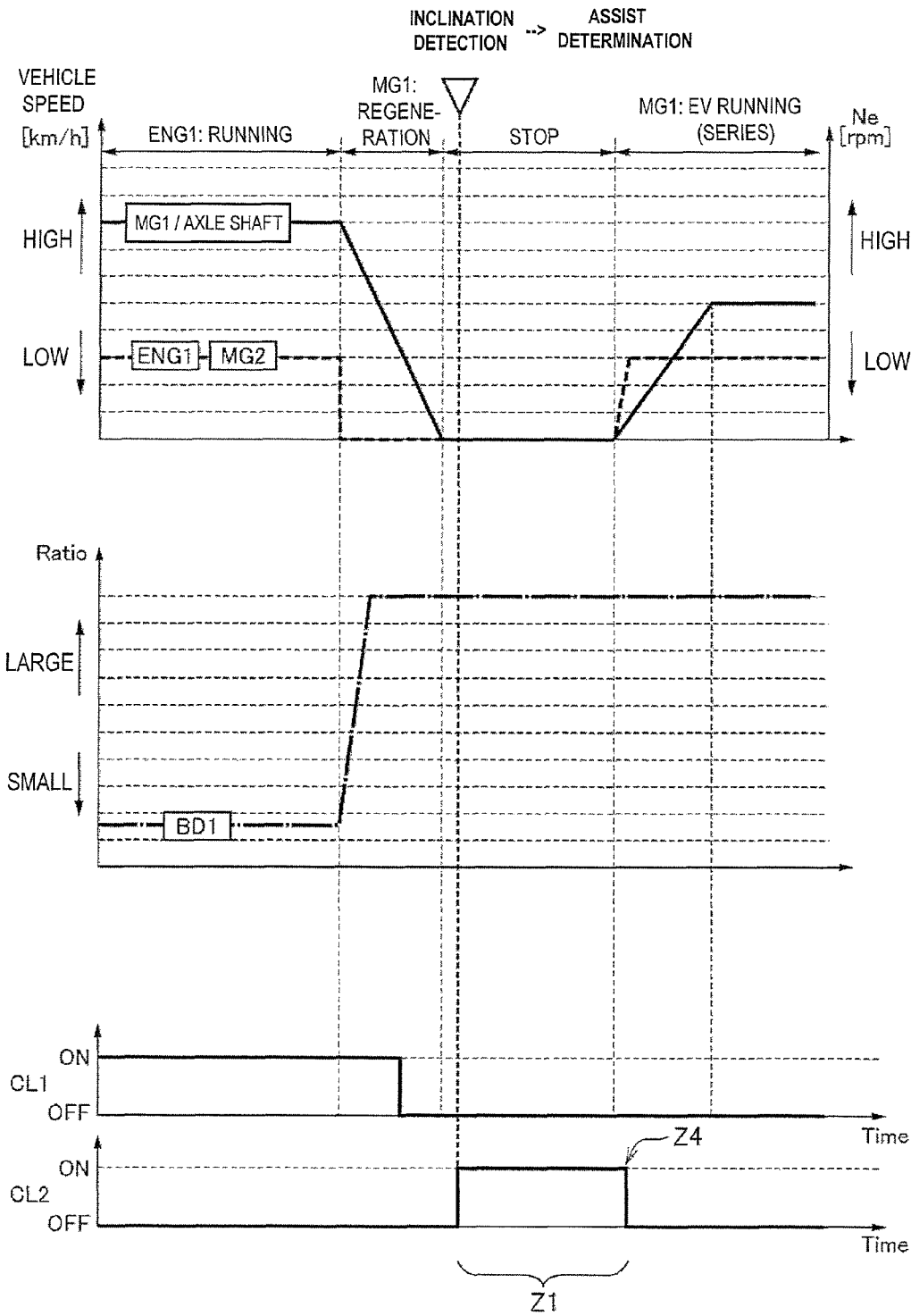
FIG. 38 shows a first example of an operation situation at the time of an EV running start according to a series running.
Figure 39:
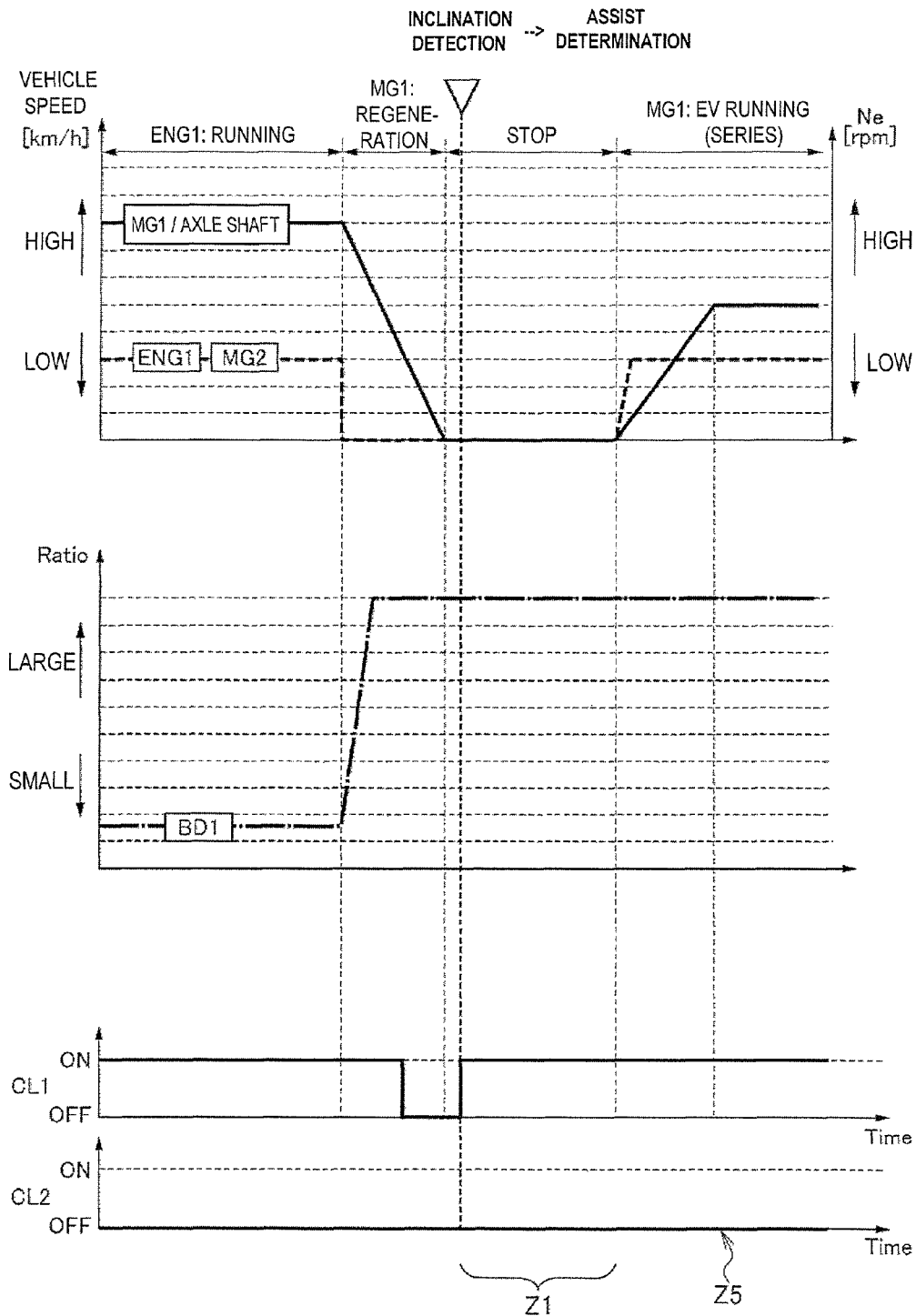
FIG. 39 shows a second example of an operation situation at the time of the EV running start according to the series running.

FIG. 36 is the case of the EV running start, FIG. 37 is the case of the parallel (EV+ENG1) running start, FIG. 38 is the case of the series running start during the EV running start, and FIG. 39 is the case of the series running start during the EV running start, which shows the case of shifting to the ENG1 running after the series running respectively.

First, in common in the running pattern start, as understood from a portion shown by a reference numeral Z1 of FIGS. 36 to 39, when the vehicle-backward-movement prevention control (hill hold assist) is required for the starting on an uphill, in the first clutch mechanism CL1 and the second clutch mechanism CL2, only one clutch mechanism enters ON state, and the other clutch mechanism enters OFF state.

In the case of the EV running start shown in FIG. 36, if it is determined that the hill hold assist is needed according to the inclination detection of the vehicle, the first clutch mechanism CL1 enters ON state, and the starting is carried out by the main motor/generator MG1. Thereby, a smooth starting is possible while preventing the backward movement. At the time of the EV running after the starting on an uphill, since the driving force of the first engine ENG1 is not transmitted to the driving target member 11 via the first transmission TM1, the first clutch mechanism CL1 which enters ON state is switched to OFF state (refer to a portion shown by a reference numeral Z3 in FIG. 36).

Next, in the case of the parallel running start shown in FIG. 37, if it is determined that the hill hold assist is needed according to the inclination detection of the vehicle, the first clutch mechanism CL1 enters ON state, and the power of the first engine ENG1 is added to the power of the main motor/generator MG1 and the starting is carried out. At this time, the rotational speed of the first engine ENG1 is increased, the gear ratio of the first transmission TM1 (BD1) is changed from infinity to finite value, and the driving force is transmitted to the driving target member 11. In this case, since the driving force of the first engine ENG1 for running the vehicle is continuously transmitted to the driving target member 11 via the first transmission TM1 after the first clutch mechanism CL1 enters ON state and the vehicle is started on an uphill, as understood from a portion shown by a reference numeral Z2 in FIG. 37, the first clutch mechanism CL1 which enters ON state for performing the hill hold assist is maintained in the ON state. Thereby, a smooth starting is possible while preventing the backward movement.

Next, in the case of the series running start shown in FIG. 38, that is, in the case of the series running start in which electricity is generated by the sub motor/generator MG2 using the driving force of the first engine ENG1 during the stopping of the vehicle or immediately after the starting of the vehicle, if it is determined that the hill hold assist is needed according to the inclination detection of the vehicle, the second clutch mechanism CL2 enters ON state, the first clutch mechanism CL1 enters OFF state (refer to a portion shown by a reference numeral Z1 in FIG. 38), and the starting is carried out by the power of the main motor/generator MG1. At this time, the gear ratio of the first transmission TM1 is set to infinity. Thereby, a smooth starting is possible while preventing the backward movement. At the time of the series running after the starting on an uphill, since the driving forces of the engines ENG1 and ENG2 are not transmitted to the driving target member 11 via the transmissions TM1 and TM2, the second clutch mechanism CL2 which has entered ON state is switched to OFF state (refer to a portion shown by a reference numeral Z4 in FIG. 36).

In the case of the series running start shown in FIG. 39, since there is a premise to shift to the engine running by the first engine ENG1 after the series running, if it is determined that the hill hold assist is needed according to the inclination detection of the vehicle, the first clutch mechanism CL1 enters ON state, the second clutch mechanism CL2 enters OFF state, and the starting is carried out by the power of the main motor/generator MG1. At this time, the gear ratio of the first transmission TM1 is set to infinity. After the starting, the first clutch mechanism CL1 which enters ON state for performing the hill hold assist is maintained in ON state (refer to a portion shown by a reference numeral Z5 in FIG. 39). Thereby, a smooth starting is possible while preventing the backward movement and the shifting to the engine running can be smoothly performed.

In the driving system 1 of the present embodiment, since the four bar linkage continuously variable transmission mechanisms BD1 and BD2 is used in which the rotation of the engines ENG1 and ENG2 is converted to the oscillating movement by the transmissions TM1 and TM2 of the upstream side of the driving target member 11 and the oscillating movement is extracted to the rotational movement again by the one-way clutches OWC1 and OWC2, the transmission of the movement in the reverse direction can be locked due to the function of the structure of the transmissions TM1 and TM2. Accordingly, the clutch mechanisms CL1 and CL2 which are provided between the driving target member 11 and the output members 121 of the one-way clutches OWC1 and OWC2 enter ON state, and if the driving target member 11 and the output members 121 of the one-way clutches OWC1 and OWC2 are connected to each other so as to transmit power, the function which locks the transmission of the movement in the normal direction and the reverse direction can be operated, and the rotation of the driving target member 11 can be regulated (locked). The clutch mechanisms CL1 and CL2 enter OFF state, and if the driving target member 11 and the output member 121 of the one-way clutches OWC1 and OWC2 are separated from each other, the rotation regulation of the driving target member 11 due to the transmissions TM1 and TM2 can be released.

Thereby, the uphill state detection unit 7 detects that the starting on an uphill is to be carried out, and when the determination unit in the controller 5 determines that the detected starting is a start on an uphill (e.g., starting on a high gradient hill road) of the extent in which the vehicle-backward-movement prevention control (hill hold assist) is needed, the clutch mechanisms CL1 and CL2 enter ON state, and thereby, the rotation regulation of the driving target member 11 is operated, and the backward movement at the time of the starting is prevented. When the determination unit determines that the detected starting is a start on an uphill (e.g., starting on a low gradient hill road) of the extent in which the vehicle-backward-movement prevention control (hill hold assist) is not needed, the clutch mechanisms CL1 and CL2 enter OFF state, since the upstream side of the clutch mechanisms CL1 and CL2 is separated from the downstream side, the friction loss of the upstream side of the clutch mechanisms CL1 and CL2 at the time of the starting is decreased.

In this way, since the backward movement of the vehicle is mechanically limited due to the characteristics of the structure of the transmissions TM1 and TM2, the complicated control for performing the hill hold assist by the brake or the like in the conventional example is not required, and easiness of the control can be improved.

As shown in FIG. 37, when the vehicle is run by the power of the engine ENG1 after the clutch mechanism CL1 enters ON state and starts on an uphill (at the case of the parallel running start), since the clutch mechanism CL1 is maintained in ON state (refer to the Z2 portion of FIG. 37), the time in which the clutch mechanism CL1 is switched to ON state again after the clutch mechanism CL1 enters OFF state can be decreased. That is, generally, when the power of the engine ENG1 is directly used for the running (which is not the series driving in which electricity is generated by the power of the engine ENG1 and the EV running is carried out using the electric power), it is necessary to make the clutch mechanism CL1 enter ON state. However, when the clutch mechanism CL1 enters ON state in order to operate the hill hold assist function, ON state of the clutch mechanism is continued, and thereby, the switch operation which makes the clutch mechanism CL1 be from OFF state to ON state is not needed. Thereby, the time for making the clutch mechanism CL1 enter ON state again can be decreased, and a smooth driving is possible.

Like the time of the EV running start shown in FIG. 36, when the power of the engine ENG1 is not used for the running power, the clutch mechanism CL1 which has entered ON state at the time of the starting enters OFF state (refer to the Z3 portion of FIG. 36). Thereby, friction of the upstream side of the clutch mechanism CL1 can be immediately reduced and energy loss can be decreased.

Like the driving system 1 of the present embodiment, in the case where the power system which includes the engines ENG1 and ENG2 as the main component is two systems, as shown in FIGS. 36 to 39, it is possible to prevent the friction loss from being equal to or more than necessary by making the clutch mechanisms CL1 and CL2 of the other power system (refer to the Z1 portion of FIGS. 36 to 39) enter OFF state while exerting the hill hold assist function by making only the clutch mechanisms CL1 and CL2 of one power system enter ON state.

As shown in FIG. 38, at the time of the series running start, the driving force of the first engine ENG1 cannot be transmitted to the driving target member 11 (axle shaft side) by making the first clutch mechanism CL1 which is positioned at the downstream side of the first engine ENG1 enter OFF state. The hill hold assist function can be operated by making the second clutch mechanism CL2 enter ON state. Accordingly, the hill hold assist function can be used while electricity is generated by the first engine ENG1.

As shown in FIG. 39, at the time of the series running start, the hill hold assist function can be operated by making the first clutch mechanism CL1 which is positioned on the downstream side of the first engine ENG1 enter ON state. At this time, the power of the first engine ENG1 cannot be transmitted to the driving target member 11 by setting the gear ratio of the first transmission TM1 connected to the first engine ENG1 to infinity. Accordingly, the rotational power of the first engine ENG1 can be immediately transmitted to the driving target member 11 by increasing the rotational speed of the first engine ENG1 while changing the gear ratio from this step. That is, when the switching from the series driving to the engine running which uses the driving force of the first engine ENG1 is carried out, a smooth switching is possible.

Next, the control operation at the time of the running after the starting will be described.

<<At the Time of Low-Speed Running (e.g., 0 to 30 km/h)>>

Figure 27:
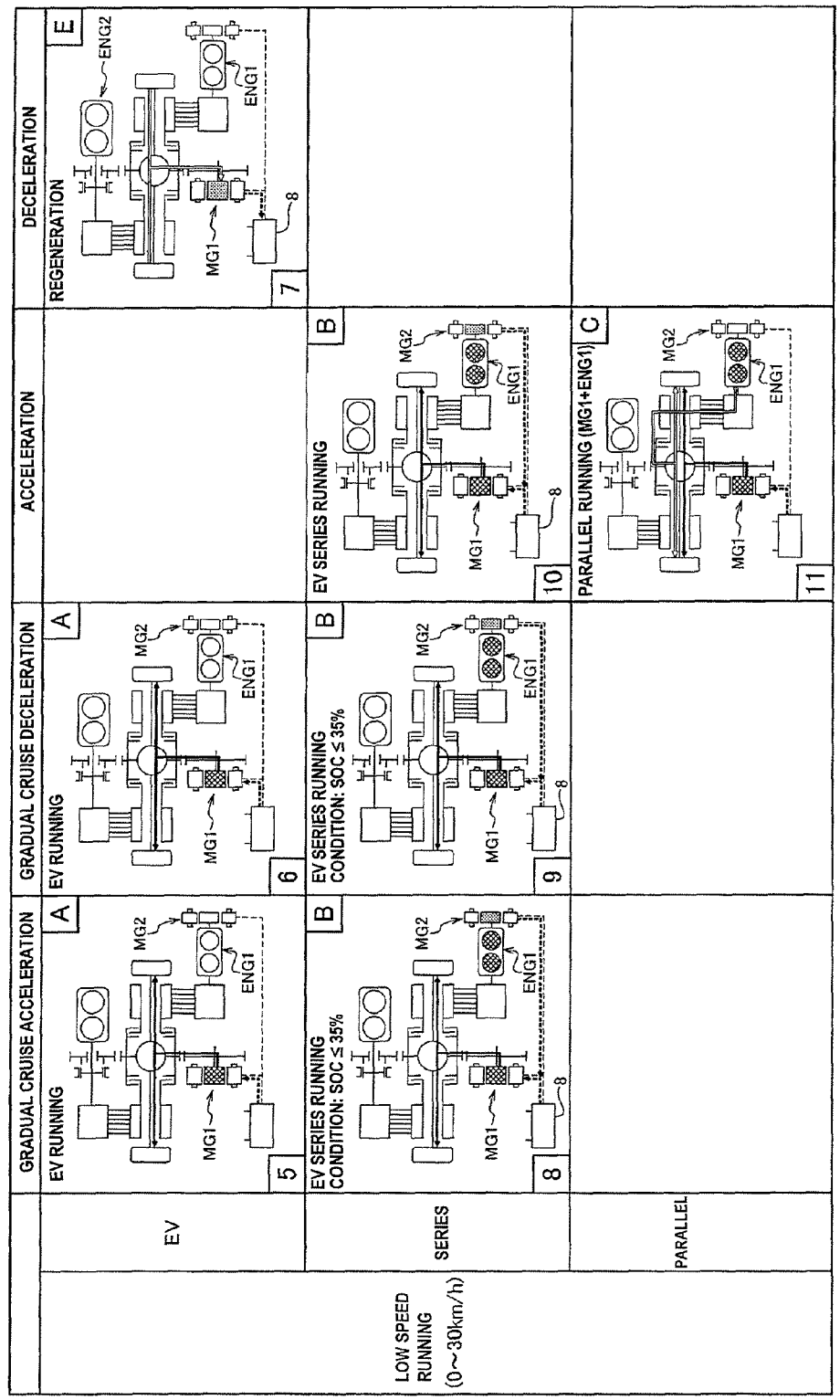
FIG. 27 shows a control operation to be performed in the driving system at the time of a low-speed running.

Next, a control operation at the time of a low-speed running will be described with reference to FIGS. 27.

(5) And (6) At the time of a gradual cruise acceleration or at the time of a gradual cruise deceleration in which, for example, an accelerator pedal is released, the EV running is carried out according to the operation pattern A.

(7) At the time of deceleration such as the time of pressing the brake, a regenerative operation is carried out according to the operation pattern E.

(8) And (9) Also at the time of the gradual cruise acceleration and at the time of the gradual cruise deceleration, when the remaining capacity (SOC) of the battery 8 is less than and equal to 35%, the series driving is carried out according to the operation pattern B.

(10) Also in the case of acceleration, the series driving is carried out according to the operation pattern B.

(11) When the acceleration demand is higher, the parallel running which uses the driving forces of the main motor/generator MG1 and the first engine ENG1 is carried out by switching the pattern to the operation pattern C.

<<Switching of Drive Source from Main Motor/Generator MG1 to First Engine ENG1>>

Figure 28:
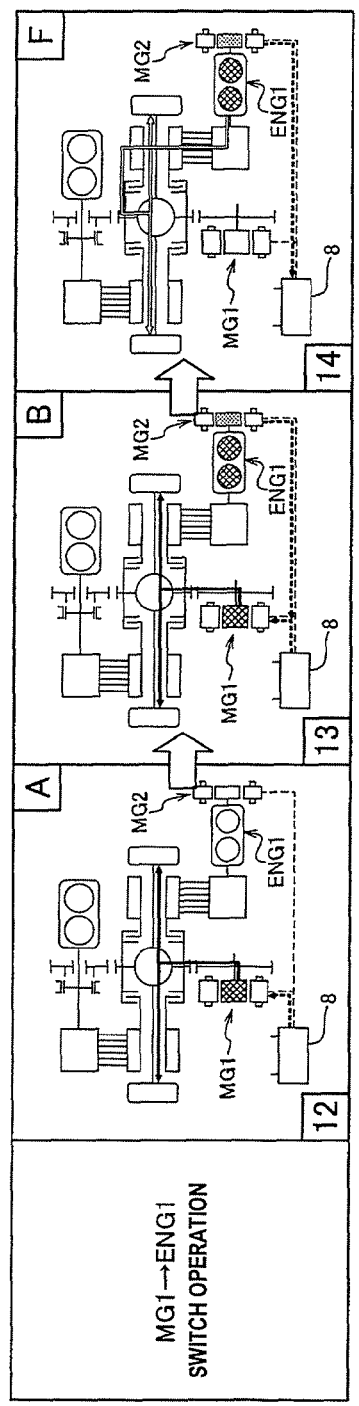
FIG. 28 shows a control operation to be performed in the driving system at the time of switching (switch operation) from an EV running mode to an engine running mode.

At the time of switching of the drive source from the main motor/generator MG1 to the first engine ENG1, the operation control is carried out using the above-described running switching control A as shown in FIGS. 28.

(12) And (13) First, from the situation in which the EV running is carried out according to the operation pattern A, the first engine ENG1 is started by the sub motor/generator MG2. At this time, the gear ratio of the first transmission TM1 is set to infinity, and thereby, the output of the first engine ENG1 is not input to the driving target member 11. After the starting, the pattern is switched to the operation pattern B, and the series running is carried out by the generation of electricity due to the sub motor/generator MG2.

(14) Next, the pattern is shifted to the operation pattern F, the rotational speed of the first engine ENG1 and/or the gear ratio of the first transmission TM1 are/is controlled so that the input rotational speed of the first one-way clutch OWC1 exceeds the output rotational speed, and the power of the first engine ENG1 is transmitted to the driving target member 11. For example, after the gear ratio is set to infinity and the engine enters a charging mode, the gear ratio is moved to an OD (over drive) side, and the running is smoothly shifted from the EV running by the main motor/generator MG1 to the engine running by the first engine ENG1 via the series running. At this time, the clutch mechanism CL1 is connected and controlled according to appropriate timing so that delay does not occur.

If the power transmission (switching of drive source) to the driving target member 11 by the first engine ENG1 is established, the main motor/generator MG1 is stopped. However, when the remaining capacity (SOC) of the battery is small, the generation of electricity by the sub motor/generator MG2 and the charging are continued, and when the remaining capacity (SOC) of the battery is sufficient, the sub motor/generator MG2 is stopped.

<<At the Time of Middle Speed Running (e.g., 20 to 70 km/h)>>

Figure 29:
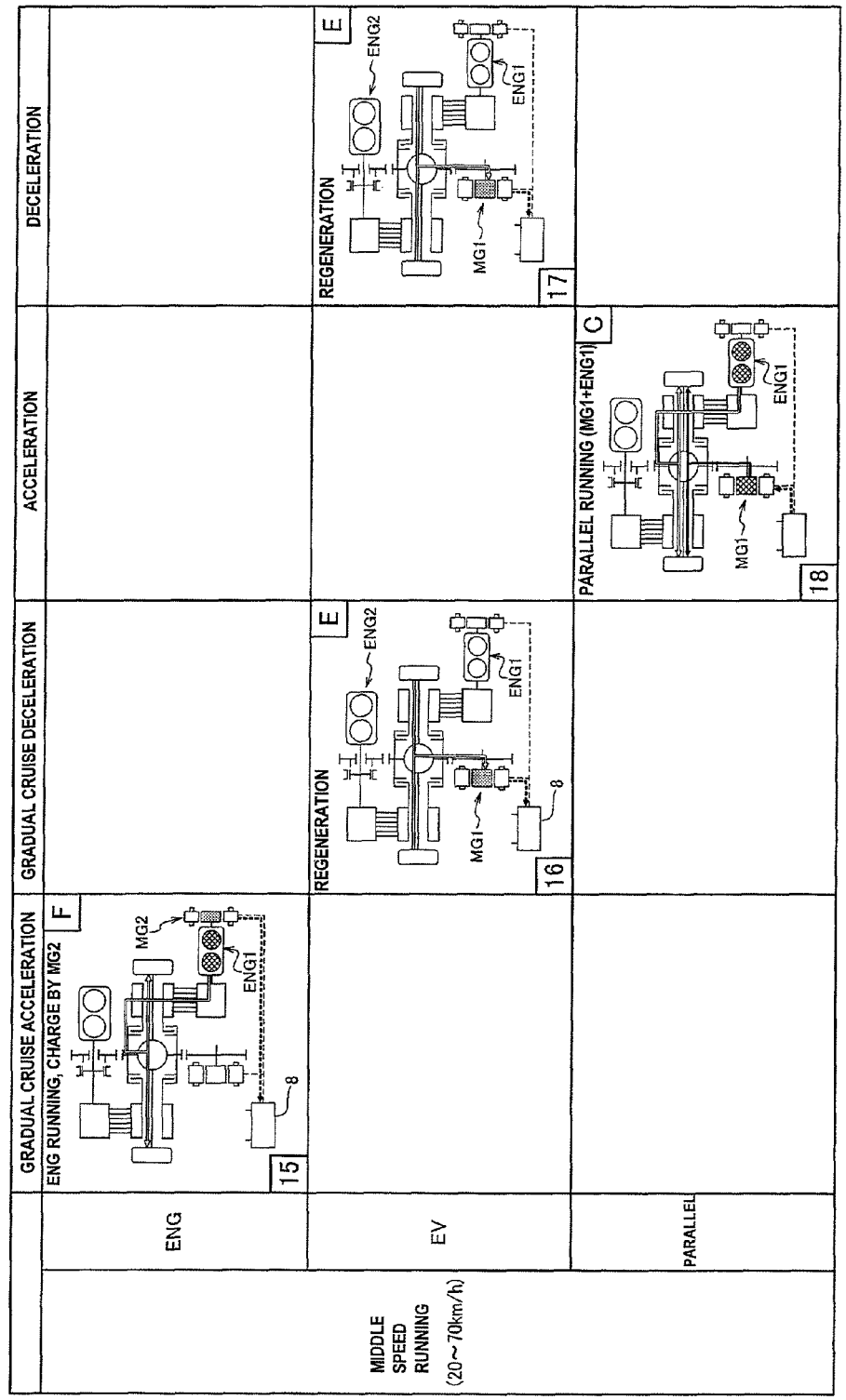
FIG. 29 shows a control operation to be performed in the driving system at the time of a middle speed running.

Next, a control operation at the time of a middle speed running will be described with reference to FIG. 29.

(15) At the time of gradual cruise acceleration, a single engine running which uses only the driving force of the first engine ENG1 is carried out according to the operation pattern F. At this time, the battery 8 is charged using electric power which is generated by the sub motor/generator MG2. The first engine ENG1 is operated at an operation point of high efficiency and corresponds to the operation condition by controlling the gear ratio of the first transmission TM1.

(16) And (17) At the time of gradual cruise deceleration and at the time of deceleration, the first engine ENG1 is stopped according to the operation pattern E, the clutch mechanisms CL1 and CL2 are disconnected, and the regenerative operation is carried out by the main motor/generator MG1.

(18) On the other hand, at the time of acceleration, the pattern is switched to the operation pattern C, and a parallel operation which uses driving forces of both the first engine ENG1 and the main motor/generator MG1 is carried out. At this time, basically, the running is the engine running by the first engine ENG1, and the main motor/generator MG1 assists with respect to the acceleration demand. This control operation is selected when the change of the gear ratio of the first transmission TM1 cannot correspond to the acceleration demand at the time of the middle speed running.

<<Switching of Drive Source from First Engine ENG1 to Second Engine ENG2>>

Figure 30:
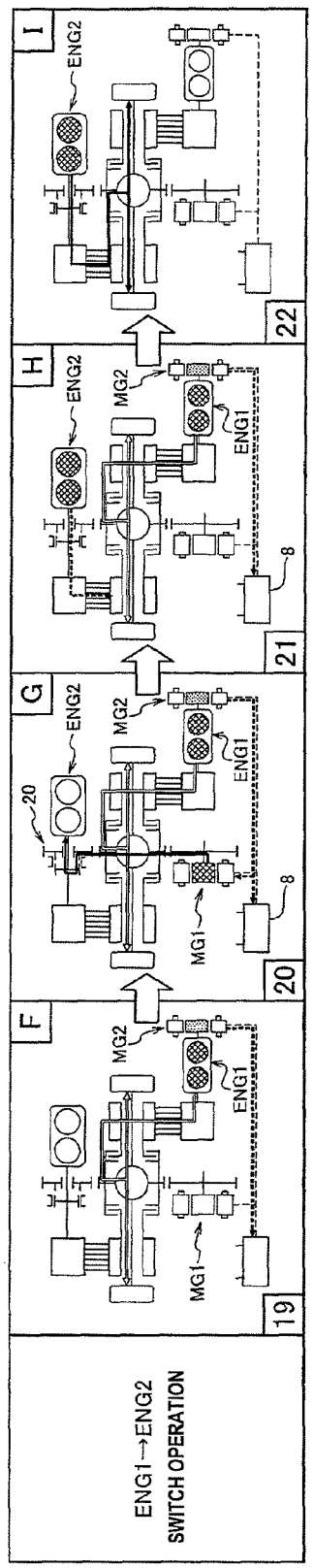
FIG. 30 shows a control operation to be performed in the driving system at the time of switching (switch operation) from an engine running mode by a first engine to an engine running mode by a second engine.

At the time of switching from the engine running which uses the driving force of the first engine ENG1 to the engine running which uses the second engine ENG2, the operation is controlled as shown in FIGS. 30.

(19) And (20) First, in the state where the engine running is carried out by the first engine ENG1 according to the operation pattern F, the pattern is switched to the operation pattern G, and the second engine ENG2 is started. In this case, the second engine ENG2 is started by making the synchronization mechanism 20 to be the connection state and by cranking the output shaft S2 of the second engine ENG2 using the power of the driving target member 11. At this time, the main motor/generator MG1 supplements the rotation decrease of the driving target member 11 due to the starting shock. That is, the second engine ENG2 can be started by only the power from the first engine ENG1 which is introduced to the driving target member 11. However, the starting of the second engine can be performed using the driving force of the main motor/generator MG1. At this time, the gear ratio of the second transmission TM2 may be set so that the input rotational speed of the one-way clutch is less than the output rotational speed, may be set to infinity, and may be set to a value which is slightly smaller than the target gear ratio. When the driving force of the first engine ENG1 has a margin, the generation of electricity is carried out by the sub motor/generator MG2 and the battery 8 may be charged.

(21) Thereafter, if the second engine ENG2 is started, the pattern is switched to the operation pattern H, the synchronization mechanism 20 enters the connection disconnection state, and the main motor/generator MG1 is stopped. In this step, the power of the second engine ENG2 is not input up to the driving target member 11. Therefore, the gear ratio of the second transmission TM2 is gradually changed to the OD side. At this time, electricity is generated by the sub motor/generator MG2 using the first engine ENG1 and the battery 8 is charged.

(22) Since the gear ratio of the second transmission TM2 is changed to the OD side and the input rotational speed of the second one-way clutch OWC2 exceeds the output rotational speed, the pattern is switched to the operation pattern I and the driving force of the second engine ENG2 is transmitted to the driving target member 11 via the second one-way clutch OWC2.

<<At the Time of Middle and High Speed Running (50 to 110 km/h)>>

Figure 31:
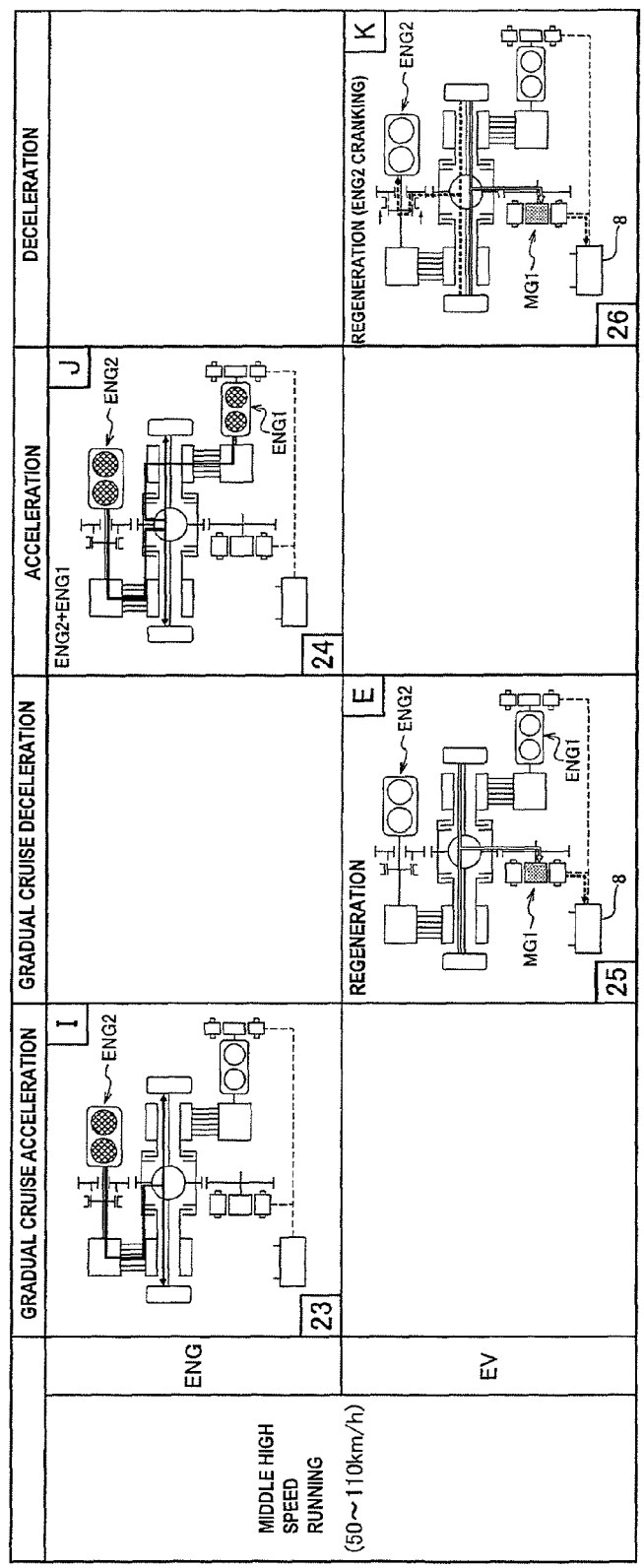
FIG. 31 shows a control operation according to a running state to be performed in the driving system at the time of middle and high speed running.

Next, a control operation at the time of middle and high speed running will be described with reference to FIG. 31.

(23) At the time of a gradual cruise acceleration, a single engine running which uses the driving force of the second engine ENG2 is carried out according to the operation pattern I.

(24) At the time of acceleration, the pattern is switched to the operation pattern J described below, and thereby, the vehicle runs using the driving forces of both the second engine ENG2 and the first engine ENG1. When the SOC is low, the sub motor/generator MG2 is used as a generator, and the battery 8 is charged.

(25) At the time of a gradual cruise deceleration, the regenerative operation is carried out by the main motor/generator MG1 according to the operation pattern E, and both engines ENG1 and ENG2 are stopped. When it is returned from (25) to (23), the synchronization mechanism 20 enters the connection state, and the second engine ENG2 is made to crank.

(26) At the time of deceleration, the main motor/generator MG1 performs the regenerative operation according to the operation pattern K, and simultaneously, the synchronization mechanism 20 enters the connection state, and thereby, an engine brake is used by the second engine ENG2

<<Switching from Engine Running by Second Engine ENG2 to Engine Running by Second Engine ENG2 and First Engine ENG1>>

Figure 32:
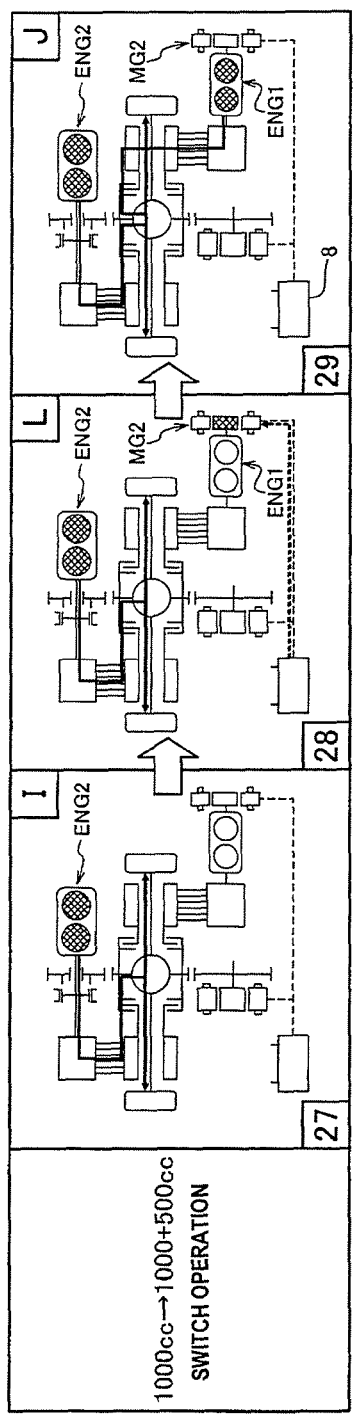
FIG. 32 shows a control operation to be performed in the driving system at the time of switching (switch operation) from an engine running mode by the second engine to a parallel engine running mode by the first engine and the second engine.

When switching from the engine running which uses the driving force of the second engine ENG2 to the engine running which uses the driving forces of both the second engine ENG2 and the first engine ENG1 is carried out, the operation control is performed as shown in FIGS. 32.

(27) And (28) First, in a state where a single engine running is performed by the second engine ENG2 according to the operation pattern I, the first engine ENG1 is started using the sub motor/generator MG2 as shown in the operation pattern L.

(29) Thereafter, as shown in the operation pattern J, the rotational speeds of the first and second engines ENG1 and ENG2 and/is the gear ratios of the first and second transmissions TM1 and TM2 are controlled so that the rotational speeds of the input members 122 of the first and second one-way clutches OWC1 and OWC2 are synchronized with each other and exceed the rotational speed of the output member 121 (the rotational speed of the driving target member 11), the running is shifted to the engine running which combines both driving forces of the second engine ENG2 and the first engine ENG1.

<<At the Time of High Speed Running (100 to Vmax km/h)>>

Figure 33:
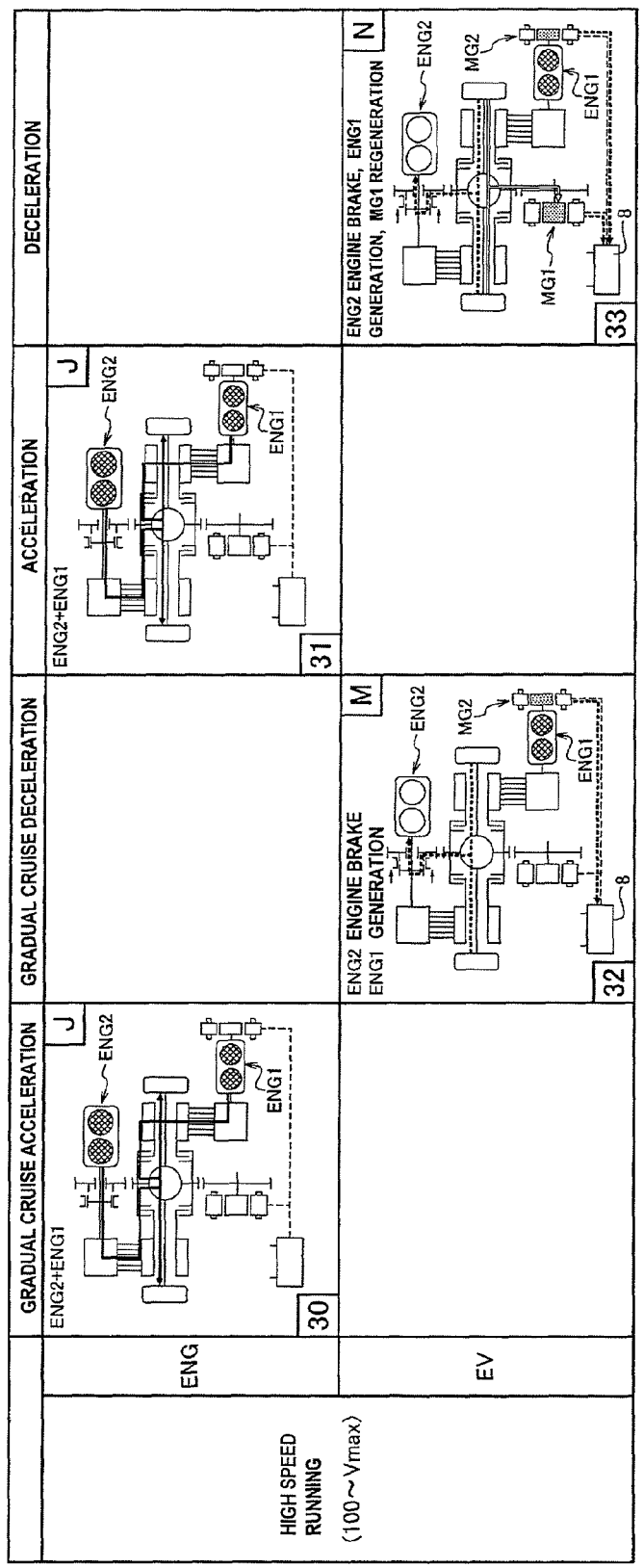
FIG. 33 shows a control operation according to a running state to be performed in the driving system at the time of a high speed running.

Next, a control operation at the time of a high speed running will be described with reference to FIGS. 33.

(30) And (31) At the time of a gradual cruise acceleration and at the time of acceleration, the engine running which uses a combined force of the driving force of the second engine ENG2 and the driving force of the first engine ENG1 is carried out according to the operation pattern J. At this time, the first engine ENG1 having a small displacement is operated at a fixed operation condition in which the first engine ENG1 and/or the first transmission TM1 are/is controlled so that the rotational speed or the torque enters a high efficiency operation region, and with respect to the required output equal to or more than the fixed operation condition, the second engine ENG2 having a large displacement and/or the second transmission TM2 are/is controlled. When the SOC is low, the sub motor/generator MG2 is used as a generator, and the battery 8 may be charged.

(32) At the time of the gradual cruise deceleration, the synchronization mechanism 20 enters the connection state according to the operation pattern M, and thereby, the engine brake of the second engine ENG2 is used. At this time, the first engine ENG1 which does not contribute to the deceleration is used in the operation for generation of electricity of the sub motor/generator MG2, and the battery 8 is charged.

(33) At the time of the deceleration such as pressing the brake, the pattern is switched to the operation pattern N, the synchronization mechanism 20 enters the connection state, and thereby, the engine brake of the second engine ENG2 is used. Simultaneously, a strong barking force is operated by the regenerative operation of the main motor/generator MG1. The regenerative electric power generated by the main motor/generator MG1 is charged in the battery 8. The first engine ENG1 which does not contribute to the deceleration is used in the operation for generation of electricity of the sub motor/generator MG2, and the battery 8 is charged.

<<At the Time of Backward Movement>>

Figure 34:
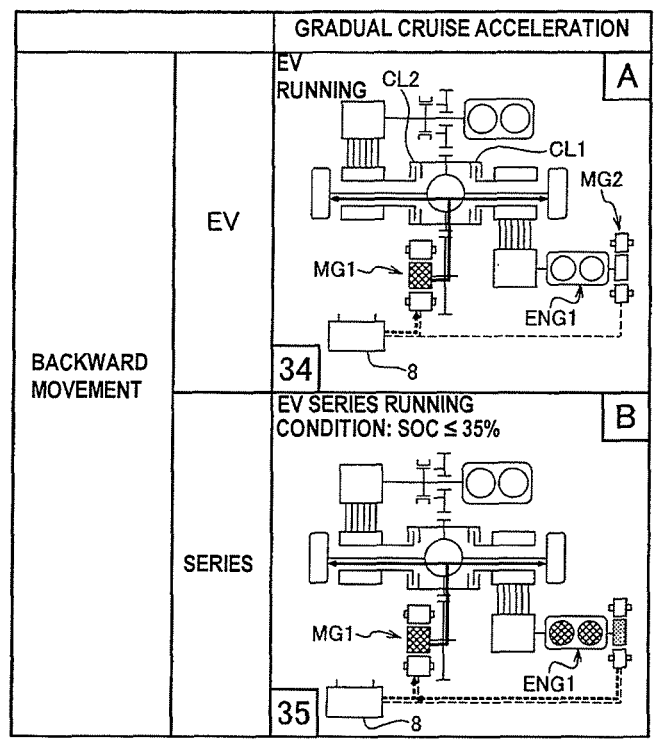
FIG. 34 shows a control operation to be performed in the driving system at the time of a backward movement of a vehicle.

Next, a control operation at the time of a backward movement will be described with reference to FIG. 34.

(34) As the gradual cruise acceleration at the time of the backward movement, the EV running is performed according to the operation pattern A. When the vehicle is to be moved backward, as described above, the first and second transmissions TM1 and TM2 are locked, and thereby, the state where the vehicle cannot move backward (backward movement disabled state) is generated. Therefore, the lock is avoided by making the clutch mechanisms CL1 and CL2 to be the release state in advance, the main motor/generator MG1 is reversely rotated in this state, and the vehicle is moved backward.

(35) Also when the backward movement is performed by the EV running, in a case where the remaining capacity SOC of the battery 8 is less than and equal to 35%, the running is switched to the series running of the operation pattern B, and the main motor/generator MG1 is reversely rotated while the battery 8 is charged.

<<At the Time of Stopping>>

Figure 35:
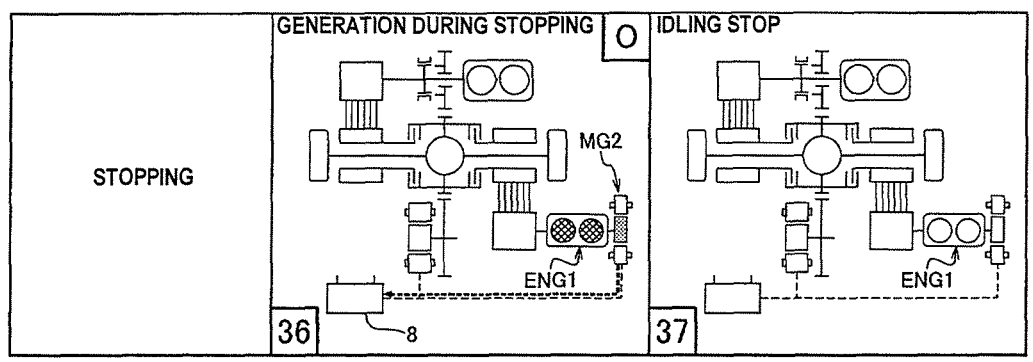
FIG. 35 shows a control operation to be performed in the driving system at the time of stopping of a vehicle.

Next, a control operation at the time of stopping will be described with reference to FIG. 35.

(36) At the time of idling when the vehicle is stopped, the pattern is switched to the operation pattern O, electricity is generated using the sub motor/generator MG2 by driving only the first engine ENG1 so that the driving force is not transmitted to the driving target member 11, for example, by setting the gear ratio of the first transmission TM1 to infinity, and the generated electric power is charged in the battery 8.

(37) In the case of an idling stop, all power sources are stopped.

The present invention is not limited to the above-described embodiment, and modification, improvement, or the like is possible appropriately. The material, the shape, the dimensions, the number, the disposed location, or the like of each component in the above-described embodiment may be arbitrary if capable of achieving the present invention and is not limited.

Figure 40:
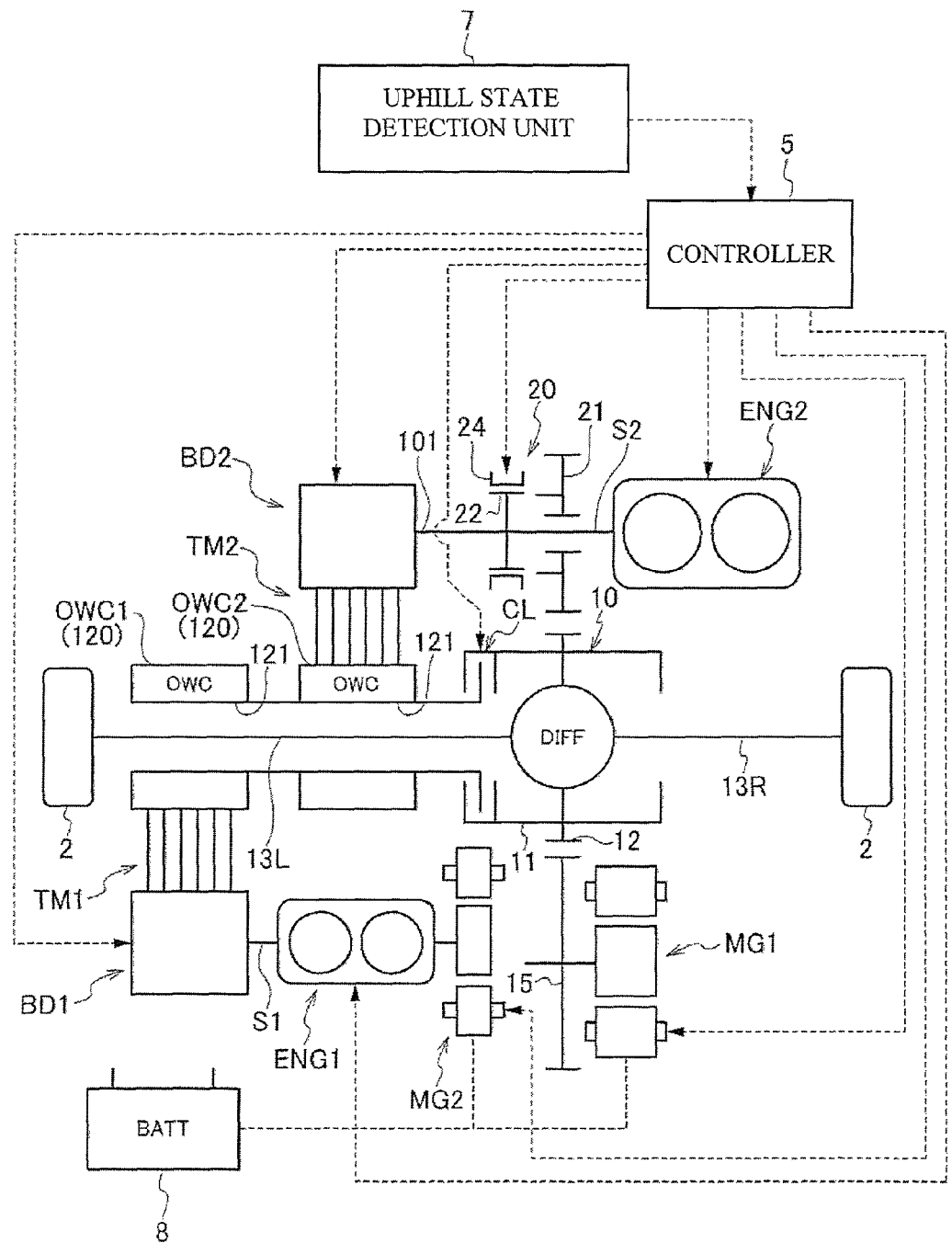
FIG. 40 shows a vehicle driving system of another embodiment of the present invention in a skeleton manner.

For example, in the above-described embodiment, the case where the first one-way clutch OWC1 and the second one-way clutch OWC2 are disposed in both left and right sides of the differential device 10 respectively and the output members 121 of each of the one-way clutches OWC1 and OWC2 are connected to the driving target member 11 via each of the clutch mechanisms CL1 and CL2 is described. However, like another embodiment shown in FIG. 40, both first and second one-way clutches OWC1 and OWC2 are disposed in one side of the differential device 10, the output members of both one-way clutches OWC1 and OWC2 are connected to each other, and thereafter, the output members may be connected to the driving target member 11 via one clutch mechanism CL.

In the above-described embodiment, the case where two engines ENG1 and ENG2, two transmissions TM1 and TM2, two one-way clutches OWC1 and OWC2, two motor/generators MG1 and MG2, and two clutch mechanisms CL1 and CL2 are provided is described. However, the present invention may be applied to a configuration in which the engine, the transmission, the one-way clutch, and the clutch mechanism are provided individually, or these may be provided in a number of three or more. Mainly, a gasoline engine or a diesel engine may be used as the engine. Alternatively, a hydrogen engine or the like may be used, and various engines which are different from one another and combined may be used.

Figure 41:
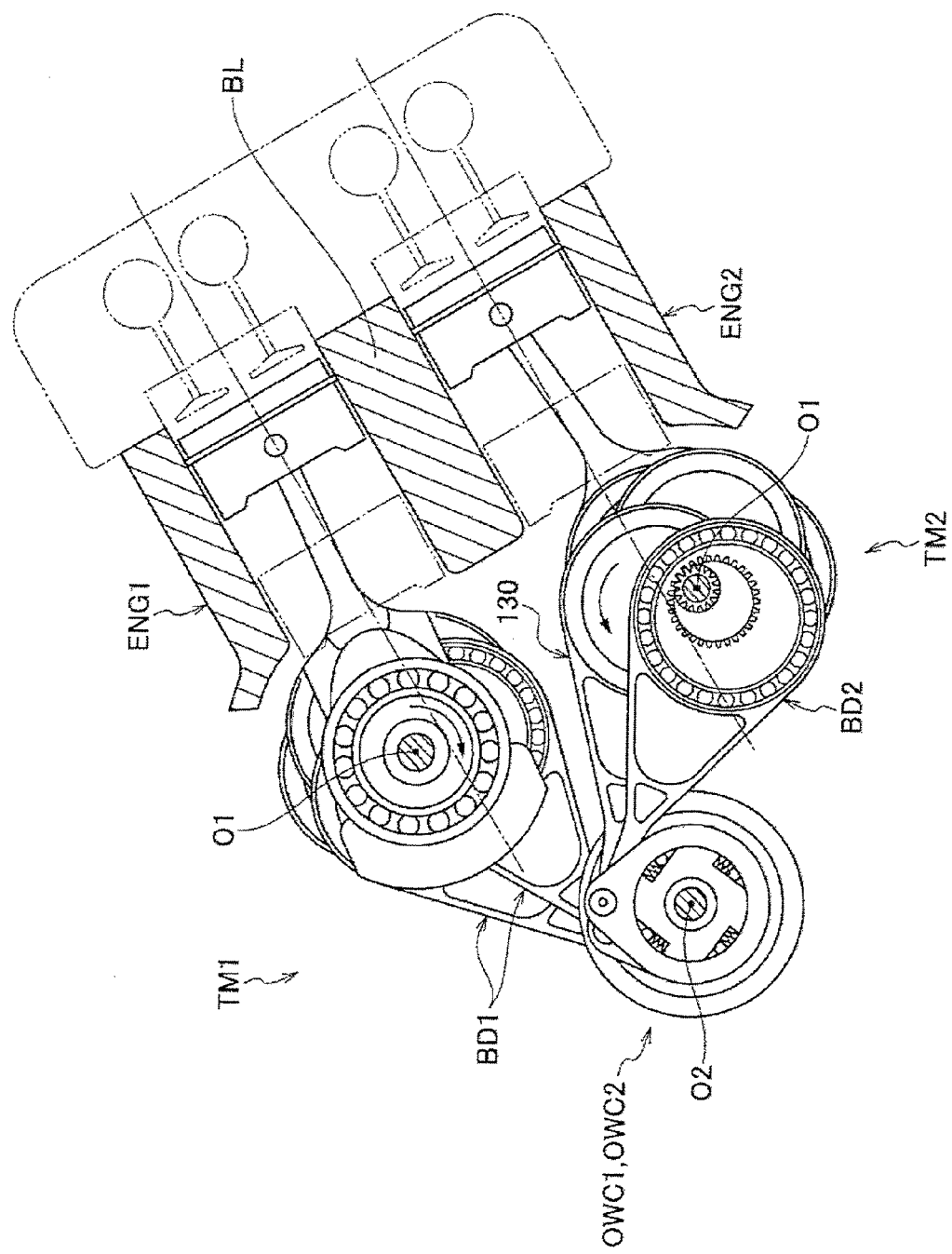
FIG. 41 cross-sectionally shows a modified example of the vehicle driving system of the present invention.

The first engine ENG1 and the second engine ENG2 of the embodiment may be configured so as to be separated from each other, or may be configured so as to be integrated with each other. For example, as shown in FIG. 41, the first engine ENG1 and the second engine ENG2 may be disposed in a common block BL as the first internal combustion engine portion and the second internal combustion engine portion of the present invention respectively.

The present invention is based on Japanese Patent Application (JP-2010-156803), filed on Jul. 9, 2010, the content of which is incorporated herein by reference.

REFERENCE SIGNS LIST

1: driving system
2: driving wheel
5: controller
7: uphill state detection unit
11: driving target member
101: input shaft
104: eccentric disk
112: gear-ratio variable mechanism
120: one-way clutch
121: output member
122: input member
123: roller (engagement member)
130: connection member
131: one end (ring portion)
132: other end
133: circular opening
140: bearing
180: actuator
BD1: first infinite continuously variable transmission mechanism
BD2: second infinite continuously variable transmission mechanism
CL1: first clutch mechanism
CL2: second clutch mechanism
ENG1: first engine (first internal combustion engine portion)
ENG2: second engine (second internal combustion engine portion)
MG1: main motor/generator
MG2: sub motor/generator
OWC1: first one-way clutch
OWC2: second one-way clutch
S1: output shaft
S2: output shaft
TM1: first transmission (first transmission mechanism)
TM2: second transmission (second transmission mechanism)
O1: input center axis
O2: output center axis
O3: first fulcrum
O4: second fulcrum RD1: normal rotation direction
RD2: reverse rotation direction
r1: eccentricity

The invention claimed is:

1. A vehicle driving system, including:
an internal combustion engine portion which generates a rotational power;
a transmission mechanism which shifts the rotational power generated in the internal combustion engine portion and outputs the shifted rotational power;
a one-way clutch which is provided in an output portion of the transmission mechanism, the one-way clutch including:
an input member which receives the rotational power from the transmission mechanism;
an output member; and
an engagement member which makes the input member and the output member enter a locked state or a non-locked state, in which the input member and the output member enter the locked state when positive rotational speed of the input member exceeds the positive rotational speed of the output member to thereby transmit the rotational power of the input member to the output member;
a driving target member which is connected to the output member of the one-way clutch, and is rotatable integrally with a driving wheel to transmit the rotational power of the output member to the driving wheel;
a clutch mechanism which is interposed between the output member of the one-way clutch and the driving target member, and can transmit/disconnect power therebetween by being ON/OFF-controlled;
a clutch mechanism controller which controls ON/OFF of the clutch mechanism;
an uphill state detection unit which detects an uphill state of a vehicle; and
a determination unit which detects whether or not a vehicle-backward-movement prevention control is required according to the uphill state detected by the uphill state detection unit,
wherein the transmission mechanism includes:
an input shaft which receives the rotational power to rotate around an input center axis;
plural first fulcrums which are provided in a circumferential direction around the input shaft at equal intervals, each first fulcrum being rotatable around the input center axis along with the input shaft while maintaining a variable eccentricity with respect to the input center axis;
plural eccentric disks which rotate around the input center axis to have the first fulcrums as the respective centers;
a one-way clutch which includes the output member which rotates around an output center axis separated from the input center axis, the input member which oscillates around the output center axis by receiving the rotational power from the outside, and the engagement member which makes the input member and the output member enter a locked state or a non-locked state with each other, transmits the rotational power of the input member to the output member when the positive rotational speed of the input member exceeds the positive rotational speed of the output member, and thereby converts the oscillating movement of the input member to the rotational movement of the output member;
a second fulcrum which is provided on the input member separately from the output center axis;
plural connection members which each has one end rotatably connected to the outer circumference of each eccentric disk about the first fulcrum and the other end rotatably connected to the second fulcrum provided on the input member of the one-way clutch to thereby transmit the rotational movement given to the eccentric disk from the input shaft to the input member of the one-way clutch as the oscillating movement thereof; and
a gear-ratio variable mechanism which changes an oscillation angle of the oscillating movement transmitted to the input member of the one-way clutch from the eccentric disk by adjusting the eccentricity of the first fulcrum with respect to the input center axis to thereby change a gear ratio of transmitting the rotational power of the input shaft to the output member of the one-way clutch via the eccentric disk and the connection member,
wherein the transmission mechanism is configured by a four bar linkage continuously variable transmission mechanism in which the eccentricity can be set to zero and the gear ratio can be set to infinity,
wherein an output shaft of the internal combustion engine portion is connected to an input shaft of the continuously variable transmission mechanism,
wherein a one-way clutch which is a component of the continuously variable transmission mechanism also serves as the one-way clutch which is provided between the transmission mechanism and the driving target member, and
wherein the clutch mechanism controller makes the clutch mechanism enter ON state when the determination unit determines that the vehicle-backward-movement prevention control is required, and makes the clutch mechanism enter OFF state when the determination unit determines that the vehicle-backward-movement prevention control is not required.

2. The system of claim 1,
wherein, after the clutch mechanism enters ON state and the vehicle starts on an uphill, the clutch mechanism controller maintains a state where the clutch mechanism enters ON state in a case of making a driving force of the internal combustion engine portion be transmitted to the driving target member via the transmission mechanism for running of the vehicle, and the clutch mechanism controller switches the clutch mechanism from ON state to OFF state in a case of making the driving force of the internal combustion engine portion not be transmitted to the driving target member via the transmission mechanism.

3. The system of claim 1,
wherein a first internal combustion engine portion and a second internal combustion engine portion which independently generate the rotational power respectively are provided as the internal combustion engine portion,
wherein a first transmission mechanism and a second transmission mechanism which shift and output the rotational power generated in the first internal combustion engine portion and the second internal combustion engine portion respectively are provided as the transmission mechanism,
wherein a first one-way clutch and a second one-way clutch are provided on each output portion of the first transmission mechanism and the second transmission mechanism, respectively, as the one-way clutch, wherein the driving target member is connected to both output members of the first one-way clutch and the second one-way clutch in common, wherein a first clutch mechanism and a second clutch mechanism are provided between each output member of the first one-way clutch and the second one-way clutch and the driving target member respectively, as the clutch mechanism, wherein the first transmission mechanism and the second transmission mechanism are configured by the four bar linkage continuously variable transmission mechanism respectively, the output shafts of the first internal combustion engine portion and the second internal combustion engine portion are connected to the input shaft of each continuously variable transmission mechanism, and a one-way clutch which is a component of each continuously variable transmission mechanism also serves as the first one-way clutch and the second one-way clutch which are provided between each transmission mechanism and the driving target member, and wherein the clutch mechanism controller makes only one clutch mechanism of the first clutch mechanism and the second clutch mechanism enter ON state and makes the other clutch mechanism enter OFF state when the determination unit determines that the vehicle-backward-movement prevention control is required.

4. The system of claim 3, wherein a motor/generator is connected to an output shaft of the first internal combustion engine portion, and wherein the clutch mechanism controller makes the second clutch mechanism enter ON state and the first clutch mechanism enter OFF state when electricity is generated by the motor/generator using the driving force of the first internal combustion engine portion while the vehicle stops or immediately after the vehicle starts.

5. The system of claim 3, wherein a motor/generator is connected to an output shaft of the first internal combustion engine portion, and wherein the clutch mechanism controller sets the gear ratio of the first transmission mechanism to infinity, makes the first clutch mechanism enter ON state, and makes the second clutch mechanism enter OFF state when electricity is generated by the motor/generator using the driving force of the first internal combustion engine portion while the vehicle stops or immediately after the vehicle starts.

6. A control method for a vehicle driving system, the system including:

an internal combustion engine portion which generates a rotational power;

a transmission mechanism which shifts the rotational power generated in the internal combustion engine portion and outputs the shifted rotational power;

a one-way clutch which is provided in an output portion of the transmission mechanism, the one-way clutch including:

an input member which receives the rotational power from the transmission mechanism;

an output member; and an engagement member which makes the input member and the output member enter a locked state or a non-locked state, in which the input member and the output member enter the locked state when positive rotational speed of the input member exceeds the positive rotational speed of the output member to thereby transmit the rotational power of the input member to the output member;

a driving target member which is connected to the output member of the one-way clutch, and is rotatable integrally with a driving wheel to transmit the rotational power of the output member to the driving wheel; and a clutch mechanism which is interposed between the output member of the one-way clutch and the driving target member, and can transmit/disconnect power therebetween by being ON/OFF-controlled, wherein the transmission mechanism includes:

an input shaft which receives the rotational power to rotate around an input center axis;

plural first fulcrums which are provided in a circumferential direction around the input shaft at equal intervals, each first fulcrum being rotatable around the input center axis along with the input shaft while maintaining a variable eccentricity with respect to the input center axis;

plural eccentric disks which rotate around the input center axis to have the first fulcrums as the respective centers;

a one-way clutch which includes the output member which rotates around an output center axis separated from the input center axis, the input member which oscillates around the output center axis by receiving the rotational power from the outside, and the engagement member which makes the input member and the output member enter a locked state or a non-locked state with each other, transmits the rotational power of the input member to the output member when the positive rotational speed of the input member exceeds the positive rotational speed of the output member, and thereby converts the oscillating movement of the input member to the rotational movement of the output member;

a second fulcrum which is provided on the input member separately from the output center axis;

plural connection members which each has one end rotatably connected to the outer circumference of each eccentric disk about the first fulcrum and the other end rotatably connected to the second fulcrum provided on the input member of the one-way clutch to thereby transmit the rotational movement given to the eccentric disk from the input shaft to the input member of the one-way clutch as the oscillating movement thereof; and a gear-ratio variable mechanism which changes an oscillation angle of the oscillating movement transmitted to the input member of the one-way clutch from the eccentric disk by adjusting the eccentricity of the first fulcrum with respect to the input center axis to thereby change a gear ratio of transmitting the rotational power of the input shaft to the output member of the one-way clutch via the eccentric disk and the connection member, wherein the transmission mechanism is configured by a four bar linkage continuously variable transmission mechanism in which the eccentricity can be set to zero and the gear ratio can be set to infinity, wherein an output shaft of the internal combustion engine portion is connected to an input shaft of the continuously variable transmission mechanism, and wherein a one-way clutch which is a component of the continuously variable transmission mechanism also serves as the one-way clutch which is provided between the transmission mechanism and the driving target member, the control method including:

setting the clutch mechanism to ON state when a vehicle-backward-movement prevention control is required for a start on an uphill, and setting the clutch mechanism to OFF state when the vehicle-backward-movement prevention control is not required.

* * * * *